(12) United States Patent
Koike et al.

(10) Patent No.: US 10,192,322 B2
(45) Date of Patent: Jan. 29, 2019

(54) MEDICINE PHOTOGRAPHING APPARATUS, MEDICINE SHAPE MEASURING APPARATUS AND MEDICINE DISPENSING APPARATUS

(71) Applicant: YUYAMA MFG. CO., LTD., Toyonaka-shi, Osaka (JP)

(72) Inventors: Naoki Koike, Toyonaka (JP); Masao Fukada, Toyonaka (JP)

(73) Assignee: YUYAMA MFG. CO., LTD., Toyonaka-shi (JP)

( * ) Notice: Subject to any disclaimer, the term of this patent is extended or adjusted under 35 U.S.C. 154(b) by 254 days.

(21) Appl. No.: 15/114,788

(22) PCT Filed: Jan. 30, 2015

(86) PCT No.: PCT/JP2015/052678
§ 371 (c)(1),
(2) Date: Jul. 27, 2016

(87) PCT Pub. No.: WO2015/119055
PCT Pub. Date: Aug. 13, 2015

(65) Prior Publication Data
US 2016/0343151 A1    Nov. 24, 2016

(30) Foreign Application Priority Data
Feb. 6, 2014  (JP) ................... 2014-021616

(51) Int. Cl.
*G06T 7/60* (2017.01)
*G01B 11/24* (2006.01)
(Continued)

(52) U.S. Cl.
CPC ............... *G06T 7/60* (2013.01); *A61J 7/0084* (2013.01); *G01B 11/02* (2013.01); *G01B 11/24* (2013.01);
(Continued)

(58) Field of Classification Search
CPC .......... G06T 7/60; A61J 7/0084; G01B 11/02; G01B 11/24; G07F 17/0092; B65B 5/103; B65B 57/14
See application file for complete search history.

(56) References Cited

U.S. PATENT DOCUMENTS

| 7,006,893 B2 * | 2/2006 | Hart ................. G06F 19/324 |
| | | 700/235 |
| 7,080,755 B2 * | 7/2006 | Handfield ............. A61J 7/0084 |
| | | 221/13 |

(Continued)

FOREIGN PATENT DOCUMENTS

| JP | 2011-234865 A | 11/2011 |
| JP | 2013-144101 A | 7/2013 |

(Continued)

OTHER PUBLICATIONS

ISA/JP, International Search Report dated Apr. 28, 2015 in International Application No. PCT/JP2015/052678, total 4 pages with English translation.

*Primary Examiner* — Patrick H Mackey
(74) *Attorney, Agent, or Firm* — Masuvalley & Partners

(57) ABSTRACT

Embodiments of the present invention provide a medicine photographing apparatus for reducing time and effort of a user operation at the time of measuring shapes of medicines, and a medicine shape measuring apparatus and a medicine dispensing apparatus which include the medicine photographing apparatus.
A medicine photographing apparatus 7 includes a medicine holding part 81, a lighting part 82, a photographing part 83, a housing 71 and a pivotally supporting part. The medicine holding part 81, the lighting part 82 and the photographing part 83 are contained in the housing having light shielding property. The medicine holding part 81 is provided between the lighting part 82 and the photographing part 83. Further, (Continued)

the medicine holding part 81 can hold a medicine with a portion having translucency and pivotally move due to the pivotally supporting part.

12 Claims, 29 Drawing Sheets

(51) Int. Cl.
*G07F 17/00* (2006.01)
*G01B 11/02* (2006.01)
*A61J 7/00* (2006.01)
*G07G 1/00* (2006.01)
*B65B 57/14* (2006.01)
*B65B 5/10* (2006.01)

(52) U.S. Cl.
CPC ....... *G07F 17/0092* (2013.01); *G07G 1/0063* (2013.01); *B65B 5/103* (2013.01); *B65B 57/14* (2013.01)

(56) References Cited

U.S. PATENT DOCUMENTS

| | | | |
|---|---|---|---|
| 8,234,838 B2* | 8/2012 | Yasunaga | A61J 7/0084 221/123 |
| 8,925,434 B2* | 1/2015 | Omura | A61J 7/0007 225/93 |
| 9,710,994 B2* | 7/2017 | Omura | G07F 17/0092 |
| 9,731,853 B2* | 8/2017 | Akdogan | B25J 9/1697 |
| 2006/0058724 A1* | 3/2006 | Handfield | A61J 7/0084 604/20 |
| 2006/0124656 A1* | 6/2006 | Popovich, Jr. | G07F 9/026 221/9 |
| 2006/0266763 A1* | 11/2006 | Svabo Bech | G07F 11/16 221/83 |
| 2013/0125722 A1* | 5/2013 | Omura | A61J 7/0007 83/104 |

FOREIGN PATENT DOCUMENTS

| | | |
|---|---|---|
| WO | 2012/099189 A1 | 7/2012 |
| WO | 2013/141130 A1 | 9/2013 |

\* cited by examiner

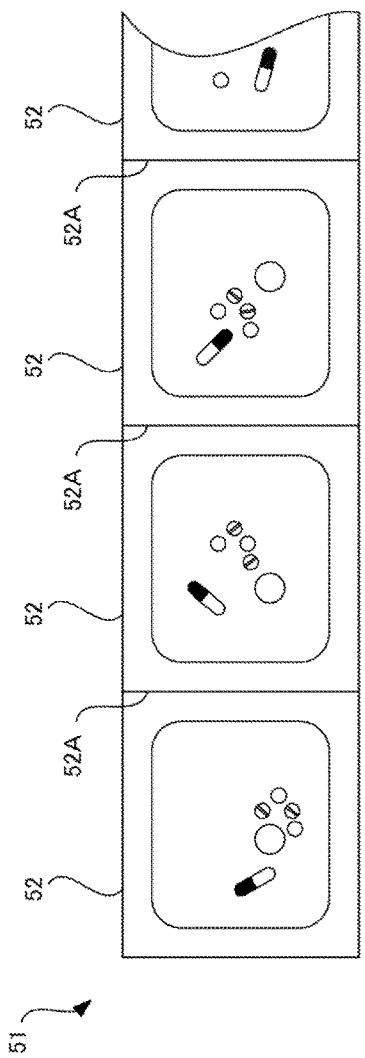

| Unspecified cassette | Medicine ID |
|---|---|
| C1 | M1 |
| C2 | – |
| C3 | M2 |
| C4 | – |

| Medicine ID | Height of dispensing path | Width of dispensing path | Driving condition | | | |
|---|---|---|---|---|---|---|
| | | | Dispensing speed | First slowdown | Second slowdown | Reverse rotation operation |
| M1 | h11[mm] | w11[mm] | v11[Tablets/min] | sd11[Tablets] | sd21[Tablets] | ON |
| M2 | h12[mm] | w12[mm] | v12[Tablets/min] | sd12[Tablets] | sd22[Tablets] | OFF |
| M3 | h13[mm] | w13[mm] | v13[Tablets/min] | sd13[Tablets] | sd23[Tablets] | OFF |
| M4 | h14[mm] | w14[mm] | v14[Tablets/min] | sd14[Tablets] | sd24[Tablets] | ON |
| ... | ... | ... | ... | ... | ... | ... |

| Profile shape of tablet in upper image | Elongated circular shape | | | | Ellipse shape | | | | Circular shape | | | | Other shape | | |
|---|---|---|---|---|---|---|---|---|---|---|---|---|---|---|---|
| Width ←→ Vertical direction | | | | | | | | | | | | | | | |
| Profile shape of tablet in side image | Circular shape | Flattened shape | Swelling shape | Circular shape | Flattened shape | Swelling shape | Ellipse shape | Circular shape | Flattened shape | Swelling shape | Ellipse shape | Flattened shape | Swelling shape | Ellipse shape |
| Height ←→ Width direction | ○ | ▭ | ▢ | ○ | ▭ | ▢ | ○ | ○ | ▭ | ▢ | ○ | ▭ | ▢ | ○ |
| Shape types of tablet | Capsule tablet | Elongated circular shape | Swelling shape (circular type) | Egg-type shape | Ellipse shape | Swelling shape (other type) | | Spherical shape | Circular shape | Swelling shape (circular type) | | Deformed tablet | | Swelling shape (other type) |

FIG. 35

| Shape types of tablet | Driving condition | | | | | |
|---|---|---|---|---|---|---|
| | Height of dispensing path | Width of dispensing path | Dispensing speed | First slowdown | Second slowdown | Reverse rotation operation |
| Capsule tablet | 1.3 [Times] | 1.4 [Times] | v21 [Tablets/min] | 14 [Tablets] | 3 [Tablets] | On |
| Elongated circular shape | 1.4 [Times] | 1.4 [Times] | v22 [Tablets/min] | 12 [Tablets] | 3 [Tablets] | Off |
| Swelling shape (circular type) | 1.3 [Times] | 1.1 [Times] | v22 [Tablets/min] | 16 [Tablets] | 5 [Tablets] | On |
| Circular shape | 1.3 [Times] | 1.3 [Times] | v21 [Tablets/min] | 14 [Tablets] | 4 [Tablets] | Off |
| Ellipse shape | 1.4 [Times] | 1.1 [Times] | v21 [Tablets/min] | 12 [Tablets] | 3 [Tablets] | On |
| Deformed tablet | 1.3 [Times] | 1.5 [Times] | v23 [Tablets/min] | 14 [Tablets] | 3 [Tablets] | Off |
| Egg-type shape | 1.5 [Times] | 1.1 [Times] | v23 [Tablets/min] | 14 [Tablets] | 3 [Tablets] | On |
| Spherical shape | 1.5 [Times] | 1.4 [Times] | v24 [Tablets/min] | 24 [Tablets] | 10 [Tablets] | On |
| Swelling shape (other type) | 1.3 [Times] | 1.1 [Times] | v23 [Tablets/min] | 14 [Tablets] | 4 [Tablets] | Off |

MEDICINE PHOTOGRAPHING APPARATUS, MEDICINE SHAPE MEASURING APPARATUS AND MEDICINE DISPENSING APPARATUS

RELATED APPLICATIONS

This application is the U.S. National Phase of International Patent Application No. PCT/JP2015/052678, filed on Jan. 30, 2015, entitled "Drug-Imaging Device, Drug-Form-Measuring Device, and Drug-Dispensing Device", and claims priority to Japanese Patent Application No. JP2014-021616, filed on Feb. 6, 2014, which are hereby expressly incorporated by reference in their entirety for all purposes.

TECHNICAL FIELD

The present invention relates to a medicine photographing apparatus used at the time of measuring a medicine shape, and a medicine shape measuring apparatus and a medicine dispensing apparatus which include the medicine photographing apparatus.

BACKGROUND ART

From years ago, there has been known a medicine dispensing apparatus which includes a plurality of tablet cassettes for respectively containing predetermined types of tablets and is configured to automatically dispense the tablet contained in each tablet cassette (for example, see patent document 1: JP2011-234865A).

And now, in recent years, there has been also known a medicine dispensing apparatus which can operate to dispense a desired type of tablet by setting driving conditions of tablet cassettes according to shapes of tablets. In this regard, examples of the driving conditions include a width or a height of a dispensing path for the tablets to be dispensed from the tablets cassettes and the like. In the case of using this kind of the tablet cassettes, it is necessary to preliminarily measure the shapes of the tablets. However, work in that a user manually measures the shapes of the tablets is cumbersome. In addition, in the case where the user measures the shapes of the tablets to set the driving conditions, there is a risk in that human errors occur.

Accordingly, it is an object of the present invention to provide a medicine photographing apparatus which can reduce time and effort of a work of a user at the time of measuring shapes of medicines, and a medicine shape measuring apparatus and a medicine dispensing apparatus which include the medicine photographing apparatus.

SUMMARY OF THE INVENTION

A medicine photographing apparatus according to the embodiments of the present invention includes a photographing unit, a medicine holding part, a housing and a pivotally supporting part. The photographing unit includes a lighting part and a photographing part. The medicine holding part is provided between the lighting part and the photographing part and can hold a medicine with a portion having translucency. The photographing unit and the medicine holding part are contained in the housing. The housing has light shielding property. The pivotally supporting part pivotally supports one or both of the photographing unit and the medicine holding part.

With this configuration, a user can easily photograph shadow images of the medicine from different directions with the photographing part and the lighting part by only pivotally moving the medicine holding part pivotally supported by the pivotally supporting part. Thus, it is possible to reduce time and effort of a work of the user in the case of identifying a shape of the medicine with an image processing based on the shadow images of the medicine photographed from the different directions or the like.

In particular, it may be considered that the pivotally supporting part pivotally supports the medicine holding part, and the lighting part and the photographing part are fixed to the housing. With this configuration, it is possible to downsize the medicine photographing apparatus compared with the case where the lighting part and the photographing part are pivotally moved since the medicine photographing apparatus is only required to have a space in which the medicine holding part provided between the lighting part and the photographing part can be pivotally moved.

Further, it may be considered that the pivotally supporting part pivotally supports the medicine holding part between a first posture and a second posture which are respectively predefined as a posture at the time of photographing by the photographing part. With this configuration, the user can easily change a condition of the medicine holding part to the first posture and the second posture by pivotally moving the medicine holding part to a limit in a clockwise direction or a counterclockwise direction.

Further, it may be considered that the medicine holding part includes a medicine placing part having a medicine placing surface on which the medicine is to be placed, a pair of gripping parts having gripping surfaces for gripping therebetween the medicine placed on the medicine placing part, and a placing reference part provided on the medicine placing surface and having a placing reference surface for defining a placing reference position for the medicine in a direction perpendicular to a gripping direction for the medicine gripped by the gripping parts and parallel to the medicine placing surface. With this configuration, the user can easily set the medicine at a predetermined position with respect to the medicine holding part. More specifically, it may be considered that the first posture is a posture in which the photographing part is located in a direction perpendicular to the medicine placing surface, and the second posture is a posture in which the photographing part is located in a direction perpendicular to the gripping direction and parallel to the medicine placing surface.

Further, it may be considered that the medicine placing surface in each of the first posture and the second posture is inclined with respect to a horizontal plane or a vertical plane by a predetermined angle, the medicine placing surface in the first posture is downwardly inclined toward the placing reference surface, and the medicine placing surface in the second posture is upwardly inclined toward the placing reference surface. With this configuration, in both of the first posture and the second posture, it is possible to reduce a risk in that the medicine placed on the placing reference surface drops from the placing reference surface.

At this time, it may be considered that the pivotally supporting part pivotally supports the medicine holding part around a predetermined position of the placing reference part as a pivot center and the photographing part is fixed to a position where the photographing part can photograph the medicine placed on the medicine placing surface of the medicine holding part in the second posture from the side of the placing reference surface. With this configuration, it is possible to suppress changes of a distance from the medicine held by the medicine holding part in the first posture to the photographing part and a distance from the medicine held by the medicine holding part in the second posture to the photographing part.

Further, it may be considered that the gripping surfaces of the pair of gripping parts are provided so that a distance between the gripping surfaces increases toward the placing reference surface. With this configuration, it is possible to reduce a risk in that the medicine drops from the medicine placing surface when the medicine holding part is pivotally moved.

Further, it may be considered that the medicine photographing apparatus further includes a grip supporting part for supporting the pair of gripping parts so that the pair of gripping parts can be relatively approached to and separated from each other, an elastic member for increasing moving resistance of the grip supporting part, and a pressing part for separating the elastic member from the grip supporting part according to a pressing operation. With this configuration, a position of the grip supporting part becomes stable and the user can easily carry out an operation of the grip supporting part.

Further, it may be considered that the medicine photographing apparatus further includes a first pivot restricting part for increasing pivot resistance of the medicine holding part toward a direction away from the first posture, and a second pivot restricting part for increasing pivot resistance of the medicine holding part toward a direction away from the second posture. With this configuration, it is possible to stabilize the medicine holding part in the first posture or the second posture since a free pivotal movement of the medicine holding part is restricted.

It may be possible to interpret the present invention as an invention of a medicine shape measuring apparatus including the medicine photographing apparatus and shape measuring means for measuring a shape of the medicine based on a photographed image photographed by the photographing part in a plurality of conditions each having different pivot postures of the medicine holding part. Here, it may also be considered that the shape measuring means measures one or both of a shape type and a size of the medicine as the shape of the medicine.

By using the medicine shape measuring apparatus, the user can photograph the medicine by only carrying out an easy photographing work with the medicine photographing apparatus, thereby easily and accurately obtaining a measuring result for the shape of the medicine.

In particular, in a configuration in which the lighting part and the photographing part are fixed to the housing and the pivotally supporting part pivotally supports the medicine holding part between a first posture and a second posture which are respectively predefined as a posture at the time of photographing by the photographing part. It may also be considered that the shape measuring means selects the shape type of the medicine from a plurality of predetermined shape types. More specifically, it may be considered that the shape measuring means selects the shape type of the medicine according to a combination of a profile shape of the medicine identified based on a first photographed image photographed in the first posture and a profile shape of the medicine identified based on a second photographed image photographed in the second posture. With this configuration, it becomes unnecessary to identify any shape type. Thus, it becomes possible to identify the shape type of the medicine with a predetermined easy processing.

Further, it may be considered that the medicine shape measuring apparatus further includes posture detecting means and photographing control means. The posture detecting means detects a pivot posture of the medicine holding part. The photographing control means allows the lighting part to light the medicine and allows the photographing part to photograph the medicine when a predetermined pivot posture is detected by the posture detecting means. With this configuration, the user can photograph the medicine by only displacing the pivot posture of the medicine holding part.

Further, it may be considered that the posture detecting means detects the pivot posture of the medicine holding part based on presence/absence of a predetermined specific image contained in the photographed image. With this configuration, it becomes unnecessary to add hardware for detecting the pivot posture. Thus, it is possible to reduce the number of parts and a cost.

Further, it may also be possible to consider the present invention as a medicine dispensing apparatus including the medicine shape measuring apparatus, medicine cassettes, driving condition setting means and driving control means. The medicine cassettes can respectively dispense desired types of medicines depending on a change of driving conditions. The driving condition setting means sets the driving conditions of the medicine cassettes according to the shape of the medicine measured by the medicine shape measuring apparatus. The driving control means drives the medicine cassettes according to the driving conditions set by the driving condition setting means to allow the medicine cassettes to dispense the medicine.

In the medicine dispensing apparatus, it is also possible to drive the medicine cassettes to dispense the medicine by setting the driving condition according to the shape of the medicine measured by the medicine shape measuring apparatus. Thus, in the medicine dispensing apparatus, it is possible to allow the medicine cassettes to dispense even a medicine to which the driving condition is not preliminarily set.

More specifically, it may be considered that the medicine dispensing apparatus further includes a storage part for storing driving correspondence information in which the shape of the medicine identified by the medicine shape measuring apparatus or the driving condition corresponding to the shape of the medicine is associated with medicine information for identifying the medicine, and allocating means for allocating medicine information for a dispensation target to one of the medicine cassettes when the medicine information for the dispensation target is inputted. Further, the driving control means drives the medicine cassette to which the medicine information has been allocated by the allocating means according to the driving condition associated with the medicine information in the driving correspondence information.

For example, the driving condition includes one or more of a prior driving condition related to adjustment of the medicine cassette before a start of a dispensation of the medicine from the medicine cassette, an under-driving condition related to driving control during the dispensation of the medicine from the medicine cassette and a driving stop condition related to driving control to be performed when the dispensation of the medicine from the medicine cassette is stopped.

Specifically, it may be considered that the medicine cassette includes path adjusting means for changing one or both of a height and a width of a dispensing path through which the medicine is dispensed from a medicine containing part in which the medicine is contained. In this case, it may also be considered that the prior driving condition includes one or both of the height and the width of the dispensing path.

Further, it may be considered that the medicine cassette includes conveying means for conveying the medicine from the medicine containing part in which the medicine is contained toward a dispensing port. In this case, it may be considered that the under-driving condition includes a conveying speed of the medicine by the conveying means. Furthermore, it may be considered that the driving stop condition includes slowdown timing or deceleration of the conveying speed of the medicine when the dispensation of the medicine from the medicine cassette is stopped. Furthermore, it may be considered that the driving stop condition includes a condition for determining whether or not a reverse rotation operation of the conveying means is carried out when the dispensation of the medicine from the medicine cassette is stopped.

According to the embodiments of the present invention, it is possible to provide a medicine photographing apparatus which can reduce time and effort of a work of a user for measuring shapes of medicines, and a medicine shape measuring apparatus and a medicine dispensing apparatus which include the medicine photographing apparatus.

BRIEF DESCRIPTION OF THE DRAWINGS

FIG. 8 is a view illustrating one example of a result of packaging tablets by the medicine dispensing apparatus according to the embodiment of the present invention.

FIG. 9 is a view illustrating one example of allocation information used in the medicine dispensing apparatus according to the embodiment of the present invention.

FIG. 10 is a view illustrating one example of driving correspondence information used in the medicine dispensing apparatus according to the embodiment of the present invention.

FIG. 34 is a view illustrating a list of shape types identified by the shape identifying process carried out in the medicine dispensing apparatus according to the embodiment of the present invention.

FIG. 35 is a view illustrating one example of setting information used in the medicine dispensing apparatus according to the embodiment of the present invention.

DETAILED DESCRIPTION OF THE PREFERRED EMBODIMENTS

Hereinafter, description will be given to embodiments of the present invention with reference to the accompanying drawings for facilitating the understanding of the present invention. It should be noted that the following embodiments are intended to provide examples embodying the present invention and not to limit the technical scope of the present invention.

First Embodiment

First, description will be given to a schematic configuration of a medicine dispensing apparatus 100 according to a first embodiment of the present invention with reference to FIGS. 1 and 2.

Figure 1:
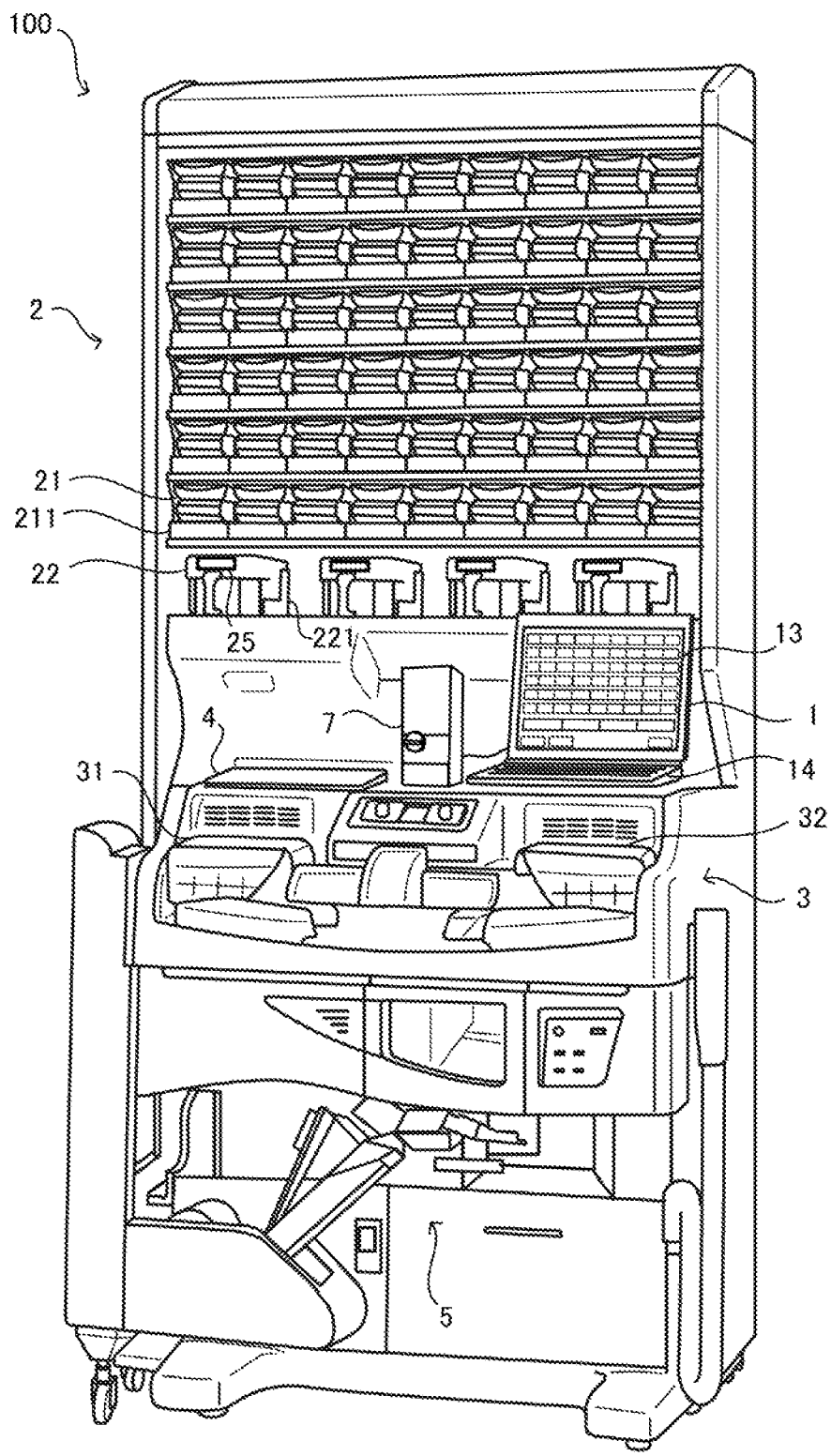
FIG. 1 is an external view of a medicine dispensing apparatus according to an embodiment of the present invention.
Figure 2:
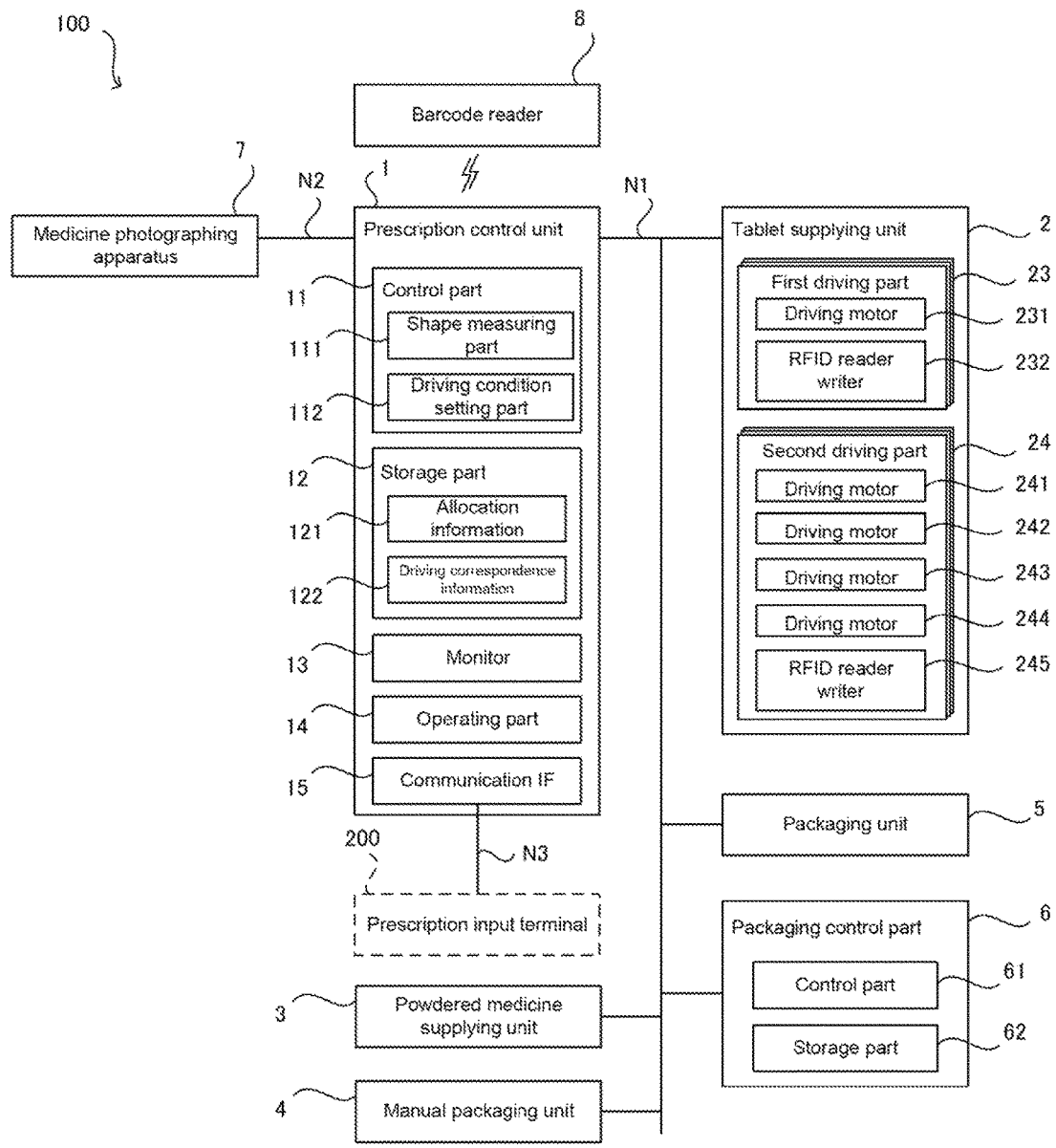
FIG. 2 is a block diagram illustrating a system configuration of the medicine dispensing apparatus according to the embodiment of the present invention.

As shown in FIGS. 1 and 2, the medicine dispensing apparatus 100 includes a prescription control unit 1, a tablet supplying unit 2, a powdered medicine supplying unit 3, a manual packaging unit 4, a packaging unit 5, a packaging control unit 6, a medicine photographing apparatus 7, a barcode reader 8 and the like. In one aspect of this embodiment, description will be given to an exemplary case where the prescription control unit 1 and the medicine photographing apparatus 7, which are parts of constituent elements included in the medicine dispensing apparatus 100, constitute a medicine shape measuring apparatus according to the present invention. On the other hand, another configuration in which a medicine shape measuring apparatus including the medicine photographing apparatus 7 and a control device for carrying out an aforementioned medicine shape measuring process is connected to the medicine dispensing apparatus 100 may be considered as another embodiment.

The prescription control unit 1, the tablet supplying unit 2, the powdered medicine supplying unit 3, the manual packaging unit 4, the packaging unit 5 and the packaging control unit 6 are mutually connected by an internal bus N1. Further, the medicine photographing apparatus 7 is communicatively connected to the prescription control unit 1 through a cable N2 such as a USB cable, an RS232C cable and a LAN cable. Furthermore, the prescription control unit 1 and the barcode reader 8 can carry out wireless communication according to various communication standards such as a wireless LAN and Blue-tooth (registered trade-mark). The medicine dispensing apparatus 100 is controlled by the prescription control unit 1 and the packaging control unit 6, and allows the packaging unit 5 to package tablets and powdered medicine supplied from the tablet supplying unit 2, the powdered medicine supplying unit 3 or the manual packaging unit 4 in units of packages according to various information such as an administration time to dispense the tablets and the powdered medicine which are packaged.

[Tablet Supplying Unit 2]

The tablet supplying unit 2 includes a plurality of specified cassettes 21 which can respectively dispense predetermined specific types of tablets one by one (in a unit amount) and a plurality of unspecified cassettes 22 (one example of a plurality of medicine cassettes) which can respectively dispense desired types of medicines one by one (in the unit amount) by changing driving conditions thereof.

Specifically, in the example shown in FIG. 1, the tablet supplying unit 2 includes 54 specified cassettes 21 in total arranged in a matrix of 6 rows and 9 columns and 4 unspecified cassettes 22 in total arranged in 1 row and 4 columns. The tablet which can be dispensed from each of the specified cassettes 21 and each of the unspecified cassettes 22 includes various solid medicines having various shapes such as a round-shaped medicine, a spherical-shaped medicine and a capsular medicine. In this regard, another configuration in which the tablet supplying unit 2 does not include the specified cassettes 21 and includes only the plurality of unspecified cassettes 22 may be considered as another embodiment.

Each of the specified cassettes 21 is configured to be detachably mounted on each of mounting parts 211 provided in the tablet supplying unit 2. Each of the mounting parts 211 includes a first driving part 23 for individually driving the corresponding specified cassette 21. Each of the first driving parts 23 includes a driving motor 231 and an RFID reader writer 232. The driving motor 231 supplies driving force to a driving mechanism of the corresponding specified cassette 21. The RFID reader writer 232 is information reading means for reading/writing information from and to an RFID tag (not shown in the drawings) provided at the corresponding specified cassette 21 with RFID (Radio Frequency Identification) wireless communication technique.

Positions where the RFID tag (not shown in the drawings) and the RFID reader writer 232 are provided may be relatively set so that the RFID reader writer 232 can read/write information from and to the RFID tag (not shown in the drawings) in a state that the specified cassette 21 is mounted on the mounting part 211.

The RFID tag (not shown in the drawings) is a non-volatile storage medium for storing some information such as cassette identification information for identifying each of the specified cassettes 21. The cassette identification information is written to the RFID tag by the prescription control unit 1 at the time of an initial setting of the medicine dispensing apparatus 100 or the like.

Each of the unspecified cassettes 22 is configured to be detachably mounted on each of mounting parts 221 provided in the tablet supplying unit 2. Another configuration in which each of the unspecified cassettes 22 is configured to be mounted on each of the mounting parts 221 in a drawable state may be considered as another embodiment. Each of the mounting parts 221 includes a second driving part 24 for individually driving the corresponding unspecified cassette 22.

Each of the second driving parts 24 includes a plurality of driving motors 241 to 244 and an RFID reader writer 245. The driving motors 241 to 244 supply driving force to a driving mechanism of the corresponding unspecified cassette 22. The RFID reader writer 245 is information reading means for reading/writing information from and to an RFID tag (see FIG. 6) provided at the corresponding unspecified cassette 22 with the RFID wireless communication technique.

Positions where the RFID tag 26 and the RFID reader writer 245 are provided may be relatively set so that the RFID reader writer 245 can read/write information from and to the RFID tag 26 in a state that the unspecified cassette 22 is mounted on the mounting part 221.

Figure 11:
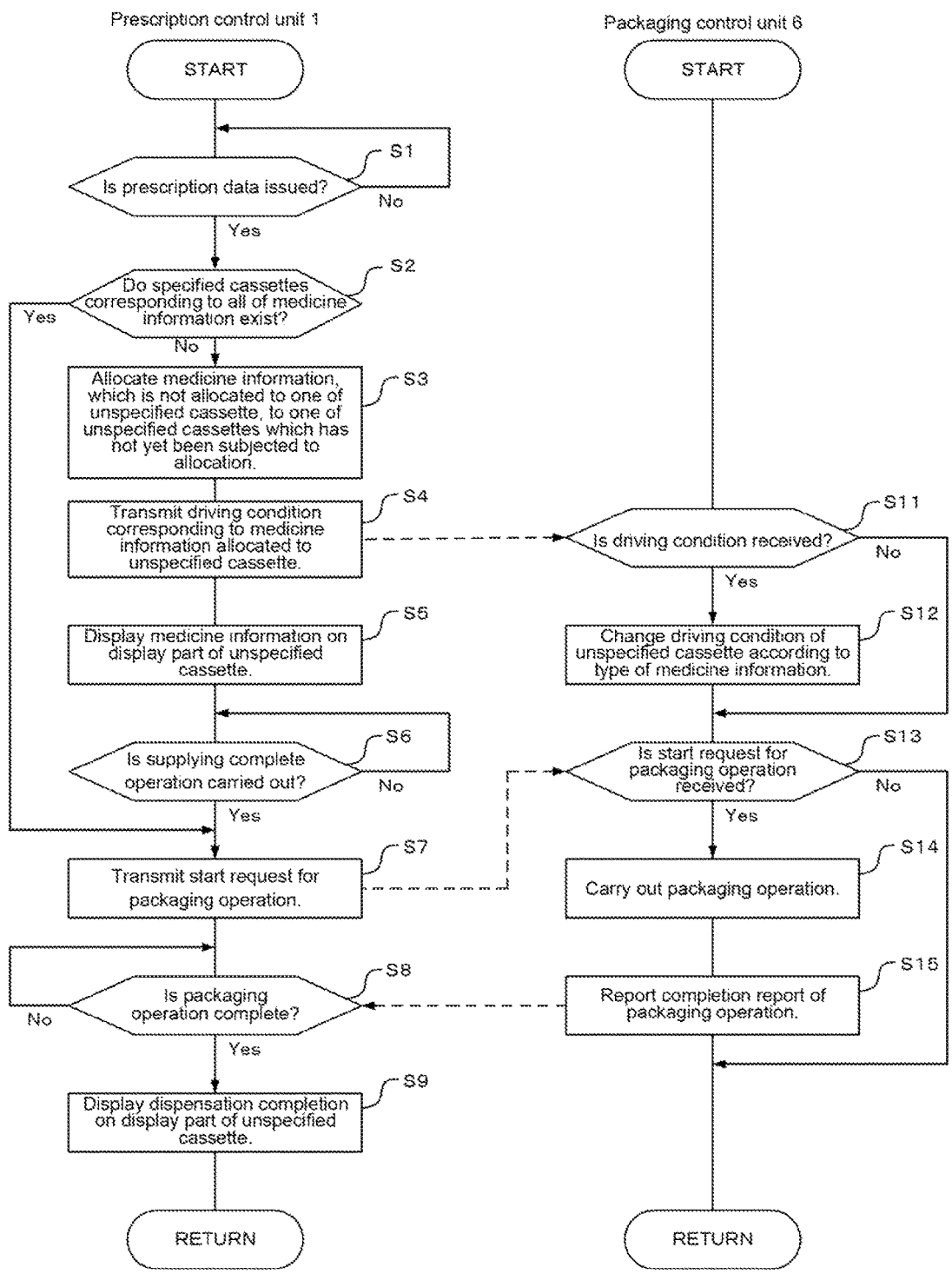
FIG. 11 is a flow chart for explaining one example of procedures of a medicine dispensing process and a packaging control process carried out in the medicine dispensing apparatus according to the embodiment of the present invention.

The RFID tag 26 is a non-volatile storage medium for storing some information such as cassette identification information for identifying each of the unspecified cassettes and medicine information allocated to each of the unspecified cassettes 22 in a medicine dispensing process described below (see FIG. 11).

The medicine information is information for identifying a type of tablet (medicine). Examples of the medicine information include a medicine name, a medicine ID, a medicine code, a JAN code, an RSS code and a QR code (registered trade-mark). Each of the JAN code and the RSS code is numerical numbers or textual information represented by a one-dimensional code (barcode, GS1 code). The QR code (registered trade-mark) is numerical numbers or textual information represented by a two-dimensional code.

In this regard, the number of the unspecified cassettes 22 may be different from the number of the mounting parts 221. For example, it is possible to take a configuration in which a user selects one from the unspecified cassettes 22 exceeding the mounting parts 221 in numbers to mount the selected unspecified cassette 22 on one of the mounting parts 221. Especially, it is possible to take another configuration in which the tablet supplying unit 2 includes the plurality of unspecified cassettes 22 and each unspecified cassette 22 can be mounted on only corresponding one of the corresponding mounting parts 221. This discussion regarding the unspecified cassettes 22 and the mounting parts 221 can be applied to the specified cassettes 21 and the mounting parts 211.

[Specified Cassette 21]

Figure 3:
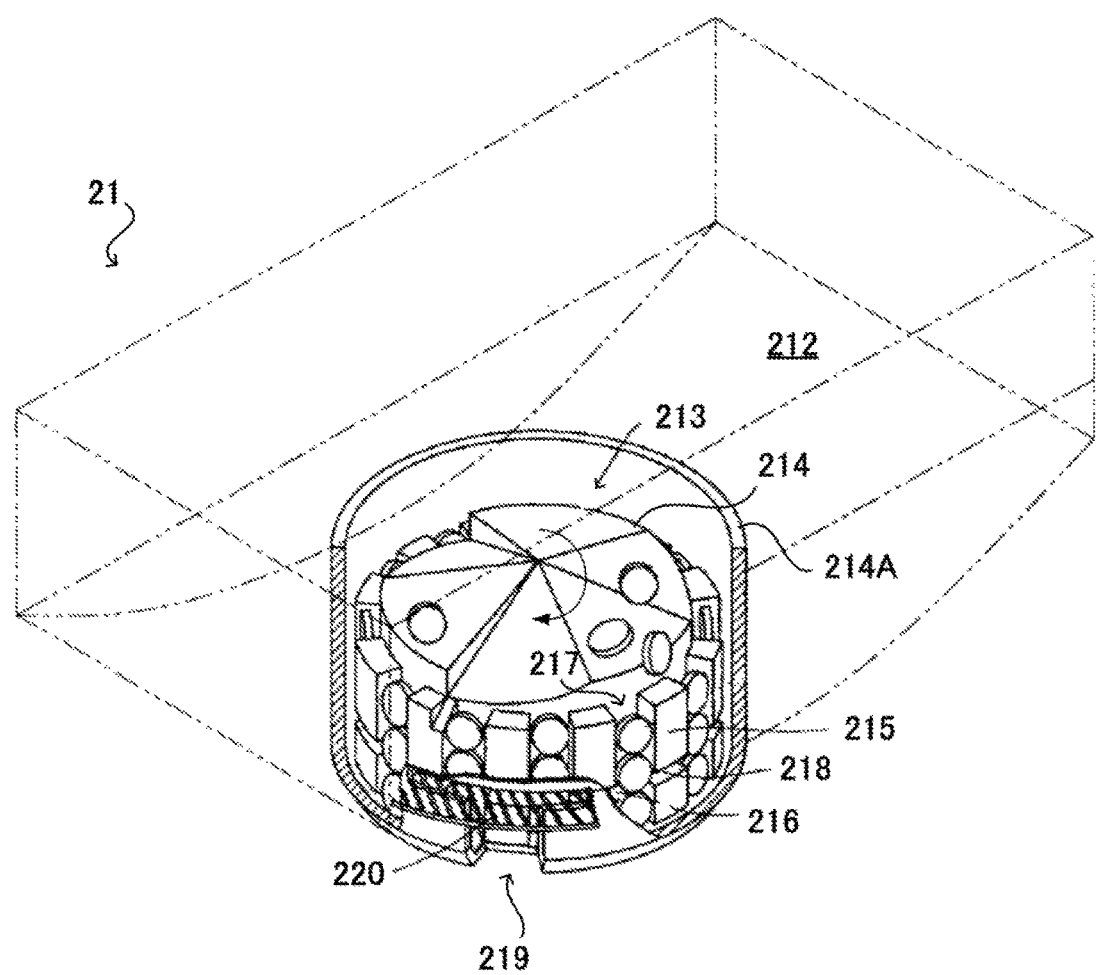
FIG. 3 is a perspective view for explaining a structure of a specified cassette of the medicine dispensing apparatus according to the embodiment of the present invention.

Here, description will be given to one example of the specified cassette 21 with reference to FIG. 3. It is noted that a structure of the specified cassette 21 described below is merely one example, and thus it is possible to take any other structure as the structure of the specified cassette 21 as long as it has the same function. FIG. 3 is a view illustrating the structure of the specified cassette 21 with a cover member, which covers a top portion of the specified cassette 21, being omitted.

Since types of tablets respectively contained in the specified cassettes 21 are predetermined, medicine information on the tablet to be contained in each of the specified cassettes 21 is written on, for example, a front surface of the specified cassette 21 in advance.

As shown in FIG. 3, the specified cassette 21 includes a tablet containing part 212 for containing a lot of tablets and a tablet discharging part 213 for discharging the tablets contained in the tablet containing part 212 one by one. The tablet discharging part 213 is provided in a concave portion formed on a substantially central portion of the tablet containing part 212. The tablets in the tablet containing part 212 are downwardly conveyed toward the tablet discharging part 213 in turn.

The tablet discharging part 213 includes a rotor 214 rotatably supported by a housing of the specified cassette 21 and an inner wall 214A surrounding an outer periphery of the rotor 214. The rotor 214 is connected to the driving motor 231 of the first driving part 23 through a drive transmission system such as various gears (not shown in the drawings) when the specified cassette 21 is mounted on the mounting part 211. Further, ribs 215 and ribs 216 are formed on an outer peripheral surface of the rotor 214 at predetermined intervals. Thus, gaps 217 surrounded by the ribs 215, the ribs 216 and the inner wall 214A are intermittently formed on the outer periphery of the rotor 214. A width of each gap 217 is set depending on the predetermined type of tablet to be contained in the specified cassette 21, thus the width of each gap 217 corresponds to a width of one tablet.

Gaps 218 are formed between the ribs 215 and the ribs 216 so as to surround the whole of the outer peripheral surface of the rotor 214. A height position of an upper end of each of the ribs 215 and the ribs 216 is set depending on the predetermined type of tablet to be contained in the specified cassette 21. Specifically, the height position of the upper end of each of the ribs 215 is set so that a total height of the rib 215, the gap 218 and the rib 216 corresponds to a height of three tablets as shown in FIG. 3. Thus, three of the tablets can be putted in each of the gaps 217 of the rotor 213. Further, a height position of an upper end of each of the ribs 216 is set so that a height of each of the ribs 216 corresponds to a height of one tablet.

On the other hand, a discharging port 219 for discharging the tablet from the rotor 214 is formed on the inner wall 214A. Further, a partition plate 220 inserted into the gaps 218 is provided at the discharging port 219. This partition plate 220 makes it possible to prevent two of the three tablets putted in each of the gaps 217 from dropping and allows the lowest one of the three tablets to be discharged from the discharging port 219. Thus, in the specified cassette 21, the rotor 214 is driven by the driving motor 231 to discharge the tablets contained in the tablet containing part 212 in a unit of one tablet.

[Unspecified Cassette 22]

Next, description will be given to one example of the unspecified cassette 22 with reference to FIGS. 4 to 7. It is noted that a structure of the unspecified cassette 22 described below is merely one example, and thus it is possible to take any other structure as the structure of the unspecified cassette 22 as long as it can dispense the tablets of the desired type one by one. For example, other examples of the unspecified cassette 22 are disclosed in JP 2010-535683A and JP 2010-115493A.

Figure 4:
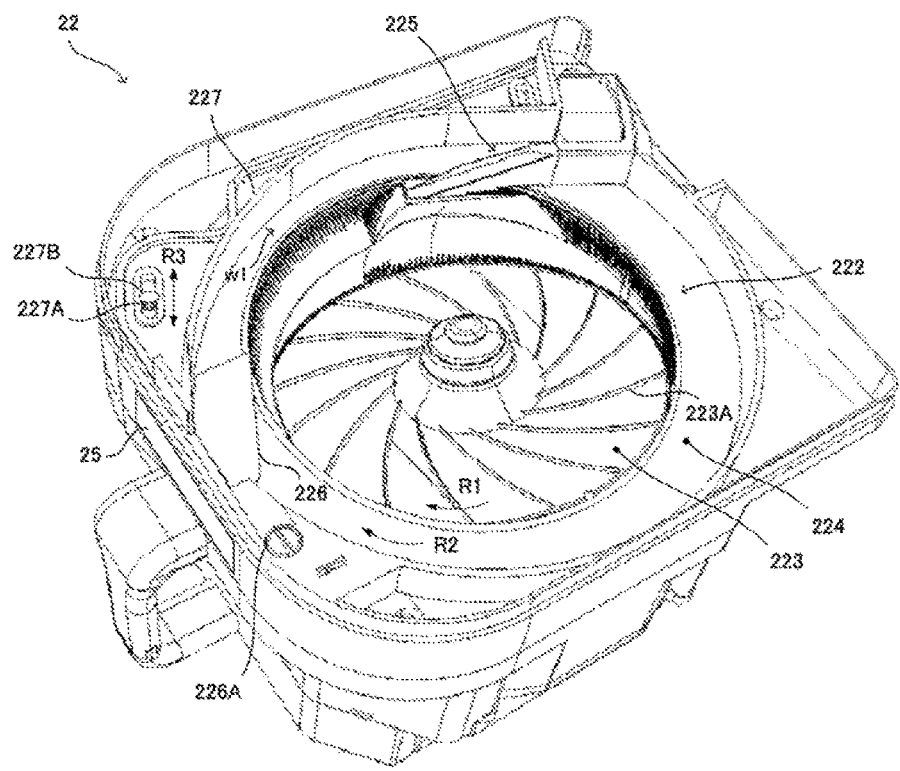
FIG. 4 is a perspective view for explaining a structure of an unspecified cassette of the medicine dispensing apparatus according to the embodiment of the present invention.
Figure 5:
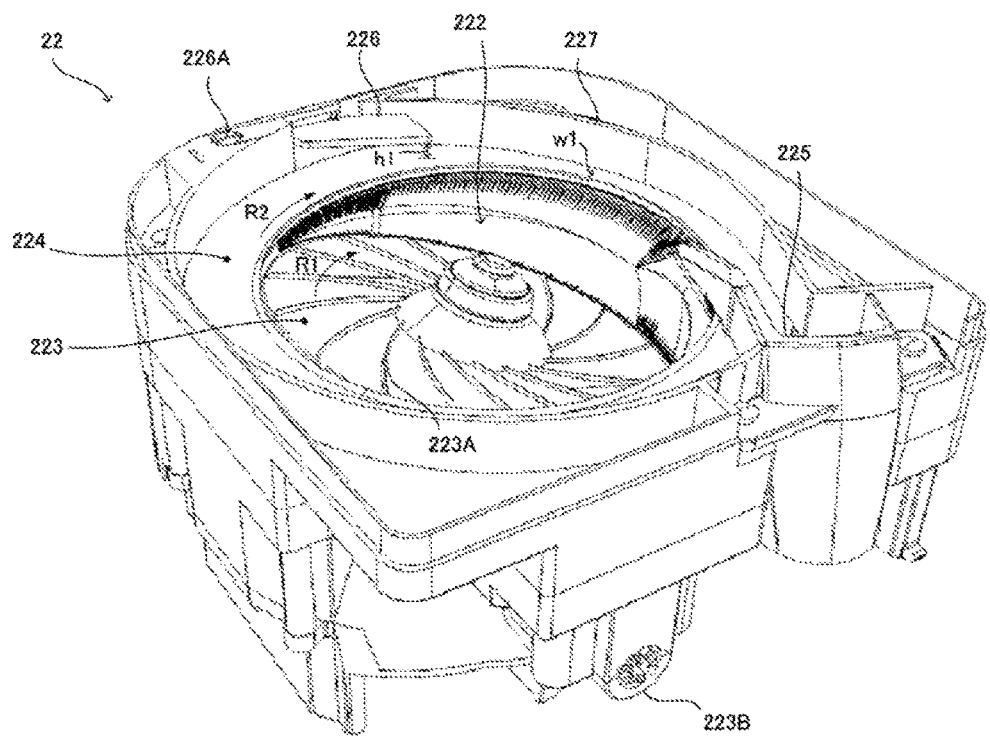
FIG. 5 is another perspective view for explaining the structure of the unspecified cassette of the medicine dispensing apparatus according to the embodiment of the present invention.
Figure 6:
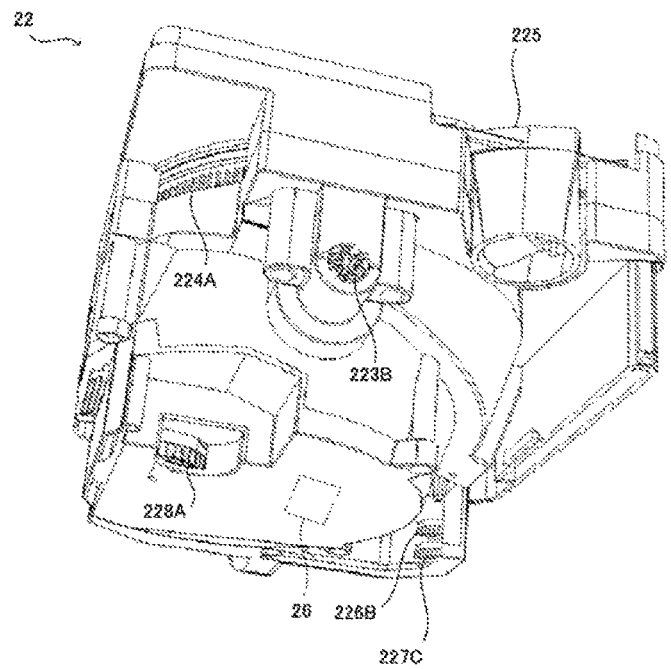
FIG. 6 is another perspective view for explaining the structure of the unspecified cassette of the medicine dispensing apparatus according to the embodiment of the present invention.

As shown in FIGS. 4 to 6, the unspecified cassette 22 includes a tablet containing part 222 for containing a lot of tablets, a first rotating body 223 and a second rotating body 224 for dispensing the tablets from the tablet containing part 222. Each of FIGS. 4 to 6 is a view illustrating the unspecified cassette 22 with a cover member, which covers a top portion of the unspecified cassette 22, being omitted. The unspecified cassette 22 may take any other configuration as long as it can dispense the tablets in a predetermined unit amount. For example, the unspecified cassette 22 may take another configuration which can dispense the tablets not in a unit of one tablet but in units of some tablets.

The first rotating body 223 is a disk-shaped member forming a bottom surface of the tablet containing part 222. A rotational axis of the first rotating body 223 inclines with respect to a vertical direction by a predetermined specific angle, and an upper surface of the first rotating body 223 inclines with respect to a horizontal plane by the predetermined specific angle. Further, radial ribs 223A are formed on the upper surface of the first rotating body 223 at specific intervals. The first rotating body 223 is rotatably supported by a housing of the unspecified cassette 22 and connected to a driving gear 223B shown in FIGS. 5 and 6.

The second rotating body 224 is an annular hollow member arranged around the first rotating body 223 in planar view thereof. The second rotating body 224 may be considered as one example of a conveying member for conveying the tablets in the tablet containing part 22 toward a dispensing port 225 to dispense the tablets from the dispensing port 225. An upper end portion of the first rotating body 223 is positioned on the same horizontal plane as the second rotating body 224. Further, the second rotating body 224 is rotatably supported by the housing of the unspecified cassette 22 and a driving gear 224A is formed on an outer peripheral surface of the second rotating body 224 as shown in FIG. 6.

Figure 7:
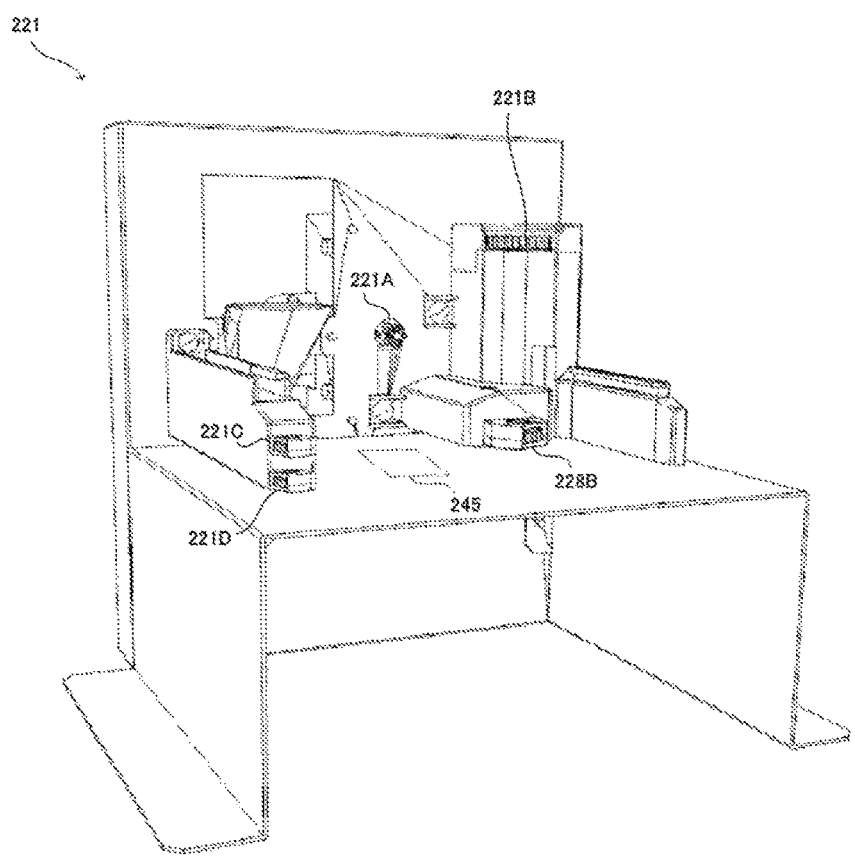
FIG. 7 is a perspective view for explaining a structure of a mounting part of the unspecified cassette of the medicine dispensing apparatus according to the embodiment of the present invention.

On the other hand, as shown in FIG. 7, the mounting part 221 includes a driving gear 221A engaged with the driving gear 223B of the first rotating body 223 when the unspecified cassette 22 is mounted on the mounting part 221 and a driving gear 221B engaged with the driving gear 224A of the second rotating body 224 when the unspecified cassette 22 is mounted on the mounting part 221. The driving gear 221A is connected to the driving motor 241 of the second driving part 24. The driving gear 221B is connected to the driving motor 242 of the second driving part 24.

Further, as shown in FIGS. 4 and 5, the unspecified cassette 22 includes a height restriction member 226 and a width restriction member 227 which are arranged on a dispensing path on which the tablets are conveyed toward the dispensing port 225 by means of the second rotating body 224.

The height restriction member 226 restricts a size in a height direction of the tablet which can be conveyed toward the dispensing port 225 by means of the second rotating body 224. The width restriction member 227 restricts a size in a width direction of the tablet which can be conveyed toward the dispensing port 225 by means of the second rotating body 224. This makes it possible to dispense only the tablet, which has a height equal to or less than a height h1 to be restricted by the height restriction member 226 and a width equal to or less than a width w1 to be restricted by the width restriction member 227, from the dispensing port 225 among the tablets placed on the second rotating body 224, in the unspecified cassette 22. Thus, in the case where the height h1 and the width w1 are respectively equal to or more than a height and a width of one tablet contained in the tablet containing part 222 and less than a total height and a total width of two tablets contained in the tablet containing part 222, the unspecified cassette 22 can dispense the tablets in the unit of one tablet.

The unspecified cassette 22 also includes a height adjusting part 226A for changing the height h1 to be restricted by the height restriction member 226 and a width adjusting part 227A for changing the width w1 to be restricted by the width restriction member 227. In this case, the height adjusting part 226A and the width adjusting part 227A may be considered as one example of path adjusting means. A pinion gear engaged with a rack (gear) formed in an inner surface of an elongated hole 227B formed in the width restriction member 227 is formed on an outer peripheral surface of the width adjusting part 227A.

The height adjusting part 226A is rotatably supported by the housing of the unspecified cassette 22 and connected to a driving gear 226B shown in FIG. 6. The height adjusting part 226A moves a position of a lower end of the height restriction member 226 in the vertical direction due to rotational driving to change the height h1 to be restricted by the height restriction member 226.

The width adjusting part 227A is rotatably supported by the housing of the unspecified cassette 22 and connected to a driving gear 227C shown in FIG. 6. The width adjusting part 227A changes a projection amount of the width restriction member 227 toward the tablet containing part 222 due to rotational driving to change the width w1 to be restricted by the width restriction member 227. Specifically, the projection amount of the width restriction member 227 toward the tablet containing part 222 is changed when each of the width adjusting part 227A and the elongated hole 227B is relatively moved in a direction of an arrowed line R3 (see FIG. 4) by the rotation of the width adjusting part 227A.

On the other hand, as shown in FIG. 7, the mounting part 221 includes a driving gear 221C engaged with the driving gear 226B when the unspecified cassette 22 is mounted on the mounting part 221 and a driving gear 221D engaged with the driving gear 227C when the unspecified cassette 22 is mounted on the mounting part 221. The driving gear 221C is connected to the driving motor 243 of the second driving part 24. The driving gear 221D is connected to the driving motor 244 of the second driving part 24.

As shown in FIGS. 6 and 7, the unspecified cassette 22 and the mounting part 221 include a driving gear 228A and a driving gear 228B engaged with each other when the unspecified cassette 22 is mounted on the mounting part 221. The driving gear 228A is connected to a raising and lowering mechanism (not shown in the drawings) for raising and lowering the first rotating body 223 in the vertical direction. The driving gear 228B is connected to a driving motor (not shown in the drawings). With this configuration, since driving force is transmitted from the driving gear 228B to the driving gear 228A when the driving motor is driven, it is possible to raise and lower the first rotating body 223 with the raising and lowering mechanism. Thus, in the medicine dispensing apparatus 100, it is possible to change a volume in the tablet containing part 222 and arbitrarily adjust the number of the tablets which can be contained in the tablet containing part 222 by raising and lowering the first rotating body 223. Thus, the unspecified cassette 22 can be used for both one use application in which the number of the tablets which are to be contained in the unspecified cassette 22 is small and another use application in which the number of the tablets which are to be contained in the unspecified cassette 22 is large.

In the unspecified cassette 22, the tablets in the tablet containing part 222 are discharged from the first rotating body 223 to the second rotating body 224 when the first rotating body 223 is rotated in a rotational direction R1 (see FIGS. 4 and 5). Further, in the unspecified cassette 22, the tablets on the second rotating body 224 are conveyed toward the dispensing port 225 when the second rotating body 224 is rotated in a rotational direction R2 (see FIGS. 4 and 5). In this case, the second rotating body 224 is one example of conveying means.

However, among the tablets conveyed by the second rotating body 224, the tablets stacked in the height direction will contact with the height restriction member 226 and return to the tablet containing part 222. Further, among the tablets conveyed by the second rotating body 224, the tablets conveyed in a state the tablets are arranged in line in the width direction will contact with the width restriction member 227 and return to the tablet containing part 222.

Thus, in the unspecified cassette 22, the tablets having a size corresponding to the height h1 to be restricted by the height restriction member 226 and the width w1 to be restricted by the width restriction member 227 are conveyed toward the dispensing port 225 one by one in a state that the tablets are arranged in line on the second rotating body 224 in a circumferential direction thereof. Therefore, the unspecified cassette 22 can dispense the tablets contained in the tablet containing part 222 in the unit of one tablet and control a dispensed amount of the tablets.

As described above, it is possible to change the height h1 to be restricted by the height restriction member 226 and the width w1 to be restricted by the width restriction member 227 by means of the unspecified cassette 22, thereby dispensing desired types of tablets in the unit of one tablet.

Further, as shown in FIGS. 1 and 4, a display part 25, which can change display contents thereof, is provided at each of the unspecified cassettes 22. In this case, each of the display parts 25 is an electronic paper which can keep displaying the display contents even in a non-energizing state once the display contents have been written in an energizing state.

Specifically, contact type connectors (not shown in the drawings) are respectively provided at each of the unspecified cassette 22 and each of the mounting parts 221. The contact type connectors provided at the unspecified cassette 22 and the mounting part 221 are connected with each other when the unspecified cassette 22 is mounted on the mounting part 221. The display part 25 is connected to the connector of the unspecified cassette 22 and the prescription control unit 1 is connected to the connector of the mounting part 221. When the unspecified cassette 22 is mounted on the mounting part 221, the display part 25 and the prescription control unit 1 are electrically connected through the connectors. This allows the prescription control unit 1 to change a display state of each of the display parts 25. The display part 25 is not limited to the electronic paper and may be other displaying means such as a liquid crystal display. Further, it may be considered that the display part 25 is provided at each of the mounting parts 221, on which each of the unspecified cassettes 22 corresponding to each of the mounting parts 221 is mounted.

As shown in FIG. 6, each of the unspecified cassettes 22 has a built-in RFID tag 26 for storing various information. The RFID tag 26 is a non-volatile storage medium which can rewrite stored information with the RFID reader writer 245. As described above, the RFID tag 26 is used for storing various information such as the cassette identification information for identifying each of the unspecified cassettes and the medicine information allocated to each of the unspecified cassettes 22. The RFID tag 26 is equipped on a control board provided in each of the unspecified cassettes 22. The control board has a function of changing the display state of the display part 25 of the unspecified cassette 22 according to a control signal from the prescription control unit 1. Further, on the control board, an electric circuit is provided. The electric circuit is driven by electric power supplied through the connector, electric power supplied from an electric storage part such as a battery equipped on the control board or electric power supplied at the time of writing the information to the RFID tag 26. Further, another configuration in which each of the unspecified cassettes 22 has another storage medium such as an EEPROM to which the prescription control unit 1 can read and write information through the connector instead of the RFID tag 26 may be considered as another embodiment.

[Powdered Medicine Supplying Unit 3]

As shown in FIG. 1, the powdered medicine supplying unit 3 has two supplying parts 31 and 32. The powdered medicine supplying unit 3 can supply powdered medicine supplied into each of the supplying parts 31 and 32 to the packaging unit 5 in units of packages which are predetermined by the prescription control unit 1 according to various information such as the administration time.

Specifically, the powdered medicine supplying unit 3 includes two dispensing parts. One dispensing part uniformly spreads powdered medicine supplied into the supplying part 31 into a disc shape to scrape out the uniformed powdered medicine for each specific angle interval corresponding to the units of packages. The other dispensing part uniformly spreads powdered medicine supplied into the supplying part 32 into a disc shape to scrape out the uniformed powdered medicine for each specific angle interval corresponding to the units of packages. Powdered medicine to be supplied into the powdered medicine supplying unit 3 is measured in advance with a weighing device as a total amount of a prescription medicine to be prescribed to a patient.

[Manual Packaging Unit 4]

The manual packaging unit 4 includes a manual distributing part on which there are provided a plurality of boxes into which tablets are respectively supplied in the units of packages according to various information such as the administration time and a manual dispensing part for selectively dispensing the tablets contained in the boxes from each of the boxes to the packaging unit 5. In the manual distributing part, the plurality of boxes are arranged in a matrix form. The manual dispensing part may take another configuration which can dispense the tablets contained in each of the boxes by selectively opening and closing a bottom surface of each of the boxes of the manual distributing part, for example. In the medicine dispensing apparatus 100, the manual packaging unit 4 is used for dispensing a small amount of tablets less than one tablet such as a half of tablet. Since the manual packaging unit 4 is well known, description to the manual packaging unit 4 is omitted in the specification. In the conventional art, the manual packaging unit 4 is also used for dispensing any types of tablets not contained in the specified cassettes 21. On the other hand, the medicine dispensing apparatus 100 can dispense desired types of tablets by utilizing the unspecified cassettes 22. Needless to say, the medicine dispensing apparatus 100 can dispense desired types of tablets not contained in the specified cassettes 21 by utilizing the manual packaging unit 4.

[Packaging Unit 5]

The packaging unit 5 packages medicines supplied from the tablet supplying unit 2, the powdered medicine supplying unit 3 or the manual packaging unit 4 into one sheet of packaging paper in the units of packages according to the various information such as the administration time. For example, the packaging unit 5 packages the medicines in the units of packages with a transparent or semi-transparent roll charta sheet and seals the medicines with welding or the like. This makes it possible to discharge the charta sheet, in which the medicines are packaged in the units of packages, from the packaging unit 5.

FIG. 8 is a view illustrating one example of a charta sheet 51 discharged from the packaging unit 5. As shown in FIG. 8, a plurality of sheets of packaging paper 52, in which a plurality of tablets are packaged in the units of packages, are continuously formed in the charta sheet 51. Further, cutoff dotted lines 52A (perforated lines) for easily separating each sheet of the packaging paper 52 are formed between the adjacent sheets of the packaging paper 52. In the case where prescription data contains powdered medicine, the packaging unit 5 can package the powdered medicine supplied from the powdered medicine supplying unit 3 into the sheet of the packaging paper 52 together with the tablets. Further, a printing part (not shown in the drawings) for printing information on each sheet of the packaging paper 52 is provided at the packaging unit 5 and the printing part can print prescription information such as a patient name, an administration time, a prescription medicine and a prescription amount on a surface of each sheet of the packaging paper 52.

[Packaging Control Unit 6]

As shown FIG. 2, the packaging control unit 6 includes a control part 61 and a storage part 62 and controls the tablet supplying unit 2, the powdered medicine supplying unit 3, the manual packaging unit 4, the packaging unit 5 and the like to allow the medicine dispensing apparatus 100 to carry out a packaging operation. The packaging control unit 6 is built in the medicine dispensing apparatus 100.

The control part 61 is control means having a CPU, a RAM, a ROM, an EEPROM or the like. The control part 61 controls the CPU to carry out various processes depending on various programs stored in storage means such as the ROM, the EEPROM and the storage part 62 in advance. The RAM and the EEPROM are utilized as a temporary storage memory (working area) for the various processes carried out by the CPU. The control part 61 may be an integrated circuit such as an ASIC or a DSP.

The storage part 62 is storage means such as a hard disk device or a SSD (Solid State Drive) for storing various data. Specifically, a packaging control program for allowing a computer such as the control part 61 to carry out a packaging control process described below (see a right side of FIG. 11) is stored in the storage part 62 in advance. The packaging control program is stored in a computer-readable storage medium such as a CD, a DVD and a semiconductor memory and retrieved from the storage medium by a reading device such as a disk drive (not shown in the drawings) to be installed into the storage part 12. It is possible to interpret the present invention as an invention of the computer-readable storage medium storing the packaging control program.

[Barcode Reader 8]

The barcode reader 8 can read a code for identifying a medicine. The barcode reader 8 reads the JAN code, the RSS code or the QR code (registered trade-mark) written on a tablet container (such as a box and a bottle) or a PTP sheet placed on a medicine shelf in a pharmacy. For example, the barcode reader 8 is a portable device such as a PDA. The barcode reader 8 may be an existing known picking auxiliary device which is used by a pharmacist or the like for picking out medicines. The picking auxiliary device is used when the pharmacist or the like picks out the medicines from the medicine shelf to manually prepare the medicines according to the prescription. For example, the picking auxiliary device identifies the medicines from the JAN code written on the container and matches the identified medicines with the prescription data.

Then, the information read by the barcode reader 8 is inputted into the prescription control unit 1 with wireless communication of the barcode reader 8. By utilizing the wireless communication in this manner, it is possible to freely bring the barcode reader 8 to the medicine dispensing apparatus 100 or the medicine shelf and carry out a work for supplying tablets into the unspecified cassettes 22 at an arbitrary location. Regardless to say, the barcode reader 8 may be connected to the prescription control unit 1 with a wired connection. In the case where a plurality of medicine dispensing apparatuses 100 are provided in the pharmacy, a plurality of barcode readers 8 are respectively provided in the plurality of medicine dispensing apparatuses 100 preliminarily associated to the plurality of barcode readers 8.

[Prescription Control Unit 1]

The prescription control unit 1 is a computer for totally controlling the medicine dispensing apparatus 100. As shown in FIGS. 1 and 2, the prescription control unit 1 includes a control part 11, a storage part 12, a monitor 13, an operating part 14, a communication IF 15 and the like.

The control part 11 is control means having a CPU, a RAM, a ROM, an EEPROM and the like. The control part 11 controls the CPU to carry out various processes depending on various programs stored in storage means such as the ROM, the EEPROM and the storage part 12 in advance. The CPU is a processor for carrying out the various processes. The RAM and the EEPROM are utilized as a temporary storage memory (working area) for the various processes carried out by the CPU. The control part 11 may be an integrated circuit such as an ASIC and a DSP.

The storage part 12 is storage means such as a hard disk device or a SSD (Solid State Drive) for storing various data. Specifically, a medicine dispensing program for allowing a computer such as the control part 11 or the like to carry out the medicine dispensing process described below (see a left side of FIG. 11) and an adjusting process described below (see FIG. 22) is stored in the storage part 12 in advance.

The medicine dispensing program is stored in a computer-readable storage medium such as a CD, a DVD and a semiconductor memory and retrieved from the storage medium by a reading device such as a disk drive (not shown in the drawings) to be installed into the storage part 12. It is possible to interpret the present invention as an invention of the computer-readable storage medium storing the medicine dispensing program.

The storage part 12 also stores various databases such as a medicine master, a patient master, a cassette master and a pharmacy master. The control part 11 can update the various databases stored in the storage part 12 based on data read from a storage medium such as a CD, a DVD and a semiconductor memory by a reading device such as a disk drive (not shown in the drawings). Further, the control part 11 can change items in the various databases depending on a user operation with respect to the operating part 14.

The medicine master contains information on each medicine such as a medicine ID, a medicine code, a medicine name, a JAN code (or an RSS code), a medicine bottle code, a category (a dosage form: powdered medicine, a tablet, pharmaceutical solution, a medicine for external use and the like), a medicine size (height and width), a specific gravity, a type of medicine (a common medicine, a poisonous medicine, a narcotic drug, a powerful medicine, an antipsychotic medicine, a therapeutic medicine or the like), a blending variation, an excipient and a precaution. The patient master contains information on a patient such as a patient ID, a name, a gender, an age, a medical history, a prescription medicine history, family information, a hospital department, a hospital ward and a hospital room. The pharmacy master contains information on a pharmacy such as a pharmacy name, a pharmacist name and a pharmacist ID. The cassette master is information indicating a correspondence relationship between cassette identification information of each of the specified cassettes and the medicine information allocated to each of the specified cassettes 21. The cassette master is registered by the control part 11 depending on, for example, a user operation with respect to the operating part 14 at the time of the initial setting of the medicine dispensing apparatus 100.

Further, the storage part 12 stores allocation information 121 indicating an allocation state between each of the unspecified cassettes 22, and the medicine information and driving correspondence information 122 indicating a correspondence relationship between the medicine information and the driving condition of each of the unspecified cassettes 22. The allocation information 121 and the driving correspondence information 122 are used in the medicine dispensing process (described below) carried out by the control part 11.

FIG. 9 is a view illustrating one example of the allocation information 121. FIG. 10 is a view illustrating one example of the driving correspondence information 122.

As shown in FIG. 9, medicine IDs respectively indicating types of medicines allocated to each of the unspecified cassettes 22 at present are stored in the allocation information 121 as medicine information. Regardless to say, other medicine information such as a tablet name, a medicine code and a JAN code (or an RSS code) may be stored instead of the medicine ID. Here, it is assumed that cassette numbers "C1" to "C4" are preliminarily set to the four unspecified cassettes 22 which are arranged in the tablet supplying unit 2 from left to right in turn. The cassette identification information is further stored in the RFID tag 26 of each of the unspecified cassettes 22. In the allocation information 121, a message indicating "non-allocation state" is stored in the unspecified cassette 22 which has not yet been subjected to the allocation of the medicine information. Specifically, in the allocation information 121 shown in FIG. 9, medicine information having a medicine ID "M1" is allocated to the unspecified cassette 22 having the cassette number "C1", medicine information having a medicine ID "M2" is allocated to the unspecified cassette 22 having the cassette number "C3", and messages indicating the non-allocation state are respectively allocated to the unspecified cassettes having the cassette numbers "C2" and "C4". It is noted that a data structure of the allocation information 121 shown in FIG. 9 is merely one example and the allocation information 121 may be information stored in the storage part 12 as, for example, one element of the medicine master. In this case, the cassette identification information for each of the unspecified cassettes 22 to which medicines contained in the medicine master are respectively allocated is stored so as to correspond to the medicines.

Further, as shown in FIG. 10, driving conditions predetermined so as to respectively correspond to the medicine information are contained in the driving correspondence information 122. Each of the driving conditions contains three conditions including a previous driving condition related to adjustment of the unspecified cassette 22 before a start of a dispensation of the tablets from the unspecified cassette 22, an under-driving condition related to driving control during the dispensation of the tablets from the unspecified cassette 22 and a driving stop condition related to driving control to be performed when the dispensation of the tablets from the unspecified cassette 22 is stopped.

Specifically, the example of the driving correspondence information 122 is shown in FIG. 10 as the driving conditions respectively corresponding to the tablets having the medicine IDs of "M1", "M2", "M3" and "M4". The driving correspondence information 122 contains information related to items of a height of the dispensing path, a width of the dispensing path, a dispensing speed, a first slowdown, a second slowdown and a reverse rotation operation. It is noted that the driving condition described above is merely one example. For example, in the case where the unspecified cassette 22 dispenses the tablets one by one with utilizing vibration, it may be considered that a frequency or amplitude of the vibration or the like is defined as the driving condition.

The height of the dispensing path and the width of the dispensing path are merely examples of the previous driving condition. The height of the dispensing path and the width of the dispensing path are values of the height h1 and the width w1 (see FIG. 5) which are preliminarily set as values for dispensing the tablets one by one from the dispensing port 225 by the second rotating body 224 of the unspecified cassette 22.

The dispensing speed is merely one example of the under-driving condition. The dispensing speed is a rotating speed suitable for each of the medicine information as a rotating speed of the second rotating body 224 at the time of the dispensation of the tablets from the unspecified cassette 22. For example, if the size of the tablet is small and the rotating speed of the driving motor 242 is fast, tablets are likely to be dispensed more than necessary until the driving motor 242 is stopped. On the other hand, if the size of the tablet is large, the tablets are not dispensed more than necessary until the driving motor 242 is stopped even if the rotating speed of the driving motor 242 is fast. Thus, the dispensing speed of the tablets set as the driving condition, that is, a conveying speed of the tablets by means of the second rotating body 224 may be variable depending on the size of the tablet to be dispensed. Specifically, in the case where the size of the tablet is large, the dispensing speed may be set so as to be slower than the dispensing speed in the case where the size of the tablet is small. The dispensing speed is not limited to a form of "tablets/min" shown in FIG. 10. The dispensing speed may be stored in a form of the rotating speed of the second rotating body 224, the rotating speed of the driving motor 242 or the like. Further, not only the rotating speed of the second rotating body 224 but also a rotating speed of the first rotating body 223 may be set as the driving condition.

The first slowdown and the second slowdown are merely examples of the driving stop condition. The first slowdown and the second slowdown are information related to execution timing of slowdown for starting to gradually decrease the rotating speed of the second rotating body 224 when the dispensation of the tablets from the unspecified cassette 22 is stopped. The first slowdown defines timing for decreasing the rotating speed of the second rotating body 224 to a predetermined first rotating speed. Further, the second slowdown defines timing for decreasing the rotating speed of the second rotating body 224 from the first rotating speed to a second rotating speed slower than the first rotating speed. For example, in the case where the tablet contained in the unspecified cassette 22 has a rounded shape and is likely to be rolled, there is a risk in that the tablet is rolled and thus dispensed after the driving of the second rotating body 224 is stopped. Thus, for the tablet having a shape such as a spherical shape which is likely to be rolled, start timing for each of the first slowdown and the second slowdown is set to be earlier. In this embodiment, the start timing for each of the first slowdown and the second slowdown is set depending on the remaining number of the tablets to be dispensed from the unspecified cassette 22. With this configuration, it is possible to prevent tablets from being dispensed more than necessary when the dispensation of the tablets from the unspecified cassette 22 is stopped. On the other hand, for the tablet having a shape which is not likely to be rolled when the dispensation of the tablets from the unspecified cassette 22 is stopped, the start timing for each of the first slowdown and the second slowdown is set to be later. Thus, it is possible to suppress delay of dispensing time caused by unnecessary slowdown.

In this embodiment, although description will be given to the case where the start timing of each of the first slowdown and the second slowdown is set as the driving stop condition, it may be considered that deceleration of the rotating speed of the second rotating body 224 is set as the driving stop condition. For example, in the case where the tablet has the shape such as a spherical shape which is likely to be rolled, there is a risk in that the tablets are rolled when the second rotating body 224 is suddenly stopped and tablets are dispensed more than necessary. Thus, for the tablet has the shape which is likely to be rolled, it may be considered that the deceleration is set to be smaller.

Further, the item of the reverse rotation operation is merely one example of the driving stop condition. The item of the reverse rotation operation is information related to a condition for determining whether or not a reverse rotation operation, which switches a conveying direction of the tablets to a reverse direction by means of the second rotating body 224, is carried out at the time of stopping the dispensation of the tablets from the unspecified cassette 22. For example, for the tablet having the shape such as the spherical shape, which is likely to be rolled and has a risk in that the tablets remaining on the second rotating body 224 are likely to be rolled and be dispensed more than necessary when only the driving of the second rotating body 224 is stopped, the reverse rotation operation is set to be "ON". This makes it possible to prevent the tablets from being dispensed more than necessary at the time of stopping the dispensation of the tablets from the unspecified cassette 22. On the other hand, for the tablet having the shape, which is not likely to be rolled when the driving of the second rotating body 224 is stopped, the reverse rotation operation is set to be "OFF". In this case, the reverse rotation operation is unnecessary and not carried out.

It is noted that the data structure of the driving correspondence information 122 shown in FIG. 10 is merely one example and the driving condition defined in the driving correspondence information 122 may be stored in the storage part 12 as, for example, one element of the medicine master.

Further, in this embodiment, description will be given to the exemplary case where the driving correspondence information 122 contains each item of the height of the dispensing path, the width of the dispending path, the dispensing speed, the first slowdown, the second slowdown and the reverse rotation operation as the driving condition (see FIG. 10) corresponding to each medicine information. On the other hand, another configuration in which the medicine dispensing apparatus 100 utilizes one or more of the items of the height of the dispensing path, the width of the dispensing path, the dispensing speed, the first slowdown, the second slowdown and the reverse rotation operation as the driving condition may be considered as another embodiment. Namely, one or more of the previous driving condition, the under-driving condition and the driving stop condition may be set in the medicine dispensing apparatus 100 as the driving condition corresponding to each of the medicine information in advance. Furthermore, another configuration in which a plurality of conditions such as the previous driving condition, the under-driving condition and the driving stop condition are set as the driving condition corresponding to each of the medicine information in advance and the medicine dispensing apparatus 100 can select one or more of the conditions such as the previous driving condition, the under-driving condition and the driving stop condition as the driving condition to be used may be considered as another embodiment.

The monitor 13 is displaying means such as a liquid crystal display for displaying various information and an operation screen according to a control command from the control part 11. For example, various information such as an input screen for inputting prescription data and a selection screen for selecting prescription data is displayed on the monitor 13.

The operating part 14 is operating means such as a keyboard, a mouse and a touch panel for receiving a user operation. The operating part 14 inputs an operation signal corresponding to the user operation into the control part 11. For example, the operating part 14 receives various operation inputs such as an input operation for the prescription data at the input screen displayed on the monitor 13, a selection operation for the prescription data at the selection screen displayed on the monitor 13 and an issuing operation of the prescription data for requesting a start of the packaging operation according to the prescription data.

The communication IF 15 is a communication interface for connecting the medicine dispensing apparatus 100 to a communication network N3 such as a LAN. The communication IF 15 carries out data communication between the medicine dispensing apparatus 100 and a host system such as a prescription input terminal 200 connected through the communication network N3. For example, the prescription input terminal 200 is an electronic medical record system provided in a hospital or a nursing facility, a prescription management system provided in a pharmacy inside or outside a hospital or the like. The communication IF 15 also includes a wireless communication interface such as a wireless communication card for carrying out wireless data communication between the medicine dispensing apparatus 100 and various wireless communication devices such as the barcode reader 8.

The communication IF 15 receives prescription data from the prescription input terminal 200 to input the prescription data into the control part 11. For example, the communication IF 15 monitors whether or not the prescription data is stored in a predetermined storage area of storage means provided in the prescription input terminal 200. In the case where the prescription data is stored in the predetermined storage area of the storage means, the communication IF 15 retrieves the prescription data from the predetermined storage area. Needless to say, the communication IF 15 may receive the prescription data transmitted from the prescription input terminal 200.

[Medicine Dispensing Process and Packaging Control Process]

Hereinafter, description will be given to examples of procedures of the medicine dispensing process carried out by the control part 11 of the prescription control unit 1 in the medicine dispensing apparatus 100 and the packaging control process carried out by the control part 61 of the packaging control unit 6 in the medicine dispensing apparatus 100 with reference to FIG. 11. Hereinafter, the procedures (steps) carried out by the control part 11 will be referred to as step S1, S2 . . . and the procedures (steps) carried out by the control part 61 will be referred to as step S11, S12 . . . . In this regard, a series of processes, which are carried out by either one of the control part 11 and the control part 61 and can provide the same results as results of the medicine dispensing process and the packaging control process, may be carried out.

(Prescription Control Unit 1 Side: Step S1)

First, at a step S1, the control part 11 determines whether or not an issuing request for prescription data is issued. Specifically, in the case where an issuing operation for issuing the prescription data registered in advance is carried out with respect to the operating part 14, the control part 11 determines that the issuing request for the prescription data is issued. The prescription data is prescription data obtained from a host system such as the prescription input terminal 200 or registered by a user operation with respect to the operating part 14 and then stored in the storage part 12.

The control part 11 holds the process at the step S1 on standby until the issuing request for the prescription data is issued (the case of determining "No" at the step S1). On the other hand, the control part 11 shifts the process to a step S2 in the case where the control part 11 determines that the issuing request for the prescription data is issued (the case of determining "Yes" at the step S1). In this regard, another configuration in which the control part 11 determines that the issuing request for the prescription data is issued without detecting the issuing operation when the prescription data is received from the host system such as the prescription input terminal 200 and then shift the process to the step S2 may be considered as another embodiment.

(Prescription Control Unit 1 Side: Step S2)

Next, at the step S2, the control part 11 determines whether or not there exist the specified cassettes 21 which correspond to all of medicine information inputted as medicine information specified in the prescription data in which tablets are designated to be dispensed. Specifically, the control part 11 determines, on the basis of the cassette master stored in the storage part 12, whether or not types of tablets not allocated to the specified cassettes 21 are contained in the prescription data. The cassette master is updated by the control part 11 on the basis of medicine information, which is read from the RFID tags (not shown in the drawings) respectively provided at the specified cassettes 21, by means of a reading device such as the RFID reader writer 232 respectively provided at the mounting parts 211. Further, it is also possible that the control part 11 allows the monitor 13 to display an edit screen for editing the cassette master to update the cassette master according to a user operation with respect to the operating part 14 at the edit screen.

In the case where the control part 11 determines that the specified cassettes 21 corresponding to all of the medicine information on the tablets to be dispensed do not exist (the case of determining "No" at the step 2), that is, in the case where the types of tablets not allocated to the specified cassettes 21 are specified in the prescription data as prescription medicines, the control part 11 shifts the process to a step S3.

On the other hand, in the case where the control part 11 determines that the specified cassettes 21 corresponding to all of the medicine information on the tablets to be dispensed exist (the case of determining "Yes" at the step S2), that is, in the case where all types of tablets specified in the prescription data as the prescription medicines are respectively contained in the specified cassettes 21, the control part 11 shifts the process to a step S7. In this case, at the step S7, a start request for the packaging operation which is the same as the conventional art is transmitted to the control part 61 through each of the specified cassettes 21 and the control part 61 carries out a process for starting the packaging operation.

In another configuration in which the medicine dispensing apparatus 100 does not include any specified cassettes 21, it is possible to omit the step S2 from the process and directly shift the process from the step S1 to the step S3 when the control part 11 determines that the issuing request for the prescription data is issued at the step S1.

Further, allocation exclusion medicine information which is set in advance may be stored in the storage part 12 as medicine information which is not to be allocated to the unspecified cassettes 22. Furthermore, in the case where the specified cassette 21 corresponding to the medicine information on the tablet to be dispensed does not exist and the medicine information on the tablets to be dispensed matches the allocation exclusion medicine information, the control part 11 may allow the monitor 13 to display a message indicating that the manual packaging unit 4 should be used without allocating the medicine information to one of the unspecified cassettes 22. For example, if a tablet which has high possibility that the tablet allows colored powder to adhere to the unspecified cassette 22 is set as the allocation exclusion medicine information, it is possible to prevent the colored powder from adhering to another tablet which is to be subsequently contained in the unspecified cassette 22. Further, medicine information on a tablet, which has a shape not suitable for the dispensation from the unspecified cassette 22, may be set as the allocation exclusion medicine information. In this case, the control part 11 allows the monitor 13 to display a message indicating that the manual packaging unit 4 should be used. Another configuration in which the control part 11 determines whether or not the medicine information on the tablet to be dispensed matches the allocation exclusion medicine information without determining whether or not the specified cassette 21 corresponding to the medicine information on the tablets to be dispensed exists may be considered as another embodiment. In this case, another configuration in which the control part 11 allows the monitor 13 to display a message indicating that the manual packaging unit 4 should be used without allocating the medicine information to one of the unspecified cassettes 22 when the medicine information on the tablets to be dispensed matches the allocation exclusion medicine information may be considered as another embodiment.

(Prescription Control Unit 1 Side: Step S3)

At the step S3, among the inputted medicine information on the tablets designated to be dispensed by the prescription data, medicine information that has no corresponding specified cassette 21 is allocated by the control part 11 to an unspecified cassette 22 which has not been allocated. In the case where a plurality of medicine information having no corresponding specified cassettes 21 are contained in the prescription data, the control part 11 allocates the plurality of medicine information to the unspecified cassettes 22 respectively. In the case where the medicine information on the tablets to be dispensed is inputted by the prescription data in this manner, the control part 11 carries out this process (allocating step) for allocating the medicine information to one of the unspecified cassettes 22. The control part 11 carrying out such a process is one example of allocating means.

Specifically, the control part 11 carries out a process for identifying the unspecified cassette 22, which is in a communication possible state (controllable state) at present, among the unspecified cassettes 22. For example, the control part 11 determines that the unspecified cassette 22, for which reading of information from the RFID tag 26 by means of the RFID reader writer 232 completes, is in the communication possible state among the unspecified cassettes 22.

Then, the control part 11 determines, on the basis of allocation information 121 (see FIG. 9), whether or not current medicine information has been allocated to one of the unspecified cassettes 22 in the communication possible state to allocate the medicine information on the medicine to be dispensed to the unspecified cassette 22 which has not yet been subjected to the allocation. At this time, the control part 11 selects one of the unspecified cassettes 22 to which the medicine information should be allocated and then updates the contents of the allocation information 121 according to this allocation result. The unspecified cassette 22 to which the medicine information is allocated in this manner can communicate with the control part 11 and write information to the electronic paper 25 by means of the control part 11. The control part 11 may pick out each of the unspecified cassettes as candidates for allocation objects without determining whether or not each of the unspecified cassettes 22 is in the communication possible state.

In this step, there is possibility that there exist a plurality of candidates for the unspecified cassette 22 to which the medicine information should be allocated. In this case, the control part 11 may determine, on the basis of a predetermined priority order, whether or not each of the unspecified cassettes 22 has been already subjected to the allocation of the medicine information. Then, the control part may allocate the medicine information to the unspecified cassette 22 which is first determined that the medicine information has not yet been subjected to the allocation. Further, the control part 11 may determine whether or not each of the medicine information has been already allocated to each of the unspecified cassettes 22 in order from the unspecified cassette 22 having a less use frequency. Then, the control part may allocate the medicine information to the unspecified cassette 22 which is first determined that the medicine information has not yet been subjected to the allocation so that the use frequencies of the unspecified cassettes 22 are equalized with each other. Furthermore, the control part 11 may select the unspecified cassette 22 to which the medicine information was allocated just before among the unspecified cassettes 22, if the allocated medicine information is the same as the present medicine information on the tablets to be dispensed in this time or a tablet size contained in the allocated medicine information is close to that of the tablets to be dispensed in this time. In the case where the unspecified cassette 22 to which the medicine information has not yet allocated does not exist, the control part 11 allows the monitor 13 to display a message indicating that the unspecified cassette 22 does not exist to report it to the user.

At the step S3, the control part 11 controls the RFID reader writer 232 to store the medicine information, which is allocated to the unspecified cassette 22, in the RFID tag 26 of each of the unspecified cassettes 22 to which the medicine information is allocated. At this time, the control part 11 may store, on the basis of the prescription data, various information such as a dispensed amount of the tablets indicated in the medicine information, a patient name, an allocation time and date, a pharmacist name in charge and identification information of prescription in the RFID tag 26 of the unspecified cassette 22 together with the medicine information.

On the other hand, another configuration in which the medicine information is not stored in the RFID tag 26 of the unspecified cassette 22 may be considered as another embodiment. Specifically, a configuration in that the cassette identification information is stored in the RFID tag 26 in advance and the RFID reader writer 245 is an RFID reader which can only read information. In this case, the control part 11 also recognizes the medicine information allocated to the unspecified cassette 22 on the basis of the allocation information (see FIG. 9) and the cassette identification information read from the RFID tag 26.

(Prescription Control Unit 1 Side: Step S4)

At the step S4, the control part 11 identifies a driving condition corresponding to the medicine information on the tablets to be dispensed on the basis of the driving correspondence information 122 (see FIG. 10) to transmit, to the control part 61, the driving condition and the cassette identification information of the unspecified cassette 22 to which the medicine information is allocated. With this configuration, the control part 61 can drive the unspecified cassette 22 according to the driving condition. In the case of driving the unspecified cassette 22 by carrying out the process at the step S4, the control part 11 driving the unspecified cassette 22 according to the driving condition may be considered as driving control means.

Another configuration in which the control part 11 allows the monitor 13 to display the cassette identification information of each of the unspecified cassettes 22 and setting contents of the driving conditions respectively corresponding to the unspecified cassettes 22 and changes the setting contents of the driving conditions according to a user operation with respect to the operating part 14 may be considered as another embodiment. In this regard, the changed setting contents of the driving condition are reported from the control part 11 to the control part 61. This makes it possible to change the driving condition of the unspecified cassette 22 at the time of dispensing the tablets from the unspecified cassette 22 depending on a user arbitrary operation input. Further, the user can confirm the setting contents of the driving condition corresponding to the medicine information on the tablets to be dispensed by referring to the monitor 13.

Further, at the step S4, in the case where the driving condition corresponding to the medicine information is not stored in the driving correspondence information 122, the control part 11 may shift the process to a step S5 after carrying out the adjusting process described below. With this configuration, it is possible to dispense even tablets corresponding to the medicine information which is not stored in the driving correspondence information 122 with the unspecified cassette 22.

(Packaging Control Unit 6 Side: Step S11)

On the other hand, in the packaging control unit 6, the control part 61 determines whether or not the driving condition is received from the control part 11 at a step S11. The control part 61 shifts the process to a step S12 in the case where the control part 61 determines that the driving condition is received (the case of determining "Yes" at the step S11). On the other hand, the control part 61 shifts the process to a step S13 in the case where the control part 61 determines that the driving condition is not received (the case of determining "No" at the step S11). The control part 61 associates the driving condition received from the control part 11 with the cassette identification information of the unspecified cassette 22, to which the medicine information is allocated, to store the driving condition in the storage part 62.

(Packaging Control Unit 6 Side: Step S12)

At the step S12, the control part 61 drives the unspecified cassette 22 corresponding to the cassette identification information received together with the driving condition according to the previous driving condition of the driving condition to change the height of the dispensing path and the width of the dispensing path. Thus, in the medicine dispensing apparatus 100, in the case where the driving condition contains the previous driving condition, the control part 61 drives the unspecified cassette 22 according to the previous driving condition (the height and the width of the dispensing path) and then carries out the dispensation of the tablets from the unspecified cassette 22 (step S14).

Specifically, the control part 61 controls the height adjusting part 226A and the width adjusting part 227A according to the driving condition to change a type of tablet which can be currently dispensed from the unspecified cassette 22 in the unit of one tablet to a type of tablet designated by the medicine information allocated at the step S3. First, the control part 61 drives the driving motor 233 and the driving motor 234 to return positions of the height restriction member 226 and the width restriction member 227 to initial states. Then, the control part 61 drives the height adjusting part 226A with the driving motor 233 to change the height h1 to be restricted by the height restriction member 226 of the unspecified cassette 22 to the height of the dispensing path designated by the driving condition. Further, the control part 61 drives the width adjusting part 227A with the driving motor 234 to change the width w1 to be restricted by the width restriction member 227 of the unspecified cassette 22 to the width of the dispensing path designated by the driving condition. Needless to say, if the control part 61 takes another configuration which can detect current status of the height restriction member 226 and the width restriction member 227, the control part 61 can drive the driving motor 233 and the driving motor 234 on the basis of that detection result.

Once the height h1 and the width w1 of the dispensing path are changed according to the driving condition in this manner, the unspecified cassette 22 can one by one dispense the tablets designated to be dispensed by the medicine information allocated at the step S3 and control the dispensed amount of the tablets. In this case, the control part 61 carrying out the process at the step S12 (driving control step) is one example of driving control means.

In this regard, there is possibility that the unspecified cassette 22 is in a state that the unspecified cassette 22 is not mounted on the mounting part 221 at the time of allocating the medicine information to the unspecified cassette 22. In this case, the control part 61 cannot drive the unspecified cassette 22 according to the driving condition at the step S12. Thus, the control part 61 stores flag information indicating whether or not the driving condition received from the control part 11 is reflected to the unspecified cassette 22 in the storage part 62 and updates the flag information as required. The control part 61 refers to the flag information at the time of starting the packaging operation at a step S14 described below. In the case where the driving condition is not reflected to the unspecified cassette 22 to be used in the packaging operation, the control part 61 drives the unspecified cassette 22 according to the previous driving condition to change the height h1 and the width w1 of the dispensing path before the packaging operation is carried out.

Another configuration in which the driving condition does not contain the previous driving condition and the height h1 and the width w1 of the dispensing path can be arbitrarily adjusted by manually activating the height adjusting part 226A and the width adjusting part 227A of the unspecified cassette 22 may be considered as another embodiment. In this case, the user adjusts the height h1 and the width w1 of the dispensing path of the unspecified cassette 22 and then mounts the unspecified cassette 22 on the mounting part 221 of the tablet supplying unit 2. The height adjusting part 226A and the width adjusting part 227A may take configurations in which the height adjusting part 226A and the width adjusting part 227A can be activated by a rotating operation with a tool such as a driver, for example.

(Prescription Control Unit 1 Side: Step S5)

Next, at a step S5, the control part 11 allows the display part 25 of the unspecified cassette 22 to which the medicine information is allocated at the step S3 to display the medicine information allocated to the unspecified cassette 22.

For example, the control part 11 extracts information on predetermined display items from the prescription data to allow the display part 25 to display the information. Specifically, the display part 25 displays a medicine name (medicine ID) of the tablet allocated to the unspecified cassette 22, a dispensed amount (amount to be dispensed) and a JAN code (barcode). In this regard, other various information such as a patient name, an allocation time and date and an allocation person in charge may be displayed on the display part 25.

Since the display part 25 is the electronic paper, a display state of the display part 25 is kept even if the unspecified cassette 22 is removed from the mounting part 221 after the medicine information is displayed at the step S5. Thus, for example, even if the user brings the unspecified cassette 22 into the medicine shelf or the like, the user can confirm the medicine information on the tablet to be supplied into the unspecified cassette 22 by visually inspecting the display part 25. Thus, it is possible to suppress human errors of the user at the time of supplying the tablets into the unspecified cassette 22. Further, it is possible to take another configuration which prohibits the unspecified cassette 22 from being removed from the mounting part 221 with a locking mechanism provided at the mounting part 221 until the medicine information is displayed on the display part 25 of the unspecified cassette 22 by the control part 11. Furthermore, the control part 11 may carry out the step S5 on condition that the control part 11 has completed the adjustments of the height of the dispensing path and the width of the dispensing path of the unspecified cassette 22 according to the previous driving condition for the unspecified cassette 22.

(Prescription Control Unit 1 Side: Step S6)

Then, at a step S6, the control part 11 determines whether or not a supplying complete operation, which means that the supplying of the tablets into the unspecified cassette 22 is completed, is carried out with respect to the operating part 14. Specifically, the user removes the unspecified cassette 22 from the tablet supplying unit 2 after the medicine information is allocated to the unspecified cassette 22 at the step S3 and then the medicine information is displayed on the display part 25 of the unspecified cassette 22. Then, the user supplies the tablets in a required amount into the unspecified cassette 22 with referring to a prescription sheet corresponding to the prescription data or the medicine information displayed on the display part 25. Then, the user mounts the unspecified cassette 22 to the tablet supplying unit 2 to carry out the supplying complete operation with respect to the operating part 14. In the case where a plurality of medicine information are allocated to the plurality of unspecified cassettes 22 at the step S3, the control part 11 determines whether or not a plurality of supplying complete operations of the tablets are carried out for all of the unspecified cassettes 22 respectively corresponding the plurality of medicine information at the step S6.

The control part 11 holds the process at the step S6 on standby until the supplying complete operation is carried out (the case of determining "No" at the step S6). On the other hand, the control part 11 shifts the process to a step S7 when the control part 11 determines that the supplying complete operation is carried out (the case of determining "Yes" at the step S6).

(Prescription Control Unit 1 Side: Step S7)

At the step S7, the control part 11 transmits a start request for the packaging operation based on the prescription data to the control part 61.

Especially, for the packaging operation of tablets which are not contained in the specified cassettes 21 but contained in the medicine information and designated to be dispensed by the prescription data, the control part 11 transmits the start request, for example, in the following procedures.

First, the control part 11 retrieves the cassette identification information of each of the unspecified cassettes from the RFID tags 26 of the unspecified cassettes 22 respectively mounted on the mounting parts 211 to identify the unspecified cassettes 22 respectively mounted on the mounting parts 221 at present. This allows the control part 11 to identify the unspecified cassettes 22 respectively mounted on the mounting parts 221, thus the user can arbitrarily mount each of the unspecified cassettes 22 on any one of the mounting parts 221. For example, in the case where the unspecified cassettes 22 are again mounted on the mounting parts 221 so that mounting positions of the unspecified cassettes are changed after the plurality of medicine information are allocated to the plurality of unspecified cassettes 22 at the step S3 and each of the unspecified cassettes 22 is removed from each of the mounting parts 211, the control part 11 can recognize the mounting parts 221 on which the unspecified cassettes 22 are respectively mounted.

Among the unspecified cassettes 22, the control part 11 identifies, on the basis of the allocation information 121, each of the unspecified cassettes 22 in which tablets indicated in the medicine information are contained on the basis of the prescription data. Then, for each of the medicine information specified in the prescription data, the control part 11 transmits information required for the packaging operation, such as the cassette identification information of the unspecified cassette 22 to which the medicine information is allocated, the identification information of the mounting part 221 on which the unspecified cassette 22 is mounted and the dispensed amount of tablets, to the control part 61.

(Packaging Control Unit 6 Side: Step S13)

On the other hand, in the packaging control unit 6, the control part 61 determines whether or not the start request for the packaging operation is received from the control part 11 at a step S13. The control part 61 shifts the process to a step S14 in the case where the start request for the packaging operation is received (the case of determining "Yes" at the step S13). On the other hand, the control part 61 shifts the process to the step S14 in the case where the start request for the packaging operation is not received (the case of determining "No" at the step S13).

(Packaging Control Unit 6 Side: Step S14)

At the step S14, according to the start request for the packaging operation, the control part 61 carries out the packaging operation in which required medicines are dispensed by the tablet supplying unit 2, the powdered medicine supplying unit 3 and the manual packaging unit 4 and then the packaging unit 5 packages the medicines in the units of packages according to various information such as the administration time. In this specification, description will be given to a dispensing operation for dispensing tablets by means of the tablet supplying unit 2, but description of controls for the powdered medicine supplying unit 3, the manual packaging unit 4 and the packaging unit 5 is omitted because these controls are the same as the conventional art.

According to the driving condition corresponding to the medicine information allocated at the step S3, for the tablet supplying unit 2, the control part 61 changes the rotating speed of the driving motor 242 of the second driving part 24 which is driven at the time of the dispensation of the tablets from the unspecified cassette 22. Namely, the rotating speed of the second rotating body 224 at the time of the dispensation of the tablets from the unspecified cassette 22 is changed to change the dispensing speed of the tablets from the unspecified cassette 22 depending on the type of tablet. In this case, the control part 61 carrying out this process is one example of driving control means.

Specifically, the control part 61 drives the driving motor 241 and the driving motor 242 corresponding to the unspecified cassette 22 to which the medicine information on the tablets to be dispensed is allocated to dispense the tablets by rotating the first rotating body 223 and the second rotating body 224. At this time, the control part 61 drives the driving motor 242 according to the dispensing speed defined as the driving condition corresponding to the medicine information in the driving correspondence information 122. With this configuration, in the unspecified cassette 22, the dispensing speed of the tablets by means of the second rotating body 224 is changed to suitable speed for the type of tablet. In the medicine dispensing apparatus 100, the control part 61 drives the unspecified cassette 22 according to the under-driving condition (dispensing speed) to dispense the tablets from the unspecified cassette 22 in the case where the driving condition contains the under-driving condition as described above.

In the case where the unspecified cassette 22 takes another configuration in which the unspecified cassette 22 does not include the height restriction member 226 and the width restriction member 227, the control part 61 may change only the dispensing speed of the tablets from the unspecified cassette 22. Further, the driving speed of the driving motor 241 may be constant or changed depending on the type of tablet. In the packaging operation, the number of the tablets dispensed from the unspecified cassette 22 is counted by a counter (not shown in the drawings) having an optical sensor provided at the dispensing port 225 of the unspecified cassette 22 and then inputted into the control part 61 as a discharged number. With this configuration, the control part 61 can control the driving of the unspecified cassette 22 on the basis of the discharged amount inputted from the counter to dispense the tablets from the unspecified cassette 22 in the predetermined dispensed amount (prescription amount).

The control part 61 carries out a stopping control for stopping the dispensation of the tablets from the unspecified cassette 22 according to setting values of the first slowdown and the second slowdown defined as the driving condition corresponding to the medicine information in the driving correspondence information 122. In this case, the control part 11 carrying out this process is one example of driving control means. In the medicine dispensing apparatus 100, in the case where the driving condition contains the driving stop condition as described above, the control part 61 stops the driving of the unspecified cassette 22 according to the first slowdown and the second slowdown which are the driving stop condition when the dispensation of the tablets in the prescription amount defined by the prescription data terminates.

Specifically, it is assumed that the first slowdown is set to be "6 tablets" and the second slowdown is set to be "1 tablet" in the driving correspondence information 122. In this case, the control part 61 decreases the rotating speed of the driving motor 242 to the first rotating speed when the control part 61 determines that the remaining number of the tablets reaches to "6 tablets" on the basis of the number of the tablets counted by the counter using the optical sensor (not shown in the drawings) provided at the dispensing port 225. Then, the control part 61 further decreases the rotating speed of the driving motor 242 to the second rotating speed when the control part 61 determines that the remaining number of the tablets reaches to "1 tablet" on the basis of the number of the tablets counted by the counter using the optical sensor (not shown in the drawings) provided at the dispensing port 225. With this configuration, in the case where the tablets having the shape which is likely to be rolled are placed on the second rotating body 224, it is possible to prevent the tablets from being dispensed more than necessary.

Further, the control part 61 carries out the stopping control for stopping the dispensation of the tablets from the unspecified cassette 22 according to the status of the reverse rotation operation defined as the driving condition corresponding to the medicine information in the driving correspondence information 122. In this case, the control part 11 carrying out this process is one example of driving control means. In the medicine dispensing apparatus 100, in the case where the driving condition contains the driving stop condition as described above, the control part 61 drives the unspecified cassette 22 according to the status of the reverse rotation operation which is the driving stop condition when the dispensation of the tablets in the prescription amount predetermined by the prescription data terminates and then stops the driving of the unspecified cassette 22.

Specifically, in the case where the reverse rotation operation in the driving correspondence information 122 is set "ON", the control part 61 carries out the reverse rotation operation for switching the conveying direction of the tablets by the second rotating body 224 to a reverse direction at the time of stopping the dispensation of the tablets from the unspecified cassette 22. For example, when the number of the tablets counted by the counter using the optical sensor (not shown in the drawings) provided at the dispensing port 225 reaches the dispensed amount, the control part 61 allows the driving motor 242 to rotate in a reverse direction for a predetermined period which is set in advance. With this configuration, in the case where tablets having the shape being likely to be rotated are put on the second rotating body 224, it is possible to prevent the tablets from being dispensed from the dispensing port 225 more than necessary. Further, it is possible to take another configuration in which an opening closing shutter is provided at the dispensing port 225 and the shutter is closed when the number of the tablets counted by the counter reaches the dispensed amount.

On the other hand, in the case where the reverse rotation operation in the driving correspondence information 122 is set "OFF", the control part 61 does not carry out the reverse rotation operation, which is unnecessary in this case, at the time of stopping the dispensation of the tablets from the unspecified cassette 22. Timing for starting the reverse rotation operation may be the time when the number of the tablets counted by the counter reaches a number which is less than the dispensed amount by a predetermined number. In the case of starting the reverse rotation operation at this timing, the predetermined numbers corresponding to each of the medicine information are stored in the driving correspondence information 122 in advance. This makes it possible to start the reverse rotation operation before the number of the tablets counted by the counter reaches the dispensed amount, and thereby preventing the tablets from being dispensed from the dispensing port 225 more than necessary. Further, the reverse rotation operation may be carried out each time one tablet is dispensed after the number of tablets counted by the counter reaches a number less than the dispensed amount by the predetermined number.

In this embodiment, the configuration in which the height h1 of the height restriction member 226 and the width w1 of the width restriction member 227 of the unspecified cassette 22 are changed according to the driving condition at the step S4 is described as one example. On the other hand, another configuration in which the control part 61 changes the height h1 of the height restriction member 226 and the width w1 of the width restriction member 227 just before the packaging operation is started at the step S7 may be considered as another embodiment. Namely, the reflection of the previous driving condition to the unspecified cassette 22 may be carried out at any timing as long as the reflection is carried out before the packaging operation is started.

(Packaging Control Unit 6 Side: Step S15)

Then, when the packaging operation completes at the step 14, the control part 61 transmits a completion report of the packaging operation to the control part 11 at a subsequent step S15.

(Prescription Control Unit 1 Side: Step S8)

In contrast, in the prescription control unit 1, the control part 11 waits for the completion report of the packaging operation from the control part 61 (the case of determining "No" at the step S8). When the control part 11 receives the completion report of the packaging operation (the case of determining "Yes" at the step S8), the control part 11 shifts the process to a step S9.

(Prescription Control Unit 1 Side: Step S9)

At the subsequent step S9, the control part 11 allows the display part 25 of the unspecified cassette 22 which completes the dispensation to display an indication of "dispensation completion". For example, it may be considered that the display part 25 displays characters of "dispensation completion" at the step S9 or the display part 25 deletes an indication of the medicine information displayed on the display part 25 at the step S9.

As described above, with the medicine dispensing apparatus 100, the user can automatically dispense desired types of tablets, which are not contained in the specified cassettes 21 in advance, by only respectively supplying the types of tablets into the unspecified cassettes 22 in bulk. Therefore, it is possible to reduce time and effort of a user work compared with the conventional case where it is necessary to manually supply tablets into each of the boxes of the manual packaging unit 4, thereby preventing human errors of the user at the time of supplying the tablets.

Further, since the plurality of unspecified cassettes 22 are provided in the medicine dispensing apparatus 100, the medicine dispensing apparatus 100 can allocate various different medicine information to each of the unspecified cassettes 22. Thus, even if types of tablets which are not contained in the specified cassettes 21 are designated to be dispensed by the prescription data, the medicine dispensing apparatus 100 can carry out the packaging operation with the plurality of unspecified cassettes 22 on the basis of the prescription data. Further, the medicine dispensing apparatus 100 can continuously carry out a plurality of packaging operations based on a plurality of prescription data with the plurality of unspecified cassettes 22.

[Adjusting Function]

In the medicine dispensing apparatus 100, it is necessary to preliminarily set the driving conditions of the unspecified cassettes 22 for each tablet corresponding to the medicine information in order to dispense a desired type of tablet from one of the unspecified cassettes 22. With regard to this, the medicine dispensing apparatus 100 has an adjusting function to set the driving conditions for dispensing the tablets one by one from one of the unspecified cassettes 22 by utilizing the medicine photographing apparatus 7. With this configuration, the medicine dispensing apparatus 100 can set the driving conditions by utilizing the adjusting function even for the tablets not registered in the driving correspondence information stored in the storage part 12 in advance. Hereinafter, description will be given to the adjusting function.

[Medicine Photographing Apparatus 7]

Figure 12:
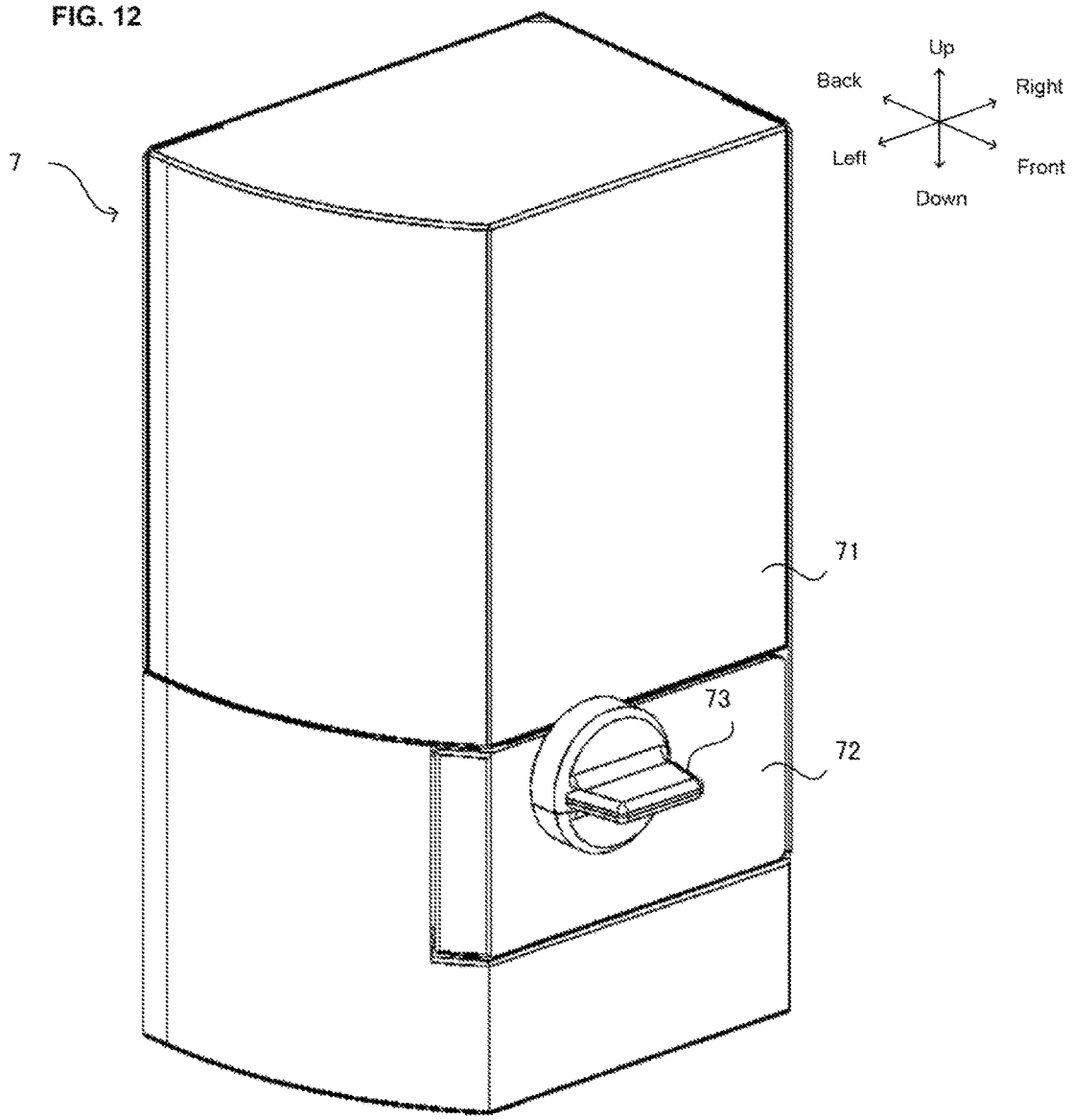
FIG. 12 is a view illustrating a medicine photographing apparatus according to an embodiment of the present invention.
Figure 13:
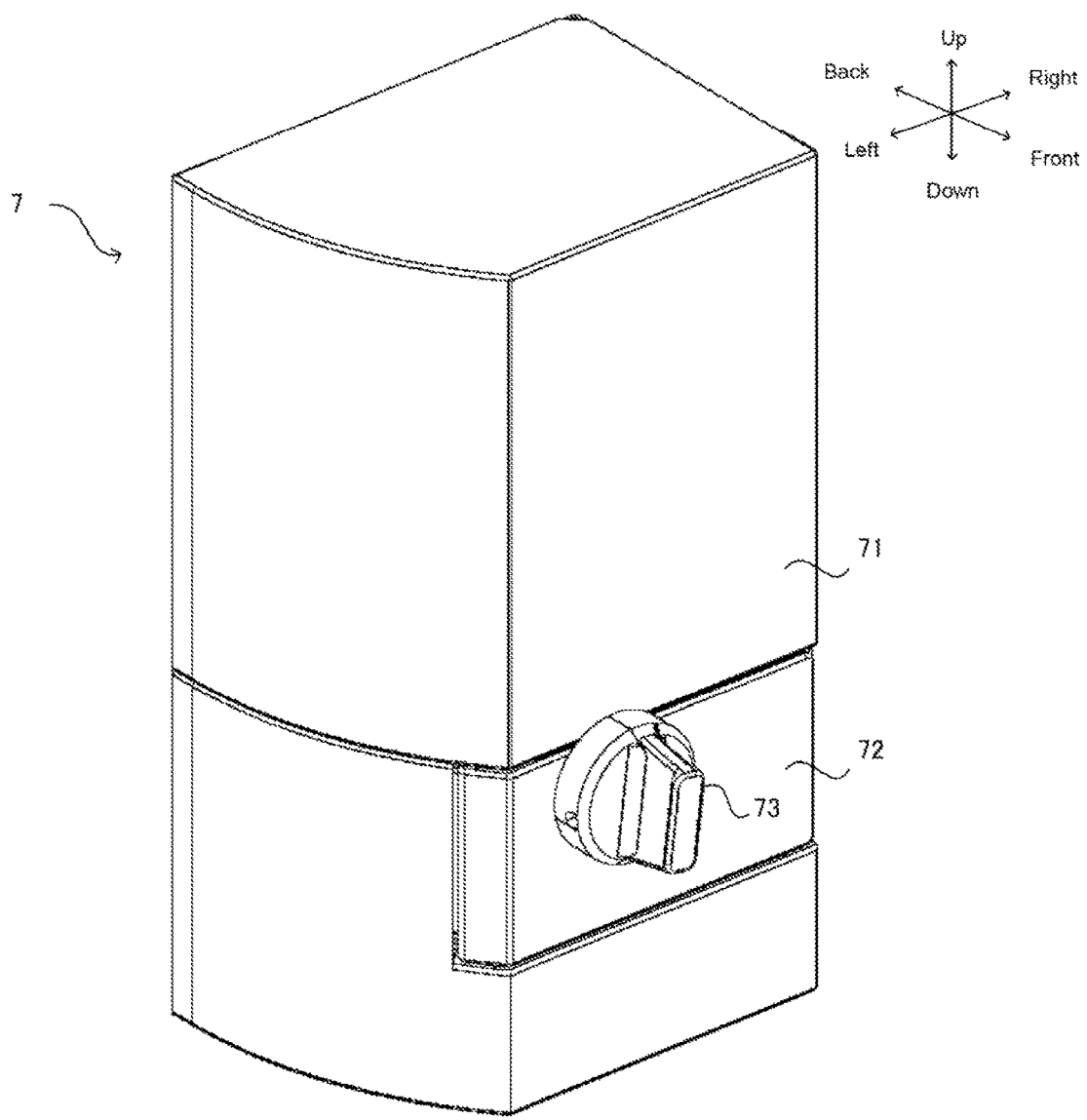
FIG. 13 is another view illustrating the medicine photographing apparatus according to the embodiment of the present invention.
Figure 14:
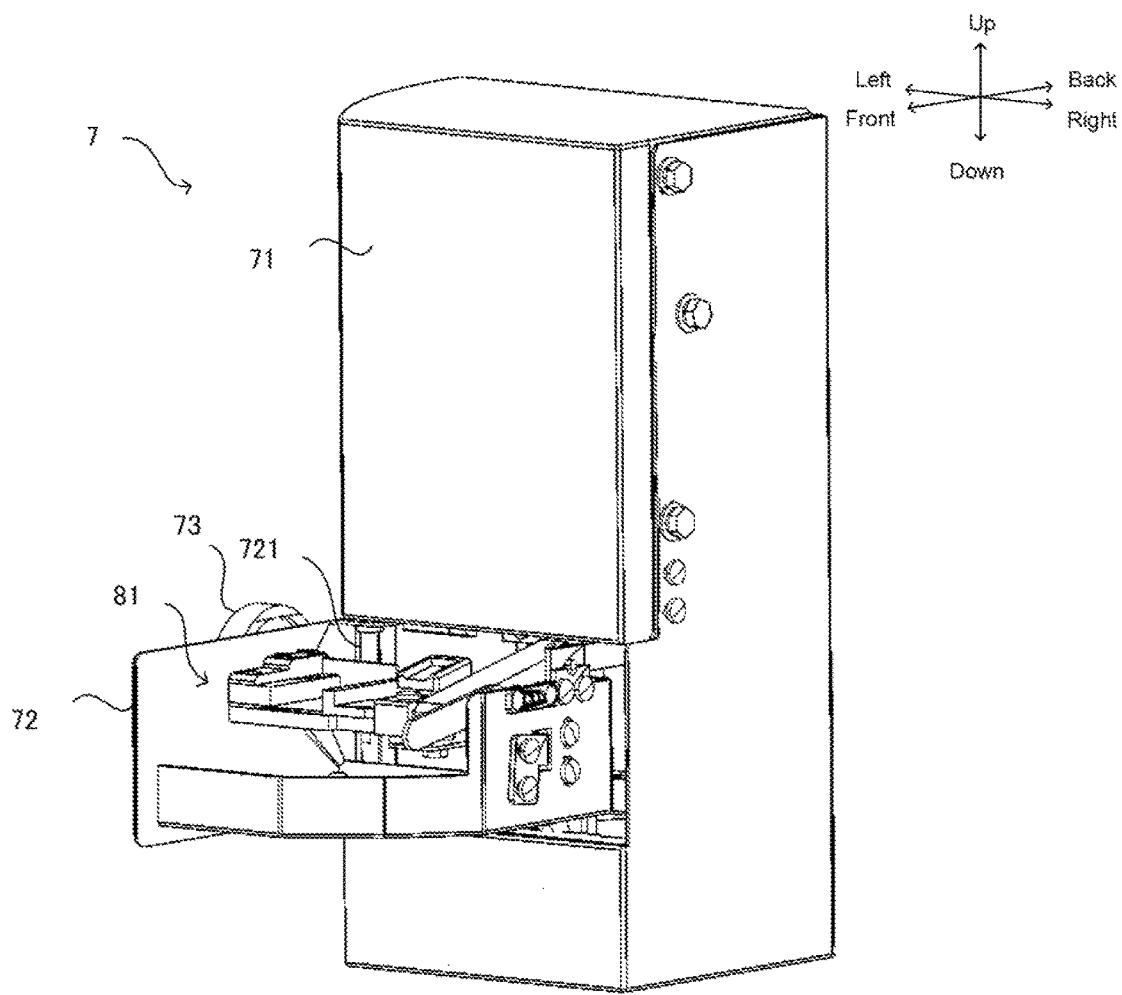
FIG. 14 is another view illustrating the medicine photographing apparatus according to the embodiment of the present invention.
Figure 15:
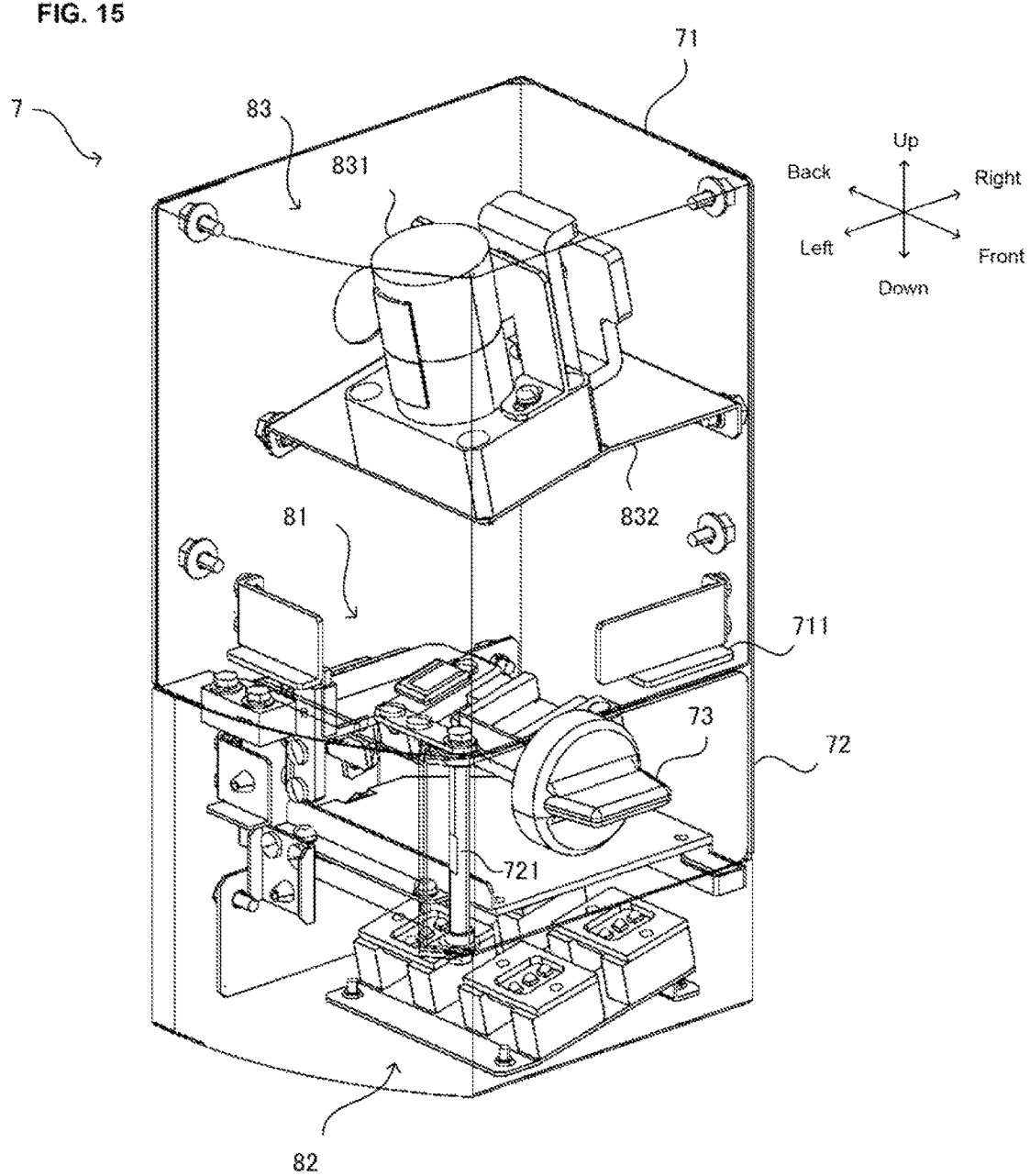
FIG. 15 is a view illustrating an internal structure of the medicine photographing apparatus according to the embodiment of the present invention.

Each of FIGS. 12 to 14 is a view illustrating an external view of the medicine photographing apparatus 7. FIG. 15 is a view illustrating an internal structure of the medicine photographing apparatus 7 with an external housing of the medicine photographing apparatus 7 being drawn in a transparent state. In the following description, for the purpose of illustration, there is a case where a front and back direction, an upper and lower direction and a right and left direction defined in each of FIGS. 12 to 15 are used for describing the present invention.

As shown in FIGS. 12 to 15, the medicine photographing apparatus 7 includes a housing 71, an opening and closing part 72, an operating part 73, a medicine holding part 81, a lighting part 82 and a photographing part 83. In this case, a unit including the lighting part 82 and the photographing part 83 is one example of a photographing unit according to the present invention. In the following description, the unit is referred to as a photographing unit 84. In this regard, the photographing unit 84 is not constituted of the lighting part 82 and the photographing part 83 integrally provided with each other. The photographing unit 84 is constituted of the lighting part 82 and the photographing part 83 individually provided in the housing 71 as different components. Needless to say, the photographing unit 84 may take another configuration in which the lighting part 82 and the photographing part 83 are supported by a common frame.

The housing 71 and the opening and closing part 72 constitute the external housing of the medicine photographing apparatus 7. The housing 71 and the opening and closing part 72 contain the medicine holding part 81, the photographing unit 84 and the like therein. Each of the housing 71 and the opening and closing part 72 is formed of aluminum, iron or the like having light shielding property. Namely, in a state that the opening and closing part 72 is closed, a darkroom for shielding external light is formed in the medicine photographing apparatus 7.

The opening and closing part 72 is pivotally supported by the housing 71 through a pivot axis 721 so that the opening and closing part 72 can be pivotally moved with respect to the housing 71. FIGS. 12 and 13 illustrate a state that the opening and closing part 72 is closed and FIG. 14 illustrates a state that the opening and closing part 72 is opened.

The operating part 73 is an operating knob which is operated by the user for pivotally moving the medicine holding part 81. The operating part 73 is connected to the medicine holding part 81. FIGS. 12 and 13 are different views respectively illustrating different states that pivot positions of the operating part 73 are different from each other by 90 degrees.

[Medicine Holding Part 81]

Each of FIGS. 16 to 19 is a view illustrating a structure of the medicine holding part 81. As shown in FIGS. 16 to 19, the medicine holding part 81 includes a medicine placing part 810, a pair of gripping parts 811, 812, a placing reference part 813, a grip supporting part 814, a pressing part 815, a non-slip part 816, a contacting part 817, a contacting part 818 and a contacting part 819. The medicine placing part 810, the gripping parts 811, 812 and the placing reference part 813, which constitute a member of the medicine holding part 81 for holding the tablet, are formed of a material through which light irradiated from the lighting part 82 can pass. For example, the medicine placing part 810, the gripping parts 811, 812 and the placing reference part 813 are formed of a transparent or milky white material having translucency such as a polyvinyl chloride and an acrylic resin.

The medicine placing part 810 has a medicine placing surface 810A on which the tablet designated to be photographed by the medicine photographing apparatus 7 should be placed. The pair of gripping parts 811, 812 has gripping surfaces 811A, 812A which can grip therebetween the tablet placed on the medicine placing part 810. The placing reference part 813 has a placing reference surface 813A for defining a placing reference position for the tablet in a direction perpendicular to a gripping direction for the tablet by the gripping parts 811A, 812A (a front and back direction) and parallel to the medicine placing surface 810A (a right and left direction). The placing reference surface 813A is perpendicular to the medicine placing surface 810A. In this regard, the placing reference surface 813A may be inclined with respect to a direction perpendicular to the medicine placing surface 810A by some degrees.

The gripping part 811 is fixed to the medicine placing part 810 and the placing reference part 813. The gripping part 812 is supported by the grip supporting part 814 so that the gripping part 812 can be slid in a direction parallel to the placing reference surface 813A. Namely, the gripping surface 812A of the gripping part 812 can be approached to and separated from the gripping surface 811A of the gripping part 811. In this regard, the grip supporting part 814 may take any configuration as long as it can slidably support one or both of the gripping part 811 and the gripping part 812 to allow the gripping surface 811A and the gripping surface 812A to be relatively approached to or separated from each other. Further, it may be considered that one of the gripping part 811 and the griping part 812 is formed of a material having elasticity such as a soft polyvinyl chloride and the other of the gripping part 811 and the griping part 812 is formed of a hard acrylic resin or the like. This makes it possible to allow the gripping part 811 and the gripping part 812 to stably hold the tablet.

The non-slip part 816 is provided on the grip supporting part 814. The non-slip part 816 is an elastic member having a high frictional coefficient such as a rubber and provided so as to make contact with a back surface 810B of the medicine placing part 810 to increase sliding resistance (moving resistance) of the grip supporting part 814. Further, a biasing member such as a spring intervenes between the pressing part 815 and the non-slip part 816. Thus, the non-slip part 816 is biased toward the side of the back surface 810B of the medicine placing part 810 by the biasing member. With this configuration, it is possible to prevent a positional displacement of the gripping part 812 and keep a gripping stage for the tablet by the gripping surfaces 811A, 812A.

The pressing part 815 separates the non-slip part 816 from the back surface 810B of the medicine placing part 810 according to a pressing operation of the user to decrease the sliding resistance (moving resistance) of the grip supporting part 814. With this configuration, the user can easily move the grip supporting part 814 by pressing the pressing part 815.

Further, the medicine holding part 81 is pivotally supported by a front surface and a back surface of the opening and closing part 72 through a pivot axis 731 and a pivot axis 732. In this case, the pivot axis 731 and the pivot axis 732 are one example of a pivotally supporting part. The pivot axis 731 connects the medicine holding part 81 and the operating part 73. The pivot axis 731 pivotally moves the medicine holding part 81 in the same direction as the operating part 73 according to a pivot operation of the operating part 73 by the user.

Figure 16:
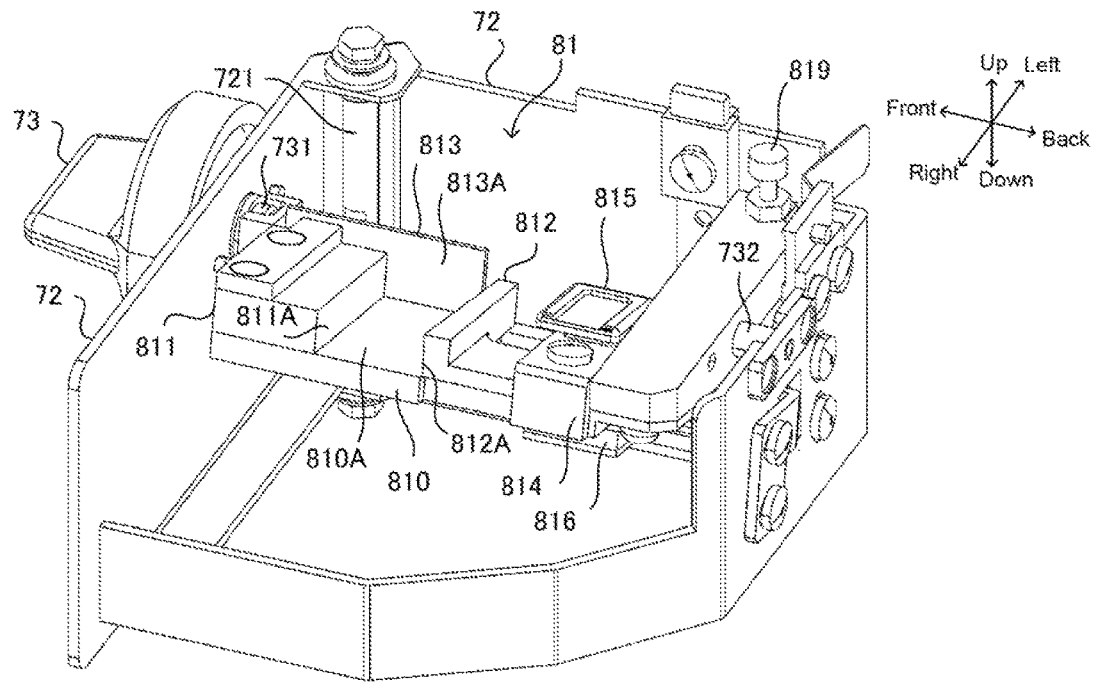
FIG. 16 is a view illustrating a structure of a medicine holding part of the medicine photographing apparatus according to the embodiment of the present invention.
Figure 17:
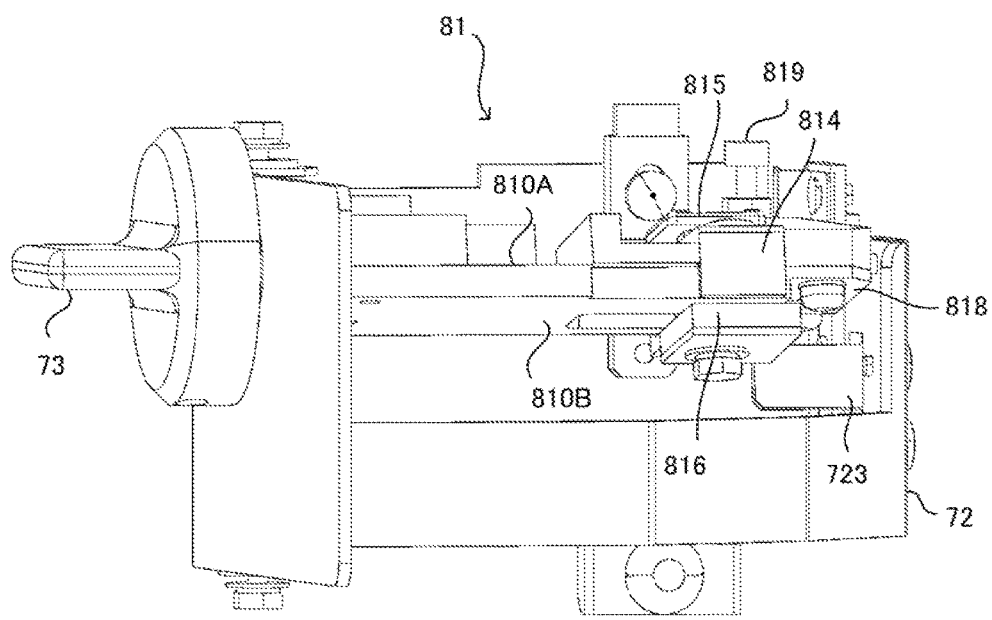
FIG. 17 is another view illustrating the structure of the medicine holding part of the medicine photographing apparatus according to the embodiment of the present invention.
Figure 19:
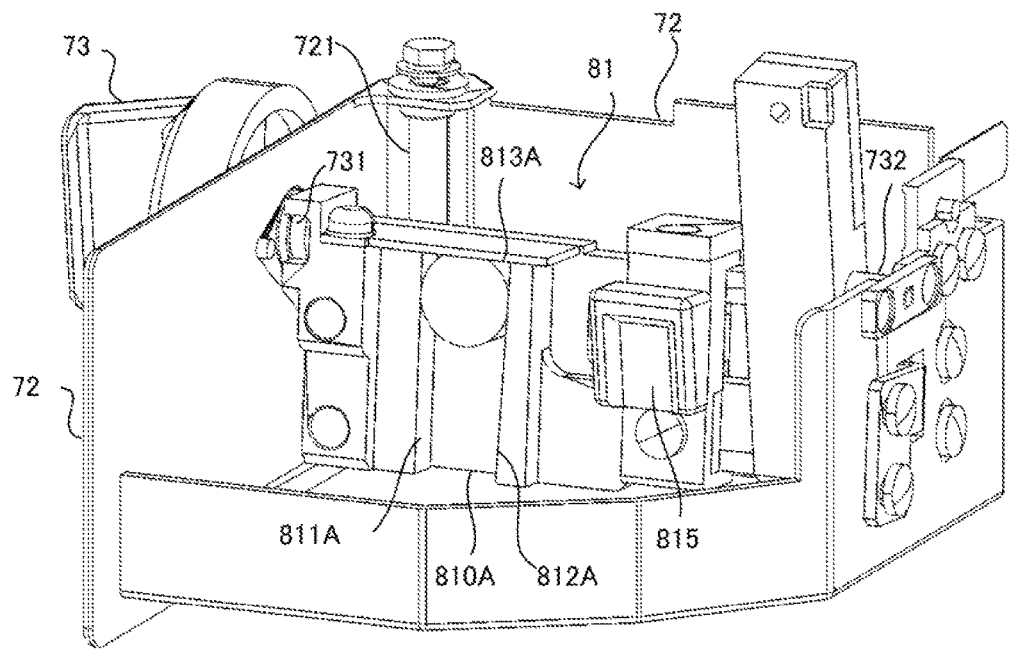
FIG. 19 is another view illustrating the structure of the medicine holding part of the medicine photographing apparatus according to the embodiment of the present invention.

The medicine holding part 81 can be pivotally moved between a first posture and a second posture which are respectively predefined as a posture at the time of photographing by the photographing part 83. Specifically, the first posture is a posture in which the photographing part 83 is located in a direction perpendicular to the medicine placing surface 810A. The second posture is a posture in which the photographing part 83 is located in a direction perpendicular to the gripping direction and parallel to the medicine placing surface 810A. Namely, the first posture is a posture in which the tablet can be photographed by the photographing part 83 from the direction perpendicular to the medicine placing surface 810A and the second posture is a posture in which the tablet can be photographed by the photographing part 83 from the direction perpendicular to the gripping direction and parallel to the medicine placing surface 810A. In this regard, the medicine placing surface 10A in each of the first posture and the second posture is inclined with respect to a horizontal plane and a vertical plane by a predetermined angle. In particular, an inclination of the medicine placing surface 810A in the first posture with respect to the horizontal plane is smaller than an inclination of the medicine placing surface 810A in the second posture with respect to the horizontal plane. For example, the inclination of the medicine placing surface 810A in the first posture with respect to the horizontal plane is in the range of about 2 to 5 degrees. The second posture is a state that the medicine holding part 81 is pivotally moved from the first posture in a clockwise direction by 90 degrees when the medicine photographing apparatus 7 is viewed from the front side. FIG. 16 illustrates the medicine holding part 81 in the first posture and FIG. 19 illustrates the medicine holding part 81 in the second posture.

Figure 18:
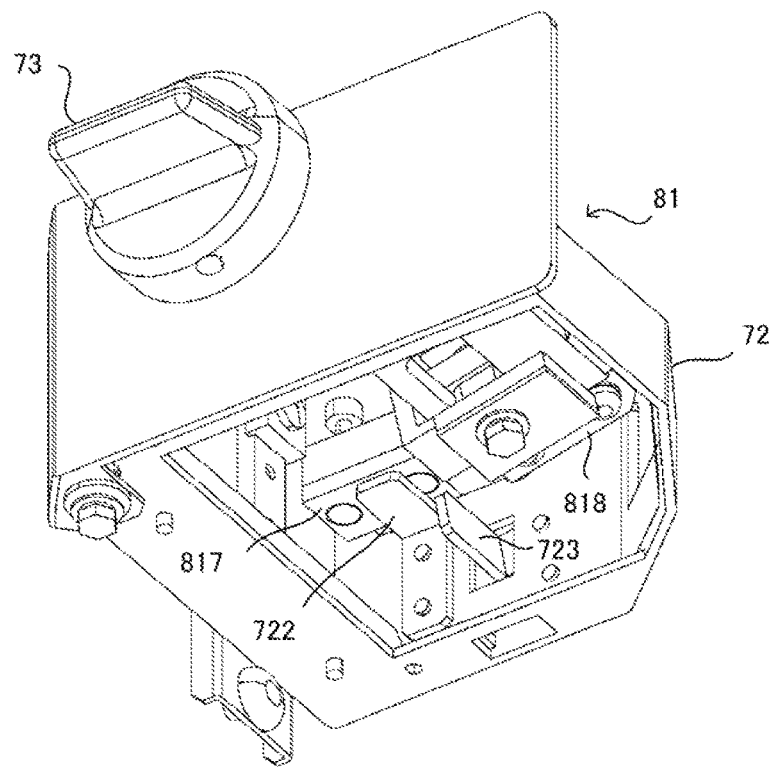
FIG. 18 is another view illustrating the structure of the medicine holding part of the medicine photographing apparatus according to the embodiment of the present invention.

The contacting part 817, the contacting part 818 and the contacting part 819 are used for restricting the pivotal movement of the medicine holding part 81 at a predetermined position. Specifically, as shown in FIG. 18, a contacting part 722 is provided in the opening and closing part 72 so that the contacting part 722 makes contact with the contacting part 817 at a position, where the medicine holding part 81 takes the first posture when the medicine holding part is pivotally moved in the counterclockwise direction, to restrict the pivotal movement of the medicine holding part 81. Further, a contacting part 723 is provided in the opening and closing part 72 so that the contacting part 723 makes contact with the contacting part 818 at a position, where the medicine holding part 81 takes the second posture when the medicine holding part 81 is pivotally moved in the clockwise direction, to restrict the pivotal movement of the medicine holding part 81. As described above, the medicine holding part 81 is in a state that the medicine holding part 81 can be pivotally moved in a range between the first posture and the second posture by the pivot axes 731, 732, the contacting parts 817, 818 and the contacting parts 722, 723.

The contacting part 722 is formed of a ferromagnetic material such as iron. A magnet is provided on the contacting part 817 at a contacting area between the contacting part 817 and the contacting part 722. With this configuration, attraction force acts between the contacting part 722 and the contacting part 817 when the medicine holding part 81 moves to the first posture, thereby allowing the user to recognize that the medicine holding part 81 moves to the first posture. Further, the magnet between the contacting part 722 and the contacting part 817 increases pivot resistance of the medicine holding part 81 toward a direction away from the first posture. With this configuration, it is possible to stabilize the medicine holding part 81 in the first posture. In this case, the contacting part 722 and the contacting part 817 are one example of a first pivot restricting part. In this regard, it is possible to take another configuration in which each of the contacting part 722 and the contacting part 817 has a magnet having polarity whose attraction force can act mutually.

In the same manner, the contacting part 723 is formed of a ferromagnetic material such as iron. A magnet is provided on the contacting part 818 at a contacting area between the contacting part 818 and the contacting part 723. With this configuration, attraction force acts between the contacting part 723 and the contacting part 818 when the medicine holding part 81 moves to the second posture, thereby allowing the user to recognize that the medicine holding part 81 moves to the second posture. Further, the magnet between the contacting part 723 and the contacting part 818 increases pivot resistance of the medicine holding part 81 toward a direction away from the second posture. With this configuration, it is possible to stabilize the medicine holding part 81 in the second posture. In this case, the contacting part 723 and the contacting part 818 are one example of a second pivot restricting part. In this regard, it is possible to take another configuration in which each of the contacting part 723 and the contacting part 818 has a magnet having polarity whose attraction force can act mutually.

Further, in the housing 71, a contacting part 711 (see FIG. 15) is provided at a position where the contacting part 711 faces to the contacting part 819 when the opening and closing part 72 is opened. When the medicine holding part 81 is pivotally moved in the clockwise direction in the state that the opening and closing part is opened, the contacting part 819 makes contact with the contacting part 711 to restrict the pivotal movement of the medicine holding part 81 in the clockwise direction. In this regard, the pivotal movement of the medicine holding part 81 in the counterclockwise direction in the state that the opening and closing part 72 is opened is restricted by the contacting part 722 and the contacting part 817 as described above.

With this configuration, the use can place the tablet on the medicine holding part 81 and take the tablet from the medicine holding part 81 in a stable state that the pivotal movement of the medicine holding part 81 is restricted. Further, since the medicine holding part 81 is opened and closed in the first posture, a width of the opening and closing part 72 in the vertical direction may be set to be a range allowing the medicine holding part 81 in the first posture to pass through the opening and closing part 72.

Further, it is possible to take another configuration in which a part of the medicine holding part 81 engages with a part of the housing 71 to restrict the opening of the opening and closing part 72 when the medicine holding part 81 moves from the first posture to the second posture in the state that the opening and closing part 72 is closed. More specifically, it is possible to consider a configuration in which a protruding portion provided on the medicine holding part 81 is inserted into a concave portion formed on the housing 71 in the second posture and the protruding portion is removed from the concave portion in the first posture. With this configuration, even in a configuration in which a width of the medicine holding part 81 in the vertical direction in the second posture is larger than the width of the opening and closing part 72 in the vertical direction, it is possible to prevent the medicine holding part 81 from making contact with the housing 71 and being broken, thereby improving freedom degree of the medicine holding part 81.

Figure 20:
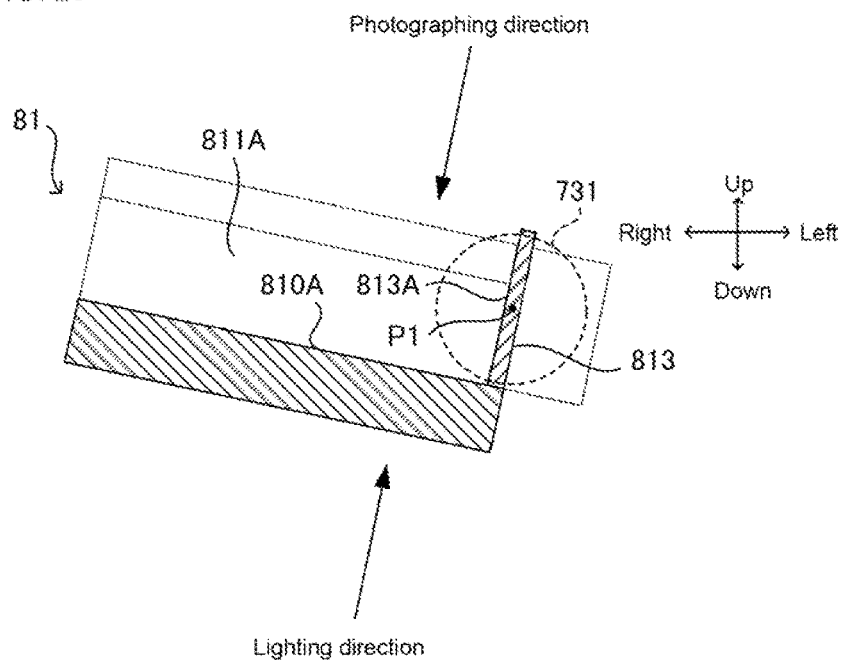
FIG. 20 is a view illustrating an example of an operation of the medicine holding part of the medicine photographing apparatus according to the embodiment of the present invention.
Figure 21:
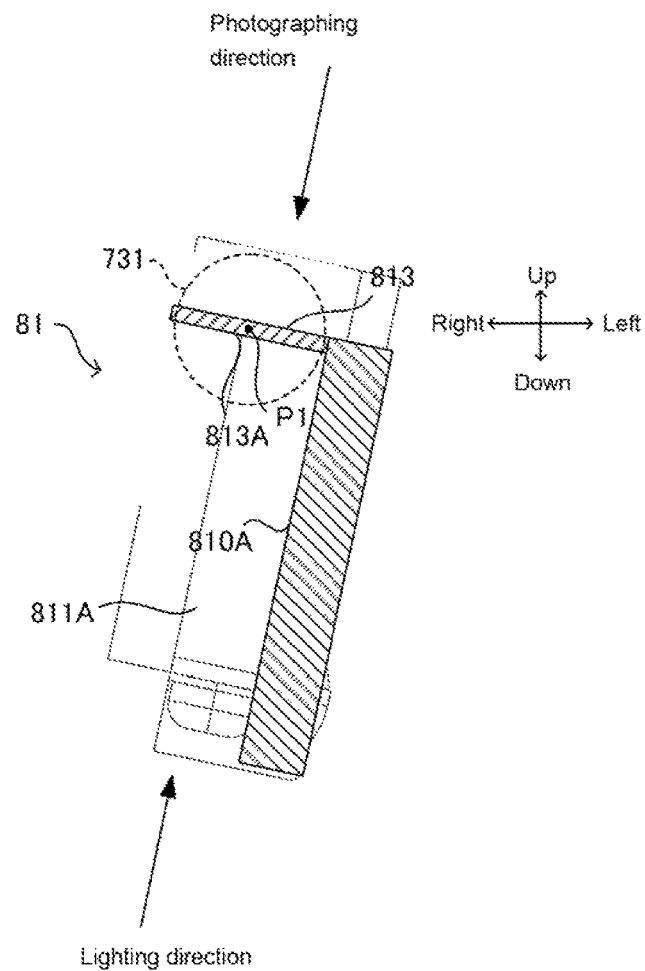
FIG. 21 is another view illustrating the example of the operation of the medicine holding part of the medicine photographing apparatus according to the embodiment of the present invention.

FIG. 20 is a main part schematic view illustrating a state that the medicine holding part 81 is in the first posture. FIG. 21 is a main part schematic view illustrating a state that the medicine holding part 81 is in the second posture. As shown in FIG. 20, the first posture is a posture in which the medicine placing surface 810A of the medicine placing part 810 is downwardly inclined toward the placing reference surface 813A of the placing reference part 813. Further, as shown in FIG. 21, the second posture is a posture in which the medicine placing surface 810A of the medicine placing part 810 is upwardly inclined toward the placing reference surface 813A of the placing reference part 813.

The medicine holding part 81 is pivotally supported by the pivot axis 731 and the pivot axis 732 around a predetermined position P1 in the placing reference part 813 as a pivot center. The photographing part 83 is fixed at a position where the photographing part 83 can photograph the tablet placed on the medicine placing surface 810A of the medicine holding part 81 in the second posture from the side of placing reference surface 813A. With this configuration, it is possible to suppress a variation of a distance between the tablet placed on the medicine placing surface 810A and the photographing part 83 in each of the first posture and the second posture. Thus, for example, it is possible to suppress focus deviation of an image photographed by the photographing part 83, thereby suppressing an error of a measured size caused by the variation of the distance from the photographing part 83 to the tablet. More specifically, the position P1 is an intermediate position of a width of the placing reference surface 813A in a direction perpendicular to the medicine placing surface 810A. In this regard, it may be considered that the width of the placing reference surface 813A in the direction perpendicular to the medicine placing surface 810A is an average value of thickness sizes of a plurality of tablets expected to be used in advance. With this configuration, it is possible to prevent the error of the measured size caused by the variation of the distance from the photographing part 83 to the tablet from enormously and unevenly changing depending on the size of the tablet.

Figure 22:
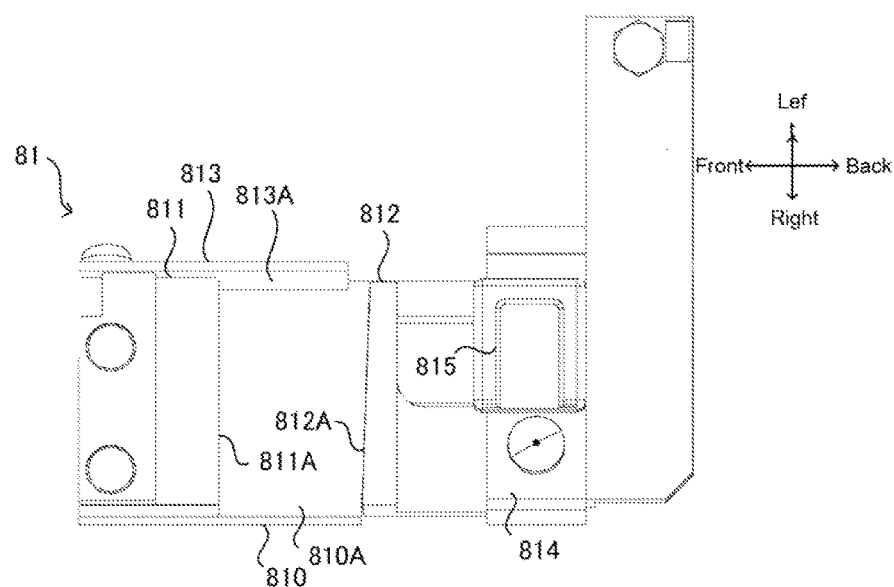
FIG. 22 is a planar view illustrating a major part of the medicine holding part of the medicine photographing apparatus according to the embodiment of the present invention.
Figure 23:
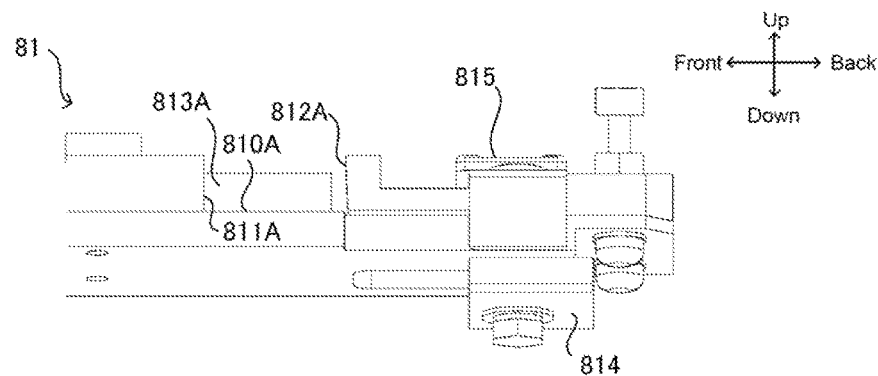
FIG. 23 is another planar view illustrating the major part of the medicine holding part of the medicine photographing apparatus according to the embodiment of the present invention.

FIG. 22 is a view taken by seeing the medicine holding part 81 in the first posture from the upper side. FIG. 23 is a view taken by seeing the medicine holding part 81 in the first posture from the right side. As shown in FIG. 22, a distance between the gripping surface 811A and the gripping surface 812A increases toward the placing reference part 813, that is the gripping surface 811A and the gripping surface 812A form a shape expanding toward the placing reference surface 813A. More specifically, the gripping surface 811A is perpendicular to the placing reference surface 813A. On the other hand, the gripping part 812A is inclined with respect to a direction perpendicular to the placing reference surface 813A. With this configuration, when the medicine holding part 81 is in the second posture as shown in FIG. 19, it is possible to prevent the tablet placed on the medicine placing surface 810A of the medicine placing part 810 from dropping from the medicine placing surface 810A. In this regard, it may be possible to take another configuration in which both the gripping surface 811A and the gripping surface 812A are inclined with respect to the direction perpendicular to the placing reference surface 813A so that the distance between the gripping surface 811A and the gripping surface 812A increases toward the placing reference surface 813A. Further, it may be possible to take another configuration in which both of the gripping surface 811A and the gripping surface 812A are perpendicular to the placing reference part 813.

Further, as shown in FIG. 23, the distance between the gripping surface 811A and the gripping surface 812A increases toward the medicine placing surface 810A, that is the gripping surface 811A and the gripping surface 812A form a shape expanding toward the medicine placing surface 810A. With this configuration, when the medicine holding part 81 is in the second posture as shown in FIG. 19, it is possible to prevent the tablet placed on the medicine placing surface 810A from moving to the upper direction and inclining. In this regard, it may be possible to take another configuration in which both of the gripping surface 811A and the gripping surface 812A are inclined with respect to the direction perpendicular to the medicine placing surface 810A so that the distance between the gripping surface 811A and the gripping surface 812A increases toward the medicine placing surface 810A. Further, it may be possible to take another configuration in which both of the gripping surface 811A and the gripping surface 812A are perpendicular to the medicine placing surface 810A.

In the configuration in which the gripping surface 812A is inclined with respect to the direction perpendicular to the medicine placing surface 810A so that the distance between the gripping surface 811A and the gripping surface 812A increases toward the medicine placing surface 810A, there is a risk in that a part of the tablet placed on the medicine placing surface 810A is interrupted by the gripping surface 812A when the tablet is viewed from the photographing part 83. In contrast, in the medicine photographing apparatus 7, a position of the photographing part 83 and an inclination angle of the gripping surface 812A are set so that the tablet placed on the medicine placing surface 810A is located in a photographing range of the photographing part 93 with utilizing an angle of view of the photographing part 83. For example, the inclination angle of the gripping surface 812A with respect to the direction perpendicular to the medicine placing surface 810A is set to be equal to or smaller than 1 degree or 2 degrees. In this regard, the inclination angle of the gripping surface 812A with respect to the direction perpendicular to the medicine placing surface 810A is not limited thereto as long as it is smaller than an inclination angle of the gripping surface 811A with respect to the direction perpendicular to the medicine placing surface 810A.

Further, in the medicine photographing apparatus 7, a position of an optical axis of lens of a camera 831 (described below) in the gripping direction of the gripping surface 811A and the gripping surface 812A is offset toward the side of the gripping surface 811A by a predetermined specific value in a state that the gripping surface 811A and the gripping surface 812A are separated from each other. With this configuration, for even a tablet having a small size, it is possible to suppress a lack of a photographed image of the tablet caused by the inclination of the gripping surface 812A.

[Lighting Part 82]

Figure 24:
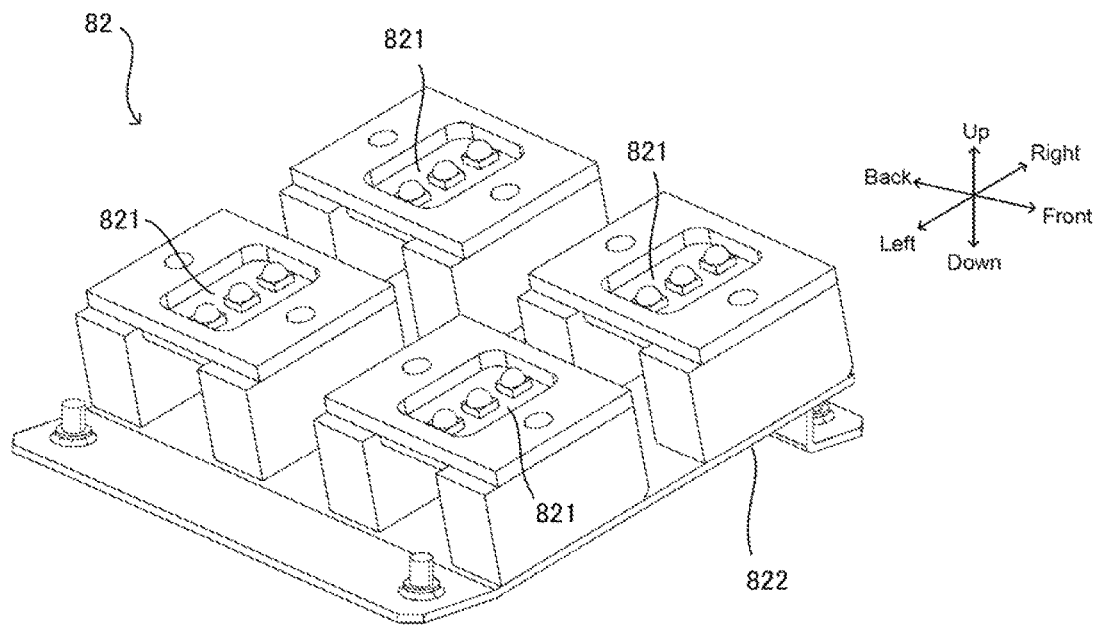
FIG. 24 is a view illustrating a structure of a lighting part of the medicine photographing apparatus according to the embodiment of the present invention.
Figure 25:
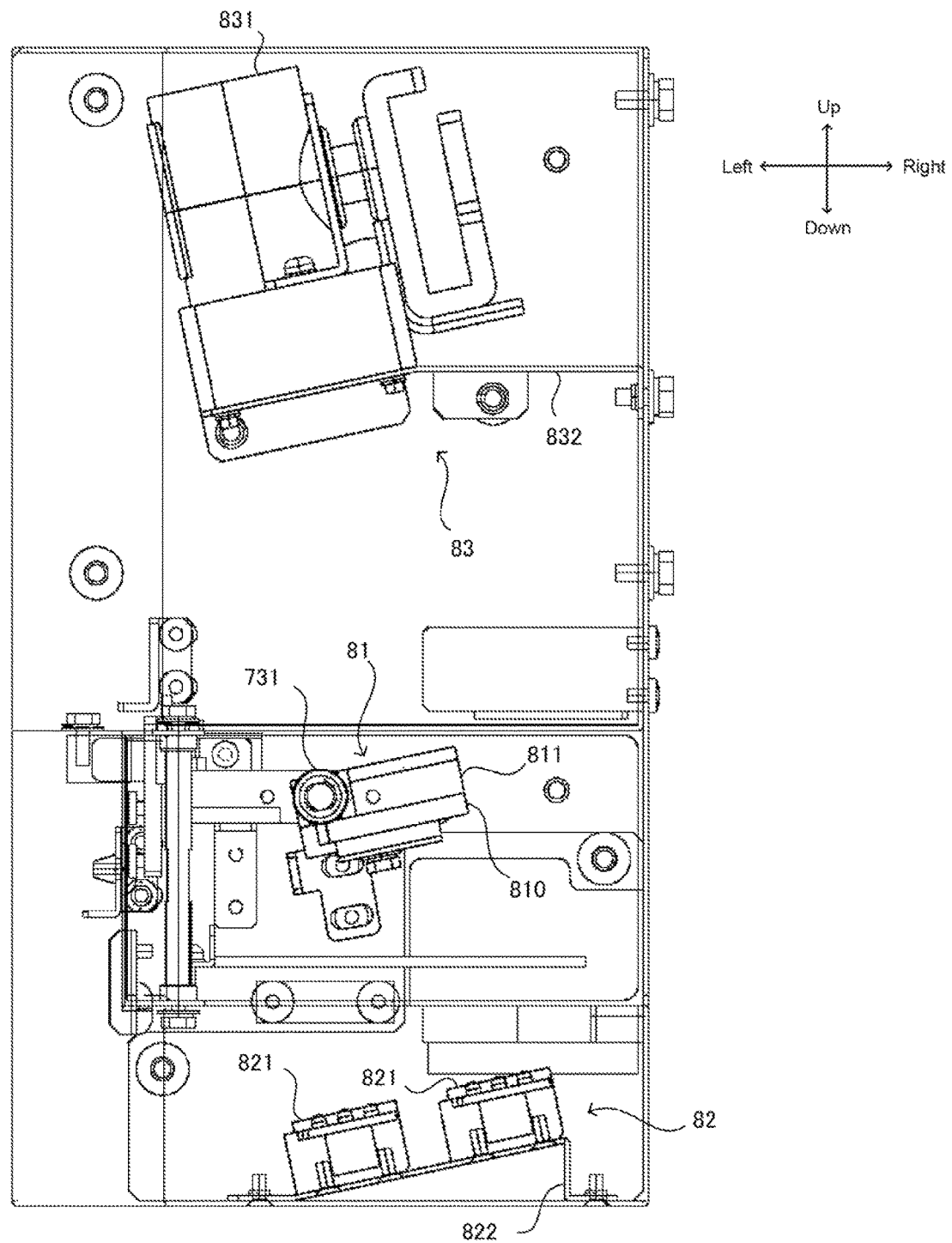
FIG. 25 is a view illustrating the internal structure of the medicine photographing apparatus according to the embodiment of the present invention, which is taken from the front side.

FIG. 24 is a view illustrating a structure of the lighting part 82. FIG. 25 is a view illustrating an internal structure of the medicine photographing apparatus 7, which is taken from the front side, with an external housing of the medicine photographing apparatus 7 being drawn in a transparent state. Further, FIG. 25 is a view illustrating the internal structure of the medicine holding part 81 taken from the front side when the medicine holding part 81 is in the first posture. As shown in FIGS. 24 and 25, the lighting part 82 includes a plurality of light sources 821 and a light source supporting part 822. Each of the light sources 821 includes an LED for emitting light to the tablet through the medicine placing surface 810A. The light source supporting part 822 is fixed to the housing 71 and fixedly supports each of the light sources 821 in a state that each of the light sources 821 is inclined with respect to the vertical direction by a predetermined angle.

Specifically, as shown in FIG. 25, the light sources 821 are supported by the light source supporting part 822 in a state that each of the light sources 821 is inclined with respect to the direction perpendicular to the medicine placing surface 810A of the medicine holding part 81 in the first posture by an angel allowing each of the light sources 821 to irradiate the tablet placed on the medicine placing surface 810A. With this configuration, in the second posture in which the medicine holding part 81 is pivotally moved by 90 degrees from the first posture, the lighting part 82 can irradiate the tablet placed on the medicine placing surface 810A from the direction perpendicular to the placing reference surface 813A. Further, in the medicine photographing apparatus 7, the control part 11 can individually control turning-ON and turning-OFF of two of the light sources 821 provided on the left side and two of the light sources 821 provided on the right side.

[Photographing Part 83]

As shown in FIG. 25, the photographing part 83 includes the camera 831 and a camera supporting part 832. The camera 831 can photograph the tablet held by the medicine holding part 81 as a color image. The camera supporting part 832 is fixed to the housing 71 and fixedly supports the camera 831 in a state that the camera 831 is inclined with respect to the vertical direction by a predetermined angle.

Specifically, the camera 831 is supported by the camera supporting part 832 in a state that the camera 831 is inclined by an angle allowing the camera 831 to photograph the tablet held by the medicine holding part 81 from a position facing to the lighting part 82 in the direction perpendicular to the medicine placing surface 810A of the medicine holding part 81 in the first posture. With this configuration, the medicine photographing apparatus 7 can obtain a shadow image of the tablet, in which the medicine placing part 810, the gripping parts 811, 812 and the placing reference part 813 do not visually exist because they are photographed as white spots due to the light from the lighting part 82, as a photographed image photographed by the photographing part 83. The image photographed by the camera 831 is inputted into the control part 11. With this configuration, the control part 11 can measure a shape of the tablet based on the photographed image photographed by the medicine photographing apparatus 7. In the medicine dispensing apparatus 100, it is possible to set the driving conditions of the unspecified cassettes 22 based on the shape of the tablet measured by the medicine photographing apparatus 7.

[Adjusting Process]

Hereinafter, description will be given to one example of procedures of the adjusting process carried out by the control part 11 in the medicine dispensing apparatus 100 with reference to FIGS. 26 to 35. The control part 11 carries out the adjusting process according to an execution request operation by the user with respect to the operating part 14 of the medicine dispensing apparatus 100. In the case where the control part 11 determines that the driving condition corresponding to the medicine information is not registered in the driving correspondence information 122 at the step S4 of the medicine dispensing process (see FIG. 11), the control part 11 may allow the monitor 13 to display an operating key for enabling the user to select whether or not the adjusting process should be carried out and then carry out the adjusting process according to the user operation with respect to the operating part 14. In this regard, the adjusting process may be carried out by the control part 61.

<Step S31>

Figure 26:
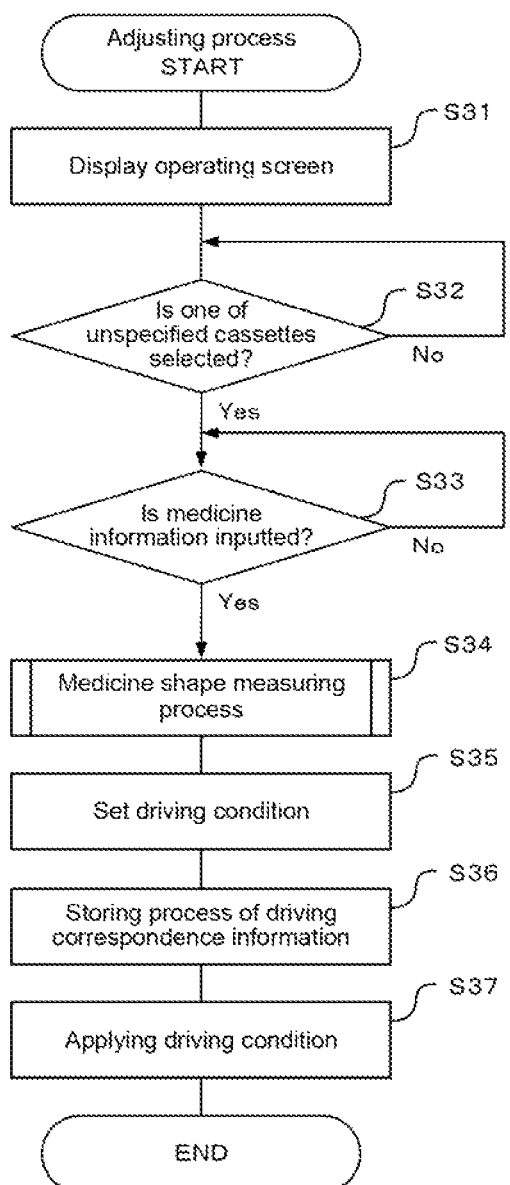
FIG. 26 is a flow chart for explaining one example of procedures of an adjusting process carried out in the medicine dispensing apparatus according to the embodiment of the present invention.

First, as shown in FIG. 26, at a step S31, the control part 11 allows the monitor 13 to display an operating screen used for selecting one of the unspecified cassettes 22 and inputting the medicine information.

<Step S32>

Next, at a step S32, the control part 11 waits for a selecting operation by the user with respect to the operating part 14 for selecting one of the unspecified cassettes 22 (the case of determining "No" at the step S32). When one of the unspecified cassettes 22 is selected (the case of determining "Yes" at the step S32), the process shifts to a step S33.

In the medicine dispensing apparatus 100, since the mounting part 221 of each of the unspecified cassettes 22 includes a mechanism for driving the height adjusting part 226A and the width adjusting part 227A of the unspecified cassette 22, it is possible to select an arbitrary unspecified cassette 22 among the unspecified cassettes 22. Namely, in the adjusting process, the adjustments for the height h1 to be restricted by the height restriction member 226 of the unspecified cassette 22 and the width w1 to be restricted by the width restriction member 227 are carried out by an arbitrary mounting part 221 on which the unspecified cassette 22 selected at the step S31 is to be mounted.

<Step S33>

At the step S33, the control part 11 waits for an input operation by the user with respect to the operating part 14 for the medicine information on the tablet to be contained in the unspecified cassette 22 (the case of determining "No" at the step S33). When the medicine information is inputted (the case of determining "Yes" at the step S33), the process shifts to a step S34. In this regard, an order of the step S32 and the step S33 may be reversed.

In the case where the control part 11 determines that the driving condition corresponding to the medicine information is not registered in the driving correspondence information 122 at the step S4 of the medicine dispensing process (see FIG. 11), the selection of the unspecified cassette 22 and the input of the medicine information may be carried out automatically. Namely, it may be considered that the control part 11 selects the unspecified cassette 22 to which the medicine information has been allocated as a target object of the adjusting process and inputs the medicine information allocated to the unspecified cassette 22 as the medicine information on the tablet to be contained in the unspecified cassette 22.

<Step S34>

At the step S34, the control part 11 carries out a medicine shape measuring process for measuring the shape of the tablet based on the photographed images photographed by the photographing part 83 in different states that the pivotal postures of the medicine holding part 81 are different from each other. In this case, the control part 11 contains a shape measuring part 111 (see FIG. 2) for carrying out the medicine shape measuring process. Specifically, the control part 11 carries out a process according to the medicine dispensing program stored in the storage part 12 to act as the shape measuring part 111 (one example of shape measuring means).

Here, description will be given to one example of procedures of the medicine shape measuring process with reference to FIGS. 27 to 30. In this regard, another configuration in which a control part such as a CPU and an electronic circuit is provided in the medicine photographing apparatus 7 and the medicine shape measuring process at the step S34 is carried out by the control part may be considered as another embodiment.

[Medicine Shape Measuring Process]

<Step S41>

Figure 27:
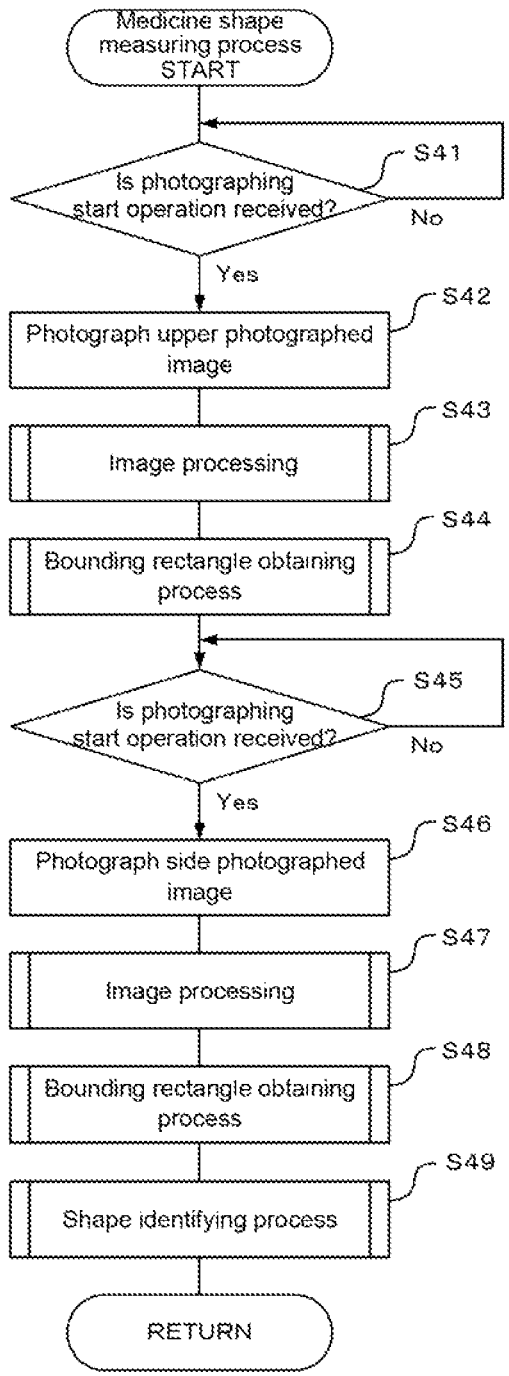
FIG. 27 is a flow chart for explaining one example of procedures of a medicine shape measuring process carried out in the medicine dispensing apparatus according to the embodiment of the present invention.
Figure 28:
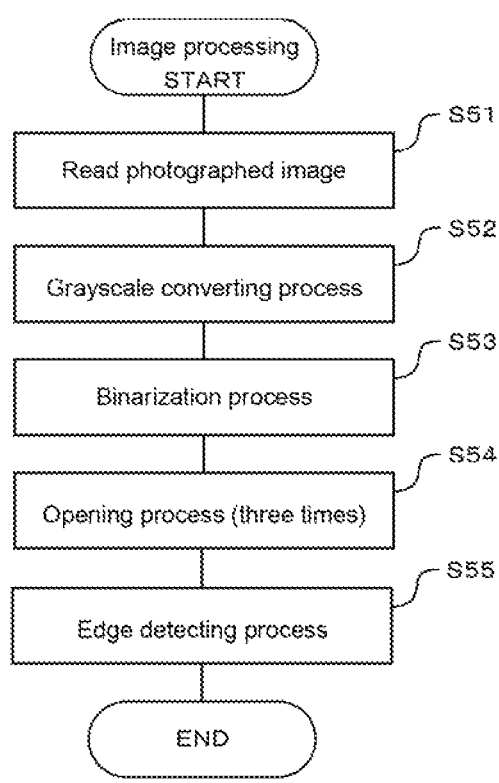
FIG. 28 is a flow chart for explaining one example of procedures of an image processing carried out in the medicine dispensing apparatus according to the embodiment of the present invention.
Figure 29:
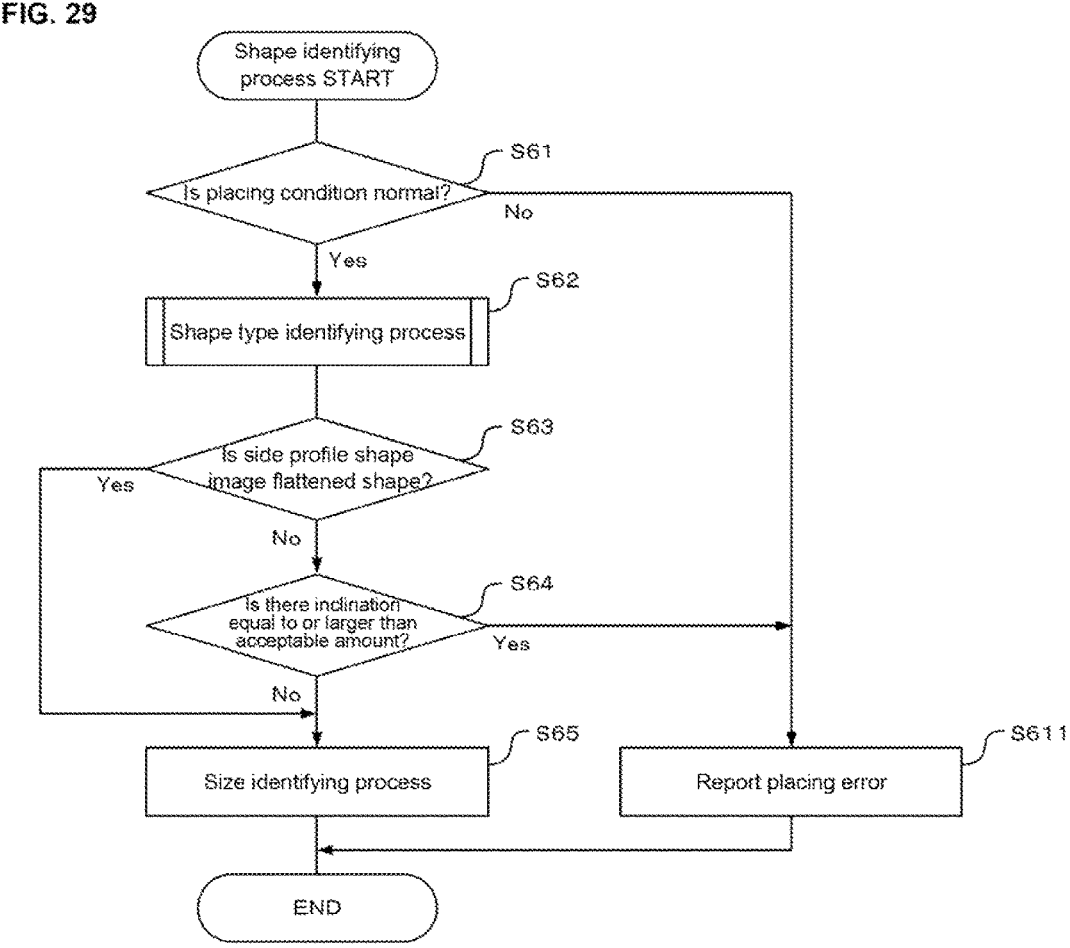
FIG. 29 is a flow chart for explaining one example of procedures of a shape identifying process carried out in the medicine dispensing apparatus according to the embodiment of the present invention.

First, as shown in FIG. 27, at a step S41, the control part 11 waits for a photographing start request for allowing the photographing part 83 to photograph an image of the medicine holding part 81 in the first posture (the case of determining "No" at the step S41).

For example, at the step S41, the control part 11 allows the monitor 13 to display a photographing start key for receiving the photographing start request. Further, the control part 11 allows the monitor 13 to display a message facilitating the user to set the tablet to be measured in the medicine photographing apparatus 7 and operate the photographing start key. With this configuration, the user sets the tablet to be measured in the medicine photographing apparatus 7 and then operates the photographing start key displayed on the operating part 14. When the photographing start operation is carried out (the case of determining "Yes" at the step S41), the process shifts to a step S42.

<Step S42>

At the step S42, the control part 11 controls the medicine photographing apparatus 7 to irradiate the tablet placed on the medicine placing part 810 with the light sources 821 of the lighting part 82 and photograph the image of the tablet with the camera 831 of the photographing part 83. Namely, the lighting part 82 starts to irradiate when the camera 831 photographs the image and stops irradiating after the camera 831 photographs the image. In this regard, the control part 11 turns on all of the four light sources 821 of the lighting part 82. The photographed image photographed by the camera 831 in this step is stored in the storage part 12. Hereinafter, the image photographed by the photographing part 83 at the step S42 in a state that the medicine holding part 81 is in the first posture is referred to as an upper photographed image.

For example, a range photographed by the photographing part 83 as the upper photographed image is a range containing only the medicine placing part 810, the gripping parts 811, 812 and the placing reference part 813 among the components of the medicine holding part 81. Further, it may be considered that the photographing part 83 photographs a range containing other components located at the external side of the medicine placing part 810, the gripping parts 811, 812 and the placing reference part 813 among the components of the medicine holding part 81 and the control part 11 trims a range of an image containing only the medicine placing part 810, the gripping parts 811, 812 and the placing reference part 813 from this photographed image as the upper photographed image.

<Step S43>

Next, at the step S43, the control part 11 carries out an image processing on the upper photographed image to obtain a profile shape of the tablet contained in the upper photographed image. Here, description will be given to one example of procedures of the image processing with reference to FIG. 28.

[Image Processing]

<Step S51>

Figure 32A:
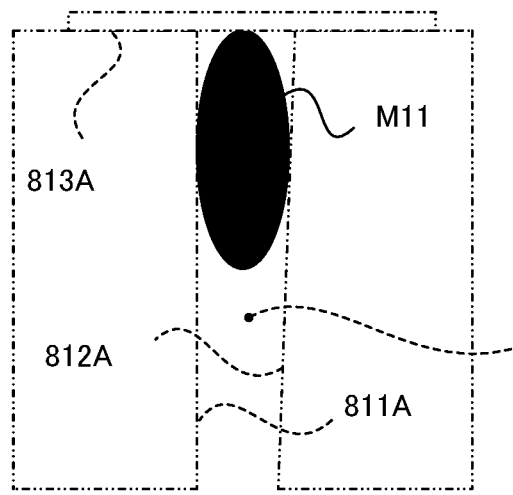
FIGS. 32A-32C are views illustrating one example of an image photographed by the medicine photographing apparatus according to the embodiment of the present invention.

First, at a step S51, the control part 11 reads the upper photographed image from the storage part 12. FIG. 32A is a view illustrating one example of the upper photographed image photographed by the camera 831 at the step S42. As shown in FIG. 32A, the upper photographed image contains a shadow image M11 of the tablet formed by interrupting the light emitted from the lighting part 82 by the tablet placed on the medicine placing surface 810A. On the other hand, since each of the medicine placing part 810, the gripping parts 811, 812 and the placing reference part 813 has translucency, information on the medicine placing part 810, the gripping parts 811, 812 and the placing reference part 813 is disappeared in the upper photographed image because of white spots.

<Step S52>

At a step S52, the control part 11 carries out a grayscale converting process for converting the upper photographed image which is a color image photographed by the camera 831 into a gradation image (grayscale image). In this regard, since the grayscale converting process is a well-known image processing, detailed description for the grayscale converting process is omitted.

<Step S53>

Next, at a step S53, the control part 11 carries out a binarization process for converting the gradation image converted at the step S52 into a monochrome binary image. In this regard, since the binarization process is a well-known image processing, detailed description for the binarization process is omitted.

<Step S54>

After that, at a step S54, the control part 11 carries out an opening process for repeatedly applying a demagnifying process and a magnifying process on the binary image converted at the step S53 by predetermined times. In the opening process, the magnifying process is carried out on the binary image after the demagnifying process is carried out on the binary image to remove noises such as grit and dust from the upper photographed image. For example, the demagnifying process and the magnifying process are repeatedly carried out three times in the opening process.

<Step S55>

Figure 32B:
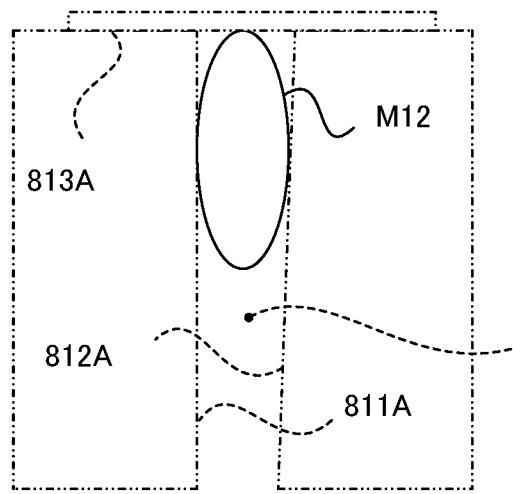

Then, at a step S55, the control part 11 carries out an edge detecting process for detecting edges in the upper photographed image from which the noises are removed at the step S54. With this configuration, as shown in FIG. 32B, the control part 11 can detect an upper profile shape image M12 which is the profile shape of the shadow image M11 contained in the upper photographed image. In this regard, since the edge detecting process is a well-known image processing, detailed description for the edge detecting process is omitted.

Further, it may be considered that the control part 11 compares an initial photographed image preliminarily stored as a photographed image in the first posture with the upper photographed image in the image processing to carry out a differential process for deleting an unnecessary part. With this configuration, in the case where a part of the medicine holding part 81 exists in the upper photographed image photographed by the photographing part 83, it is possible to remove the part of the medicine holding part 81 from the upper photographed image to extract the image of the tablet. For example, it may be considered that it is possible to simplify the structure of the medicine photographing apparatus 7 because a photographing accuracy required to the lighting part 82 and the photographing part 83 decreases.

<Step S44>

Figure 32C:
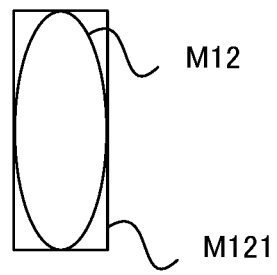

Next, back to FIG. 27, at a step S44, the control part 11 carries out a bounding rectangle obtaining process for obtaining a bounding rectangle of the tablet based on the upper profile shape image M12 obtained at the step S43. The control part 11 detects a left side edge, a right side edge, an upper side edge and a lower side edge of the upper profile shape image M12 in turn to detect a rectangle containing these edges as the bounding rectangle of the upper profile shape image M12. In FIG. 32C, one example of a bounding rectangle M121 of the upper profile shape image M12 is illustrated.

<Step S45>

Subsequently, at a step S45, the control part 11 waits for a photographing start operation for allowing the photographing part 83 to photograph an image of the medicine holding part 81 in the second posture (the case of determining "No" at the step S45).

For example, at the step S45, the control part 11 allows the monitor 13 to display a photographing start key for receiving the photographing start request. Further, the control part 11 allows the monitor 13 to display a message facilitating the user to move the medicine holding part 81 into the second posture and then operate the photographing start key. With this configuration, the user operates the operating part 73 of the medicine photographing apparatus 7 to move the medicine holding part 81 into the second posture and then operates the photographing start key displayed on the operating part 14. When the photographing start operation is carried out (the case of determining "Yes" at the step S45), the process shifts to a step S46.

Further, another configuration in which the medicine photographing apparatus 7 includes posture detecting means such as a mechanical sensor and an optical sensor for detecting that the medicine holding part 81 moves to the second posture may be considered as another embodiment. In this case, at the step S45, the control part 11 uses the posture detecting means to determine whether or not the predetermined second posture is detected. With this configuration, when the second posture is detected by the posture detecting means, the control part 11 starts to photograph the tablet at a subsequent step S46. This can reduce time and effort of the user operation. Further, another configuration in that the control part 11 starts to photograph the upper photographed image when the closing of the opening and closing part 72 is detected by the mechanical sensor, the optical sensor or the like in a state that the medicine holding part 81 is in the first posture may be considered as another embodiment.

Further, it may be considered that the control part determines that the medicine holding part 81 is in the second posture at the step S45 based on presence/absence of a specific image contained in the photographed image photographed by the camera 831 and regardless of whether or not the tablets is placed on the medicine placing part 810. In this case, the control part 11 and the camera 831 is one example of the posture detecting means. With this configuration, the control part 11 can judge timing for starting to photograph a side photographed image based on an image photographed by the camera 831 to automatically start to photograph the side photographed image without providing a sensor for detecting whether or not the medicine holding part 81 is in the second posture.

For example, it may be considered that the control part 11 determines presence/absence of an image containing a part or all of the medicine holding part 81 (one example of the specific image) in a state that the medicine holding part 81 is in the second posture to detect whether or not the medicine holding part 81 is in the second posture. Further, it may be considered that the medicine holding part 81 is located in a photographing range of the camera 831 when the medicine holding part 81 is in the second posture and a specific mark (one example of the specific image), which is located outside the photographing range of the camera 831 when the medicine holding part 81 is in the first posture, is provided on the medicine holding part 81. In this case, the control part 11 can detect whether or not the pivot posture of the medicine holding part 81 is the second posture according to presence/absence of the specific mark based on the image photographed by the camera 831.

<Step S46>

At a step S46, the control part 11 controls the medicine photographing apparatus 7 to irradiate the tablet placed on the medicine placing part 810 with the light sources 821 of the lighting part 82 and photograph the image of the tablet with the camera 831 of the photographing part 83. However, the control part 11 turns off the two light sources 821 provided on the right side and turns on only the two light sources 821 provided on the left side among the light sources 821 of the lighting part 82 at the step S46 unlike the step S42. With this configuration, the medicine holding part 81 in the second posture is irradiated by each of the light sources 821. Thus, it is possible to prevent halation which can be caused when all of the light sources 821 are turned on, thereby improving the measuring accuracy for the shape of the tablet. The photographed image photographed by the camera 831 at this step is stored in the storage part 12. Hereinafter, the image of the tablet photographed by the photographing part 83 at the step S46 in a state that the medicine holding part 81 is in the second posture will be referred to as a side photographed image.

For example, a range photographed by the photographing part 83 as the side photographed image is a range containing only the medicine placing part 810, the gripping parts 811, 812 and the placing reference part 813 among the components of the medicine holding part 81. Further, it may be considered that the photographing part 83 photographs a range containing other components located at the external side of the medicine placing part 810, the gripping parts 811, 812 and the placing reference part 813 among the components of the medicine holding part 81 and the control part 11 trims a range of an image containing only the medicine placing part 810, the gripping parts 811, 812 and the placing reference part 813 from this photographed image as the side photographed image.

<Step S47>

Next, at a step S47, the control part 11 carries out the same image processing as the step S43 (see FIG. 28) on the side photographed image. With this configuration, it is possible to detect a side profile shape image M14 (see FIG. 33B) which is a profile shape of the shadow image M13 (see FIG. 33A) of the tablet contained in the side photographed image. Also in this case, it may be considered that the control part 11 compares an initial photographed image preliminarily stored as a photographed image in the second posture with the side photographed image in the image processing to carry out the differential process for deleting the unnecessary part.

<Step S48>

Figure 33A:
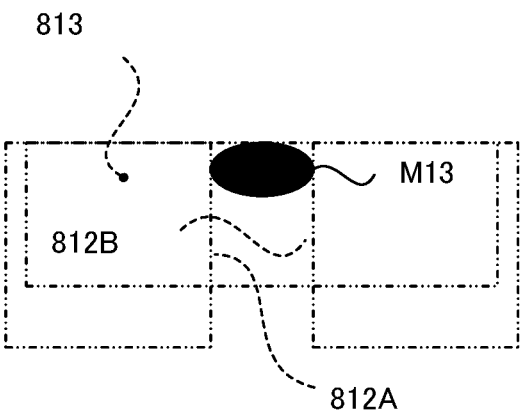
FIGS. 33A-33D are another views illustrating another example of the image photographed by the medicine photographing apparatus according to the embodiment of the present invention.
Figure 33B:
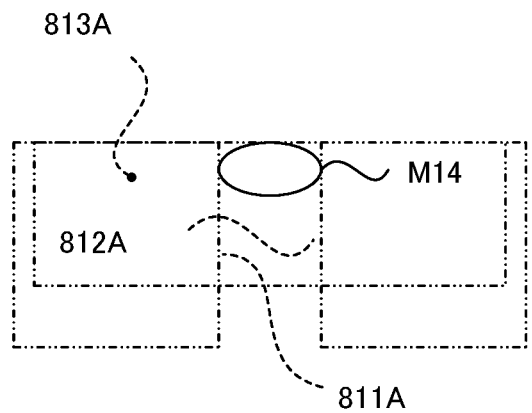
Figure 33C:
Figure 33D:
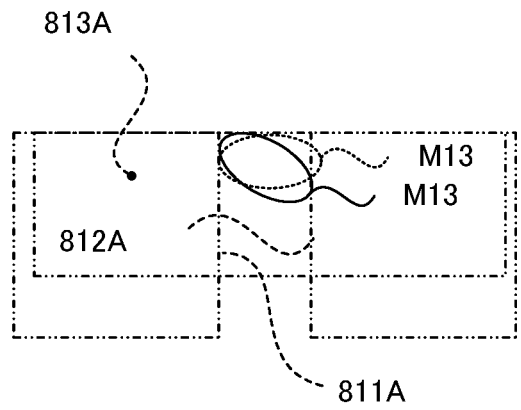

Then, at a step S48, the control part 11 carries out the same bounding rectangle obtaining process as the step S44 on the side profile shape image M14. With this configuration, the control part 11 detects a left side edge, a right side edge, an upper side edge and a lower side edge of the side profile shape image M14 in turn to detect a rectangle containing these edges as the bounding rectangle of the side profile shape image M14. In FIG. 33C, one example of a bounding rectangle M141 of the side profile shape image M14 is illustrated.

<Step S49>

Subsequently, at a step S49, the control part 11 carries out a shape identifying process for identifying a shape type and a size of the tablet based on the upper profile shape image M12, the bounding rectangle M121, the side profile shape image M14, the bounding rectangle M141 and the like. Here, description will be given to one example of the shape identifying process with reference to FIG. 29.

[Shape Identifying Process]

<Step S61>

At a step S61, the control part 11 determines whether or not the tablet is placed on the medicine placing part 810 in a predetermined normal condition. When the control part 11 determines that the tablet is not placed on the medicine placing part 810 in the predetermined normal condition (the case of determining "No" at the step S61), the process shifts to a step S611. On the other hand, when the control part 11 determines that the tablet is placed on the medicine placing part 810 in the predetermined normal condition (the case of determining "Yes" at the step S61), the process shifts to a step S62. In this regard, the normal condition of the tablet when the tablet is placed on the medicine placing part 810 is the same as the condition when the tablet is placed on the second rotating body 224 of the unspecified cassette 22 and conveyed. Specifically, in the condition of the tablet in the dispensing path when the tablet is conveyed by the second rotating body 224, the conveying direction by the second rotating body 224 is parallel to a direction in which the tablet has the longest size (length) and the width direction of the dispensing path is parallel to a direction in which the tablet has the second longest size. Namely, in the normal placing condition of the tablet with respect to the medicine placing part 810, the medicine placing surface 810A is parallel to a plane containing the direction in which the tablet has the longest size and the direction in which the tablet has the second longest size.

For example, the control part 11 determines that the tablet is not placed in the normal condition in the case where a size in a direction parallel to the gripping direction of the gripping surfaces 811A, 812A in the bounding rectangle M121 of the upper profile shape image M12 photographed when the medicine holding part 81 is in the first posture (hereinafter, this direction is referred to as a width direction) is larger than a size in a direction perpendicular to the gripping direction and parallel to the medicine placing surface 810A (hereinafter, this direction is referred to as a vertical direction). In addition, the control part 11 also determines that the tablet is not placed in the normal condition in the case where a size in a direction perpendicular to the medicine placing surface 810A in the bounding rectangle M141 of the side profile shape image M14 photographed when the medicine holding part 81 is in the second posture (hereinafter, this direction is referred to as a height direction) is larger than the size in the width direction.

As described above, it is possible to check that the tablet is placed on the medicine placing surface 810A in the normal condition, thereby preventing the height direction of the tablet from being misidentified as the width direction or the vertical direction. Thus, it is possible to prevent a case where the size of the tablet in the height direction to be restricted by the height restriction member 226 of the unspecified cassette 22 is not appropriately adjusted. In the same manner, it is possible to check that the tablet is placed on the medicine placing surface 810A in the normal condition, thereby preventing the width direction of the tablet from being misidentified as the height direction or the vertical direction. Thus, it is possible to prevent a case where the size of the tablet in the width direction to be restricted by the width restriction member 227 of the unspecified cassette 22 is not appropriately adjusted.

In the case of taking a configuration in which a complex image processing can be carried out based on the image data of the tablet photographed by the medicine photographing apparatus 7, it is possible to accurately measure the shape of the tablet even if the tablet is placed on the medicine placing surface 810A in an arbitrary posture. However, in this case, since the configuration in which the complex image processing can be carried out is required, a hardware or software for measuring the shape of the tablet becomes high-cost.

In contrast, in the medicine photographing apparatus 7 used in the medicine dispensing apparatus 100, the normal condition of the tablet when the user places the tablet on the medicine placing surface 810A is defined. Further, in the medicine dispensing apparatus 100, it is checked that the tablet is placed on the medicine placing surface 810A in the normal condition. Therefore, in the medicine dispensing apparatus 100, since a hardware or software capable of carrying out a complex image processing based on the image data of the tablet is not required, it is possible to suppress a cost required for a configuration for measuring the shape of the tablet. Thus, it is also possible to provide the medicine photographing apparatus 7 which includes a control part capable of measuring the shape of the tablet based on the image data photographed by the photographing part 83 and can be used independently from the medicine dispensing apparatus 100 with a low cost. Further, it may be considered that a shape measuring program in the medicine dispensing program for enabling the computer to act as the shape measuring part 111 is installed in a PC (personal computer) such as an arbitrary laptop computer and the medicine photographing apparatus 7 is connected to the PC through the cable N2 such as a USB cable, an RS232C cable and a LAN cable. With this configuration, it is possible to measure the shape (the size, the shape type and the like) of the tablet by using the PC and the medicine photographing apparatus 7. Further, in the medicine dispensing apparatus 100, it may be considered that the prescription control unit 1 receives the shape (the size, the shape type and the like) of the tablet measured by the PC from the PC to set the driving condition based on the shape of the tablet instead of the medicine shape measuring process at the step S34 of the adjusting process. In this case, the prescription control unit may not have the function for carrying out the shape measuring process.

Further, it may be considered that the control part determines that the tablet is not placed in the normal condition in the case where a square measure of the bounding rectangle M141 in the side profile shape image M14 is larger than a square measure of the bounding rectangle M121 in the upper profile shape image M12. In this regard, the abnormality detection at the step S61 is not limited to the case where the abnormality detection is carried out after photographing the upper photographed image and the side photographed image. For example, another configuration in which the abnormality detection based on the bounding rectangle M121 of the upper profile shape image M12 when the upper photographed image is photographed is carried out and the abnormality detection based on the bounding rectangle M141 of the side profile shape image M14 when the side photographed image is photographed is carried out may be considered as another embodiment.

<Step S611>

At a step S611, the control part 11 reports that the tablet is not placed on the medicine placing part 810 in the normal condition, and then terminates the medicine shape measuring process. For example, at the step S611, the control part 11 allows the monitor 13 to display an error message indicating that the tablet is not normally set.

<Step S62>

Then, at a step S62, the control part 11 carries out a shape type identifying process for identifying a shape type of the tablet based on the upper profile shape image M12 and the side profile shape image M14. In this regard, the shape type identifying process will be described later.

<Step S63>

At a step S63, the control part 11 determines whether or not the side profile shape image M14 is a flattened shape. When the control part 11 determines that the side profile shape image M14 is the flattened shape (the case of determining "Yes" at the step S63), the process shifts to a step S65. On the other hand, when the control part 11 determines that the side profile shape image M14 is not the flattened shape (the case of determining "No" at the step S63), the process shifts to a step S64. In this regard, as shown in FIG. 34, the flattened shape means a shape having two lines parallel to the longitudinal direction, tow lines parallel to the short direction and curve lines connecting these lines.

In the case where the side profile shape image M14 is the flattened shape, there is low possibility in that the tablet is placed on the medicine placing surface 810A in a state the tablet is inclined, but there is a risk in that an inclination of the tablet is determined to be large based on positions of the edges of the tablet in diagonal lines of the side profile shape image M14 at a subsequent step S64. Thus, at the step S63, a judge is carried out as to whether or not a tablet having the flattened shape which has low possibility in that the inclination of the tablet placed on the medicine placing surface 810A occurs should be eliminated from an inclination determining process at the step S64.

<Step S64>

At the step S64, the control part 11 determines whether or not an inclination larger than a predetermined acceptable amount occurs in the side profile shape image M14. Specifically, the control part 11 detects a positional displacement amount in the height direction of both edges in the width direction of the side profile shape image M14 to determine that the inclination larger than the acceptable amount occurs in the side profile shape image M14 in the case where the positional displacement amount is larger than a predetermined acceptable value. When the control part 11 determines that the inclination larger than the acceptable amount occurs in the side profile shape image M14 (the case of determining "Yes" at the step S64), the process shifts to the step S611. On the other hand, when the control part 11 determines that the inclination larger than the acceptable amount does not occur (the case of determining "No" at the step S64), the process shifts to the step S65.

<Step S65>

Then, at the step S65, the control part 11 carries out a size identifying process for identifying sizes of the tablet in the vertical direction, the width direction and the height direction based on the upper profile shape image M12 and the side profile shape image M14. In this regard, it may be considered that the control part 11 employs the size of one of the upper profile shape image M12 and the side profile shape image M14 as the size of the tablet in the width direction or employs an average value of the sizes of the upper profile shape image M12 and the side profile shape image M14 as the size of the tablet in the width direction. Further, it may be considered that the control part 11 reports an error message in the case where an error equal to or larger than a predetermined acceptable value occurs between the size in the width direction in the upper profile shape image M12 and the size in the width direction in the side profile shape image M14.

Further, in the case where an inclination less than the acceptable amount occurs in the side profile shape image M14, it is preferable that the control part 11 carries out a correction process for correcting the size of the tablet in the width direction, the height direction and the like in the upper profile shape image M12 and the side profile shape image M14 with considering the inclination. For example, when an angle of the inclination is defined as $\theta$, the size in the width direction in the upper profile shape image M12 or the side profile shape image M14 is defined as $\alpha$ and the actual size in the width direction of the tablet is defined as $\beta$, the control part 11 calculates the size $\beta$ according to an equation of $\beta=\alpha/\cos(\theta)$.

[Shape Type Identifying Process]

Here, description will be given to one example of procedures of the shape type identifying process carried out at the step S62 with reference to flowcharts in FIGS. 30 and 31. In this regard, an image processing technic such as Hough transformation is used for a detecting process for a line or a circular shape carried out in the shape type identifying process.

<Step S71>

Figure 30:
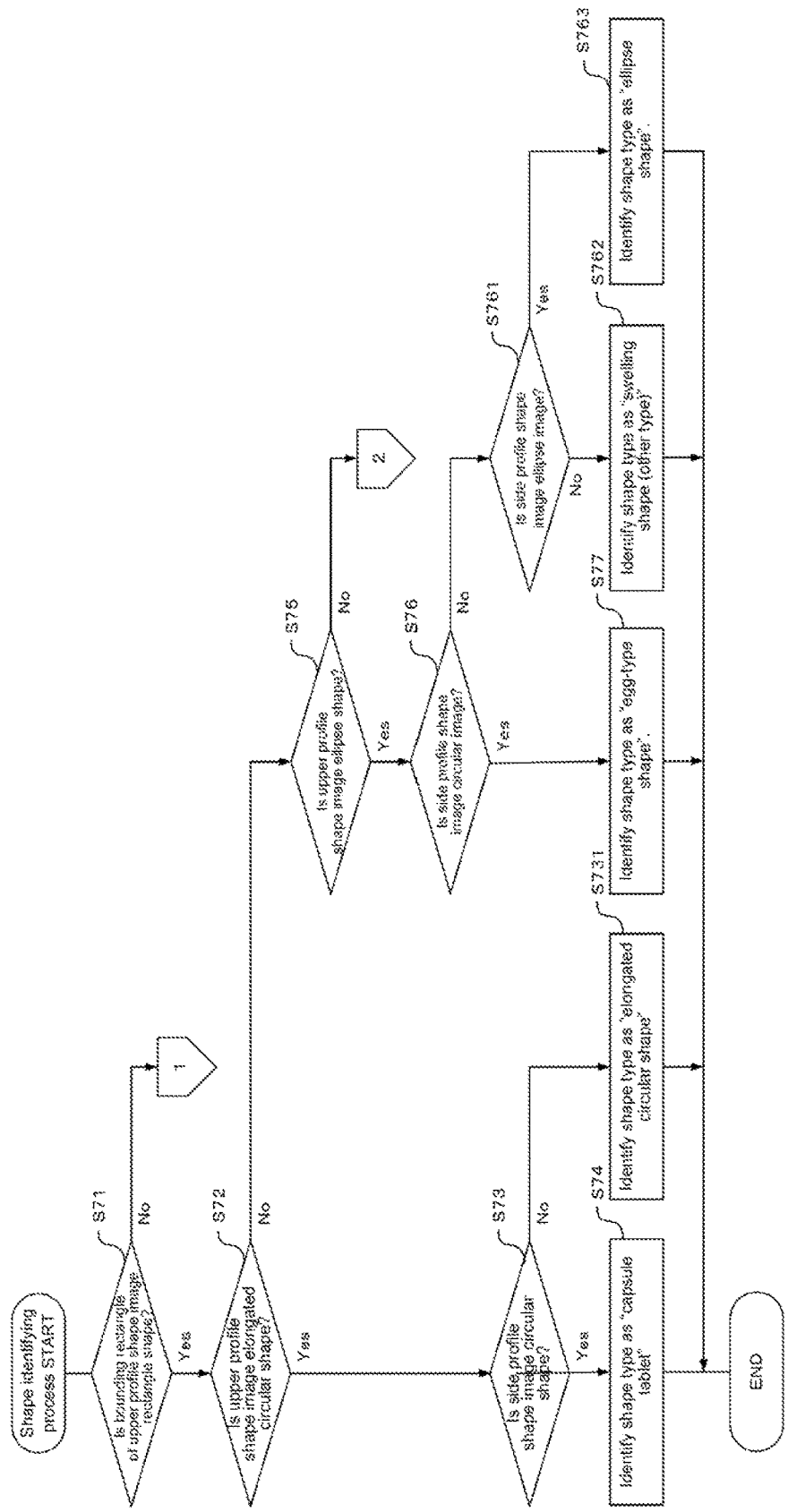
FIG. 30 is a flow chart for explaining one example of procedures of a shape type identifying process carried out in the medicine dispensing apparatus according to the embodiment of the present invention.

First, as shown in FIG. 30, at a step S71, the control part 11 determines whether or not the bounding rectangle M121 of the upper profile shape image M12 obtained from the upper photographed image photographed in the first posture is a rectangular shape. Specifically, the control part 11 determines that the bounding rectangular M121 is the rectangular shape in the case where a ratio of the size of the bounding rectangle M121 in the vertical direction and the size of the bounding rectangle M121 in the width direction (the size in the width direction/the size in the vertical direction) is equal to or more than 1.1. When the control part 11 determines that the bounding rectangle M121 is the rectangular shape (the case of determining "Yes" at the step S71), the process shifts to a step S72. On the other hand, when the control part 11 determines that the bounding rectangle M121 is not the rectangular shape (the case of determining "No" at the step S71), the process shifts to a step S78 (see FIG. 31).

<Step S72>

At the step S72, the control part 11 determines whether or not the upper profile shape image M12 is an elongated circular shape. Specifically, the control part 11 determines that the upper profile shape image M12 is the elongated circular shape in the case where at least one line having a length equal to or longer than ⅓ of the size in the vertical direction exists in the vertical direction of the upper profile shape image M12 or in the case where two lines each having a length equal to or longer than ¼ of the size in the vertical direction exist in the vertical direction of the upper profile shape image M12. When the control part 11 determines that the upper profile shape image M12 is the elongated circular shape (the case of determining "Yes" at the step S72), the process shifts to a step S73. On the other hand, when the control part 11 determines that the upper profile shape image M12 is not the elongated circular shape (the case of determining "No" at the step S72), the process shifts to a step S75.

<Step S73>

At the step S73, the control part 11 determines whether or not the side profile shape image M14 obtained from the side photographed image photographed in the second posture is a circular shape. When the control part 11 determines that the side profile shape image M14 is the circular shape (the case of determining "Yes" at the step S73), the process shifts to a step S74. On the other hand, when the control part 11 determines that the side profile shape image M14 is not the circular shape (the case of determining "No" at the step S73), the process shifts to a step S731.

<Step S74>

At the step S74, the control part 11 identifies that the shape type of the tablet is "capsule tablet". FIG. 34 is a view illustrating a tabulated list for shape types of the tablet. As shown in FIG. 34, in the case where the upper profile shape image M12 is the elongated circular shape and the side profile shape image M14 is the circular shape, the shape type of the tablet is identified as "capsule tablet".

<Step S731>

On the other hand, at the step S731, the control part 11 identifies that the shape type of the tablet is "elongated circular shape". Namely, as shown in FIG. 34, in the case where the upper profile shape image M12 is the elongated circular shape and the side profile shape image M14 is the flattened shape or the swelling shape other than the circular shape, the shape type of the tablet is identified as "elongated circular shape". In this regard, as shown in FIG. 34, the elongated circular shape means a shape having two lines parallel to the longitudinal direction and curved lines connecting these lines.

<Step S75>

At the step S75, the control part 11 determines whether or not the upper profile shape image M12 is an ellipse shape. Specifically, the control part 11 determines that the upper profile shape image M12 is the ellipse shape in the case where a line does not exist in the upper profile shape image M12 and one mountain-like portion exists in the upper profile shape image M12 (in the case where concave and convex portions do not exist in the upper profile shape image M12). When the control part 11 determines that the upper profile shape image M12 is the ellipse shape (the case of determining "Yes" at the step S75), the process shifts to a step S76. On the other hand, when the control part 11 determines that the upper profile shape image M12 is not the ellipse shape (the case of determining "No" at the step S75), the process shifts to a step S81 (see FIG. 31).

<Step S76>

At the step S76, the control part 11 determines whether or not the side profile shape image M14 is a circular shape. When the control part 11 determines that the side profile shape image M14 is the circular shape (the case of determining "Yes" at the step S76), the process shifts to a step S77. On the other hand, when the control part 11 determines that the side profile shape image M14 is not the circular shape (the case of determining "No" at the step S76), the process shifts to a step S761.

<Step S77>

At the step S77, the control part 11 identifies that the shape type of the tablet is "egg-type shape". Namely, as shown in FIG. 34, in the case where the upper profile shape image M12 is the ellipse shape and the side profile shape image M14 is the circular shape, the shape type of the tablet is identified as "egg-type shape".

<Step S761>

At the step S761, the control part 11 determines whether or not the side profile shape image M14 is an ellipse shape. Specifically, the control part 11 determines that the side profile shape image M14 is the ellipse shape in the case where a line does not exist in the height direction of the side profile shape image M14. When the control part 11 determines that the side profile shape image M14 is the ellipse shape (the case of determining "Yes" at the step S761), the process shifts to a step S762. On the other hand, when the control part 11 determines that the line exists in the height direction of the side profile shape image M14 and the side profile shape image M14 is not the ellipse shape (the case of determining "No" at the step S761), the process shifts to a step S763.

<Step S762>

At the step S762, the control part 11 identifies that the shape type of the tablet is "swelling shape (other type)". Namely, as shown in FIG. 34, in the case where the upper profile shape image M12 is the ellipse shape and the side profile shape image M14 is also the ellipse shape, the shape type of the tablet is identified as "swelling shape (other type)". In this regard, as shown in FIG. 34, the swelling shape means a shape having two lines parallel to the short direction and curved lines connecting these lines.

<Step S763>

At the step S763, the control part 11 identifies that the shape type of the tablet is "ellipse shape". Namely, as shown in FIG. 34, in the case where the upper profile shape image M12 is the ellipse shape and the side profile shape image M14 is the flattened shape or the swelling shape other than the circular shape or the ellipse shape, the shape type of the tablet is identified as "ellipse shape".

<Step S78>

Figure 31:
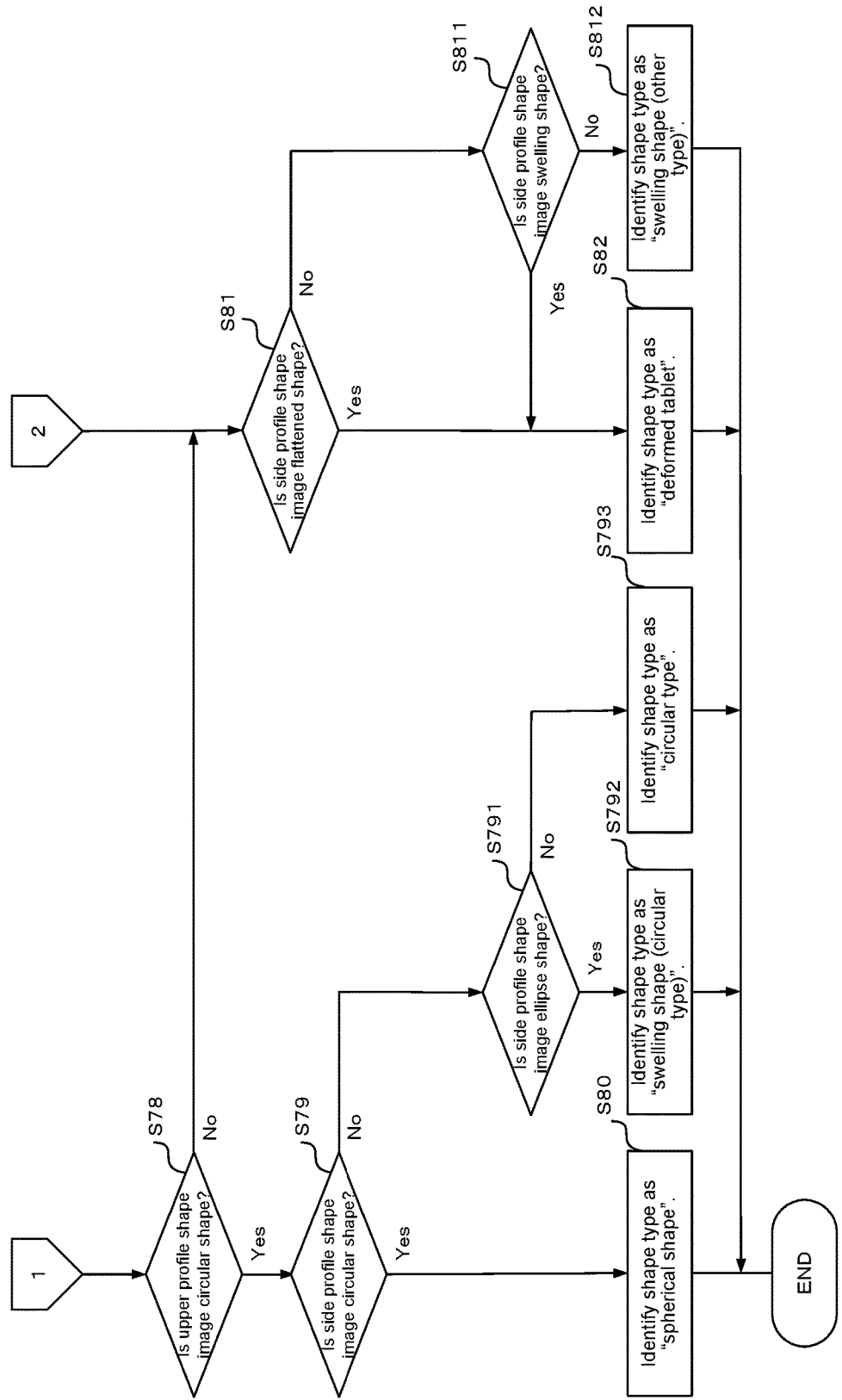
FIG. 31 is another flow chart for explaining the example of procedures of the shape type identifying process carried out in the medicine dispensing apparatus according to the embodiment of the present invention.

Next, as shown in FIG. 31, at the step S78, the control part 11 determines whether or not the upper profile shape image M12 is a circular shape. When the control part 11 determines that the upper profile shape image M12 is the circular shape (the case of determining "Yes" at the step S78), the process shifts to a step S79. On the other hand, when the control part 11 determines that the upper profile shape image M12 is not the circular shape (the case of determining "No" at the step S78), the process shifts to a step S81.

<Step S79>

At the step S79, the control part 11 determines whether or not the side profile shape image M14 is a circular shape. When the control part 11 determines that the side profile shape image M14 is the circular shape (the case of determining "Yes" at the step S79), the process shifts to a step S80. On the other hand, when the control part 11 determines that the side profile shape image M14 is not the circular shape (the case of determining "No" at the step S79), the process shifts to a step S791.

<Step S80>

At the step S80, the control part 11 identifies that the shape type of the tablet is "spherical shape". Namely, as shown in FIG. 34, in the case where the upper profile shape image M12 is the circular shape and the side profile shape image M14 is also the circular shape, the shape type of the tablet is identified as "spherical shape".

<Step S791>

At the step S791, the control part 11 determines whether or not the side profile shape image M14 is an ellipse shape in the same manner as the step S761. When the control part 11 determines that the side profile shape image M14 is the ellipse shape (the case of determining "Yes" at the step S791), the process shifts to a step S792. On the other hand, when the control part 11 determines that the side profile shape image M14 is not the ellipse shape (the case of determining "No" at the step S791), the process shifts to a step S793.

<Step S792>

At the step S792, the control part 11 identifies that the shape type of the tablet is "swelling shape (circular type)". Namely, as shown in FIG. 34, in the case where the upper profile shape image M12 is the circular shape and the side profile shape image M14 is the ellipse shape, the shape type of the tablet is identified as "swelling shape (circular type)".

<Step S793>

At the step S793, the control part 11 identifies that the shape type of the tablet is "circular shape". Namely, as shown in FIG. 34, in the case where the upper profile shape image M12 is the circular shape and the side profile shape image M14 is the flattened shape or the swelling shape other than the circular shape or the ellipse shape, the shape type of the tablet is identified as "circular shape".

<Step S81>

At the step S81, the control part 11 determines whether or not the side profile shape image M14 is a flattened shape. Specifically, the control part 11 determines that the side profile shape image M14 is the flattened shape in the case where lines respectively exist in the vertical direction and the width direction of the side profile shape image M14. When the control part 11 determines that the side profile shape image M14 is the flattened shape (the case of determining "Yes" at the step S81), the process shifts to a step S82. On the other hand, when the control part 11 determines that the side profile shape image M14 is not the flattened shape (the case of determining "No" at the step S81), the process shifts to a step S811.

<Step S82>

At the step S82, the control part 11 identifies that the shape type of the tablet is "deformed tablet". Namely, as shown in FIG. 34, in the case where the upper profile shape image M12 is not the elongated circular shape, the ellipse shape or the circular shape and the side profile shape image M14 is the flattened shape or the swelling shape other than the circular shape or the ellipse shape, the shape type of the tablet is identified as "deformed tablet".

<Step S811>

At the step S811, the control part 11 determines whether or not the side profile shape image M14 is a swelling shape. Specifically, the control part 11 determines that the side profile shape image M14 is the swelling shape in the case where a line exists in the vertical direction of the side profile shape image M14 and a circular arc exists in the width direction of the side profile shape image M14. When the control part 11 determines that the side profile shape image M14 is the swelling shape (the case of determining "Yes" at the step S811), the process shifts to the step S82 and then the shape type of the tablet is identified as "deformed tablet". Namely, as shown in FIG. 34, in the case where the upper profile shape image M12 is not the elongated circular shape, the ellipse shape or the circular shape and the side profile shape image M14 is not any one of the circular shape, the ellipse shape, the flattened shape and the swelling shape, the shape type of the tablet is identified as "deformed tablet". On the other hand, when the control part 11 determines that the side profile shape image M14 is not the swelling shape (the case of determining "No" at the step S811), the process shifts to a step S812.

<Step S812>

At the step S812, the control part 11 identifies that the shape type of the tablet is "swelling shape (other type)". Namely, as shown in FIG. 34, in the case where the upper profile shape image M12 is not the elongated circular shape, the ellipse shape or the circular shape and the side profile shape image M14 is the swelling shape, the shape type of the tablet is identified as swelling shape (other type)".

As described above, in the shape type identifying process, the shape type of the tablet is identified by a selection from the predetermined nine kinds of shape types according to a combination of the shape of the upper profile shape image M12 and the shape of the side profile shape image M14. With this configuration, it is possible to reduce time and effort for measuring the shape of the tablet by the user. Further, since the process for identifying the shapes of the upper profile shape image M12 and the side profile shape image M14 can be carried out by using only a versatile process such as Hough transformation, it is possible to provide a configuration required for measuring the shape of the tablet easily and at a low cost.

<Step S35>

Then, back to FIG. 26, at a step S35, the control part 11 carries out a setting process for setting the driving condition (the prior driving condition, the under-driving condition and the driving stop condition) of the unspecified cassette 22 based on the shape of the tablet measured in the medicine shape measuring process. The control part 11 includes a driving condition setting part 112 (see FIG. 2) for carrying out the setting process for the driving condition. Specifically, the control part 11 carries out a process according to the medicine dispensing program stored in the storage part 12 to act as the driving condition setting part 112 (one example of driving condition setting means).

FIG. 35 is a view illustrating one example of setting information indicating a relationship between the shape of the tablet and setting contents of the driving condition. The setting information is preliminarily stored in the storage part 12. In the example shown in FIG. 35, for each shape of the tablet, the setting content of each item for the height of the dispensing path, the width of the dispensing path, the dispensing speed, the first slowdown, the second slowdown and the reverse rotation operation which are the driving condition is defined. Further, the control part 11 sets the driving condition corresponding to the tablet based on the shape of the tablet measured in the medicine shape measuring process and the setting information.

For example, the height and the width of the dispensing path indicate a relationship between: the height and the weight of the tablet measured in the medicine shape measuring process; and setting values for the height h1 to be restricted by the height restriction member 226 of the unspecified cassette 22 and the width w1 to be restricted by the width restriction member 227 of the unspecified cassette 22. Specifically, in the case where the shape of the tablet is the capsule tablet, the height h1 to be restricted by the height restriction member 226 is set to be 1.3 times of the size of the capsule tablet in the height direction. In the same manner, in the case where the shape of the tablet is the capsule tablet, the width w1 to be restricted by the width restriction member 227 is set to be 1.4 times of the size of the capsule tablet in the width direction.

The dispensing speed indicates a dispensing speed of the tablet by the unspecified cassette 22, that is the rotating speed of the second rotating body 224. The dispensing speed is a value preliminarily set for each shape type of the tablet so that extra tablets are not dispensed from the unspecified cassette 22 by a number more than necessary. More specifically, the tablet which is likely to be rolled has high possibility that extra tablets are dispensed more than necessary if the dispensing speed is fast. Further, there is a case where the tablet whose edge portion may be moved to the upper direction is conveyed in a state that adjacent tablets are overlapped with each other in the height direction and thus a pitch between the adjacent tablets narrows when the tablets are conveyed. This makes possibility that extra tablets are dispensed more than necessary high. Thus, it is preferable that the dispensing speed is set for each shape type of the tablet with considering ease of rolling and ease of overlapping of the tablet and the like.

Specifically, dispensing speeds v21 to v24 shown in FIG. 35 have a relationship of v21>v22>v23>v24. For example, in the case where the shape type of the tablet is the spherical shape, the egg-type shape or the like which is likely to be rolled, the dispensing speed is set to be slower than the case where the shape type of the tablet is the circular shape, the deformed tablet or the like which is not likely to be rolled. Further, in the case where the shape type of the tablet is the ellipse shape or the like which is likely to be overlapped, the dispensing speed is set to be slower than the case where the shape type of the tablet is the capsule tablet, the circular shape or the like which is not likely to be overlapped.

Further, for the tablets each having the same shape type, it may be considered that different dispensing speeds are preliminarily set to the tablets depending on each size of the tablets. Specifically, even if the shape type of the tablet is the same, a pitch between the adjacent tablets having a large size when the tablets are arranged in a line and conveyed from the unspecified cassette 22 through the dispensing path becomes larger. On the other hand, a pitch between the adjacent tablets having a small size becomes smaller. Thus, even if the shape type of the tablet is the same, it may be considered that the different dispensing speeds respectively corresponding to the sizes of the tablets are set. Specifically, if the size of the tablet is small and the pitch between the adjacent tablets when the tablets are conveyed on the dispensing path is small, a more high accuracy of the counter of the unspecified cassette 22 is required for counting the tablets without making a mistake of counting the tablets. Thus, it may be considered that the relationship between the sizes of the tablets and the dispensing speeds is set so that the dispensing speed is set to be faster as the size of the tablet increases and the dispensing speed is set to be slower as the size of tablet decreases. With this configuration, it is possible to prevent the counter from making the counting mistake in the case where the size of the tablet is small without unnecessarily suppressing the dispensing speed in the case where the size of the tablet is large. Further, it is also possible to use a low-cost sensor as an optical sensor used in the counter.

Further, each of the first slowdown and the second slowdown means timing for the slowdown at the time of stopping the dispensation of the tablets from the unspecified cassette 22. Here, the numbers of the tablets respectively set as items of the first slowdown and the second slowdown are numbers preliminarily set for each shape type of the tablet so that the tablets are not dispensed from the unspecified cassette 22 by a number more than necessary. For example, in the case where the shape type of the tablet is the spherical shape which is likely to be rolled, the numbers of the tablets for the first slowdown and the second slowdown are set to be larger than the case where the shape type of the tablet is the elongated circular shape, the ellipse shape or the like which is not likely to be rolled.

The reverse rotation operation means a setting content indicating whether or not the reverse rotation operation should be carried out at the time of stopping the dispensation of the tablets from the unspecified cassette 22. The reverse rotation operation is preliminarily set for each shape type of the tablet so that the tablets are not dispensed from the unspecified cassette 22 by a number more than necessary. For example, in the case where the shape type of the tablet is the spherical shape which is likely to be rolled, the reverse rotation operation is set so that the reverse rotation operation is carried out. On the other hand, in the case where the shape type of the tablet is the circular shape, the deformed tablet or the like which is not likely to be rolled, the reverse rotation operation is set so that the reverse rotation operation is not carried out.

<Step S36>

After that, at a step S36, the control part 11 carries out a storing process for associating the driving condition set at the step S35 with the medicine information on the tablet to register the driving condition in the driving correspondence information 122. With this configuration, the driving condition corresponding to the tablet which is not registered in the driving correspondence information 122 is registered in the driving correspondence information 122. Thus, it is possible to dispense the tablets from the unspecified cassette 22 in the medicine dispensing process (see FIG. 11) after carrying out the adjusting process.

<Step S37>

Then, at a step S37, the control part 11 transmits the driving condition set at the step S35 to the control part 61. With this configuration, the control part 61 can drive the unspecified cassette 22 according to the driving condition. Specifically, the control part 61 controls the height adjusting part 226A and the width adjusting part 227A of the unspecified cassette 22 to adjust the height h1 to be restricted by the height restriction member 226 and the width w1 to be restricted by the width restriction member 227 according to the driving condition set at the step S35. Further, the control part 61 sets the dispensing speed of the tablet by the unspecified cassette 22, the timing for the first slowdown and the second slowdown at the time of stopping the dispensation of the tablets from the unspecified cassette 22 and the reverse rotating operation indicating whether or not the reverse rotating operation should be carried out at the time of stopping the dispensation of the tablets. In this regard, at the time of carrying out the adjusting process for the unspecified cassette 22 to which the medicine information is allocated, the control part 11 transmits the cassette identification information of the unspecified cassette 22 to the control part 61 together with the driving condition. In this case, the control part 11 carrying out a process for transmitting the driving condition to the control part 61 to drive the unspecified cassette 22 according to the driving condition may be considered as one example of driving control means.

In the adjusting process, the step S37 can be omitted. Namely, in the adjusting process, it may be considered that only the measurement of the shape of the tablet and the setting of the driving condition corresponding to the shape of the tablet are carried out. With this configuration, it is possible to preliminarily register the driving condition corresponding to the tablet in the driving correspondence information 122 without driving the unspecified cassette 22.

As described above, in the medicine dispensing apparatus 100, it is possible to set the driving condition for a tablet whose driving condition is not registered in the driving correspondence information 122 by carrying out the adjusting process with the medicine photographing apparatus 7, thereby dispensing the tablets from the unspecified cassette 22. Further, in the adjusting process, the user can easily photograph the image required for identifying the shape of the tablet with the medicine photographing apparatus 7. Furthermore, in the medicine photographing apparatus 7, since the photographed image of the tablet from which the parts for holding the tablet are removed can be obtained, the image processing carried out in the medicine photographing apparatus 7 can be a simple process which does not contain a complex image processing. Thus, it is unnecessary to use high-cost image processing software for the medicine shape measuring process, thereby achieving the shape measurement of the tablet with the medicine photographing apparatus 7 at a low cost.

Further, the medicine photographing apparatus 7 takes the configuration in which the camera 831 and the light sources 821 are fixed and only the medicine holding part 81 provided between the camera 831 and the light sources 821 and having a small rolling radius is pivotally moved. Thus, it is possible to downsize the medicine photographing apparatus 7 compared with the case of taking a configuration in which the camera 831 and the light sources 821 can be pivotally moved. Further, since electronic components used in the medicine photographing apparatus 7 are only the light sources 821 and the camera 831 and the other components are achieved by mechanical structures, it is possible to provide the medicine photographing apparatus 7 at a low cost. However, as another embodiment of the present invention, in the medicine photographing apparatus 7, it may be considered that the medicine holding part 81 is fixed to the opening and closing part 72 so that the medicine holding part 81 cannot be pivotally moved and a pivotally supporting part for pivotally supporting the photographing unit 84 including the camera 831 and the lighting part 82 around the medicine holding part 81 is provided. For example, in this case, it may be considered that the pivotally supporting part includes a frame member for supporting the camera 831 and the lighting part 82 and a pivot axis for pivotally supporting the frame member at a position coaxially with the position P1. Further, it is possible to consider another configuration in which a pivotally supporting part for pivotally supporting each of the medicine holding part 81 and the photographing unit 84 is provided.

[Another Usage Example of the Medicine Photographing Apparatus 7]

In this regard, it is possible to determine not only the driving condition of the unspecified cassette 22 for dispensing the tablets but also the internal structure of the specified cassette 21 by using the medicine photographing apparatus 7. Namely, by using the medicine photographing apparatus 7, it is possible to easily obtain the shape type and the size of the tablet required for producing the specified cassette 21 corresponding to the tablet.

More specifically, the present invention may be considered as a medicine shape measuring apparatus including the medicine photographing apparatus 7 and an information processing device such as a personal computer. The information processing device carries out the medicine shape measuring process (see FIG. 27) to measure the shape type and the size of the tablet based on the upper profile shape image M12 and the side profile shape image M14 photographed by the medicine photographing apparatus 7. With this configuration, it is possible to easily design the internal structure of the unspecified cassette 22 adapted for the shape type and the size of the tablet. Further, it is also possible to reduce time and effort for manually measuring the size of the tablet and prevent errors caused by human factors of an operator who visually confirm the tablet and manually operates to identify the shape type and the size of the tablet.

For example, it may be considered that convex portions or concave portions corresponding to the shape of the tablet are formed on one or a plurality of wall portions in the gap 217 based on the shape type and the size of the tablet corresponding to the unspecified cassette 22 to make the internal structure of the gap 217 similar to the tablet. With this configuration, it is possible to adapt the internal structure of the gap 217 of the unspecified cassette 22 to the shape of the tablet, thereby preventing the tablet from oscillating in the gap 217.

Second Embodiment

Figure 36:
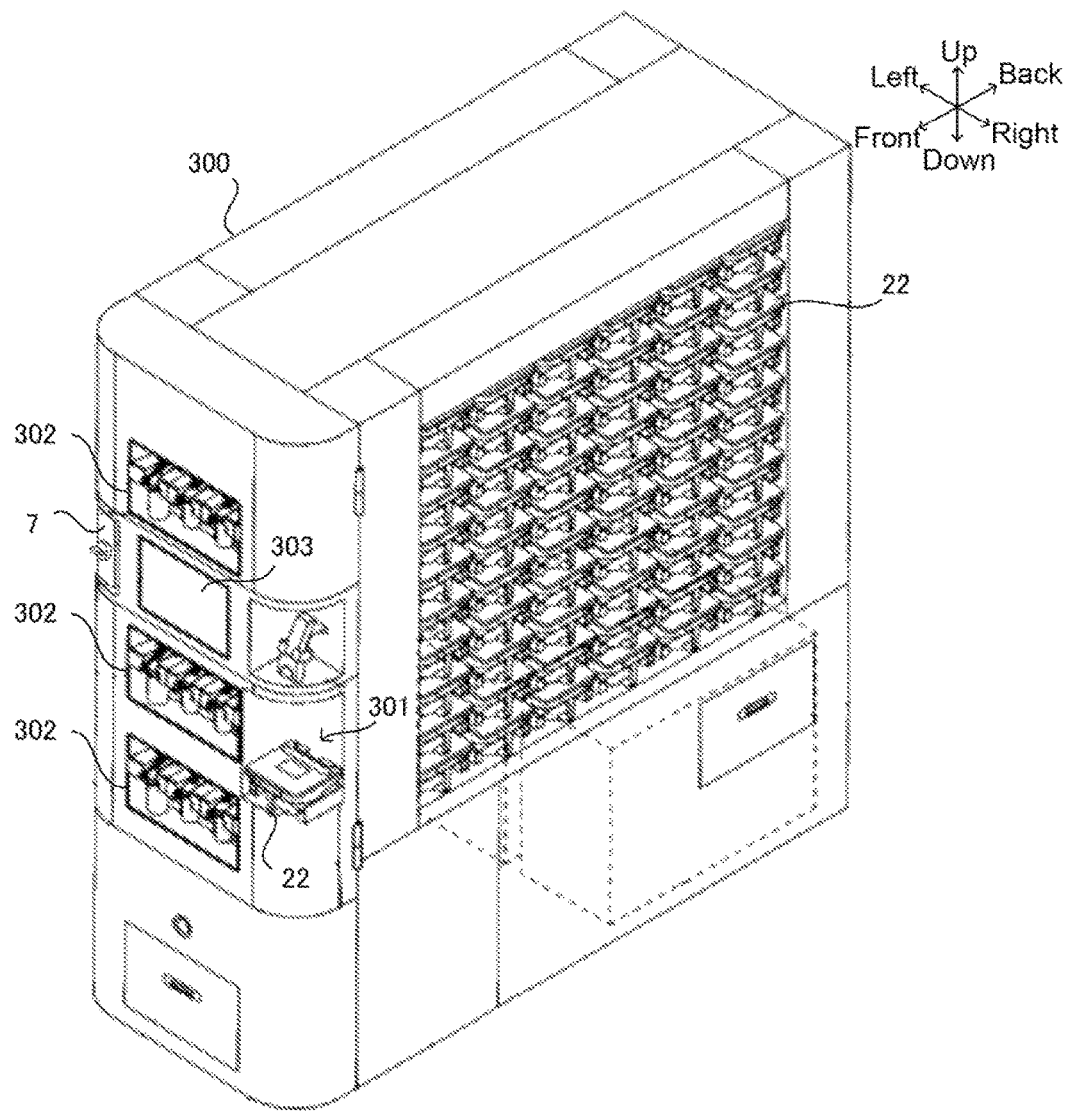
FIG. 36 is a view illustrating a medicine dispensing apparatus according to another embodiment of the present invention.
Figure 37:
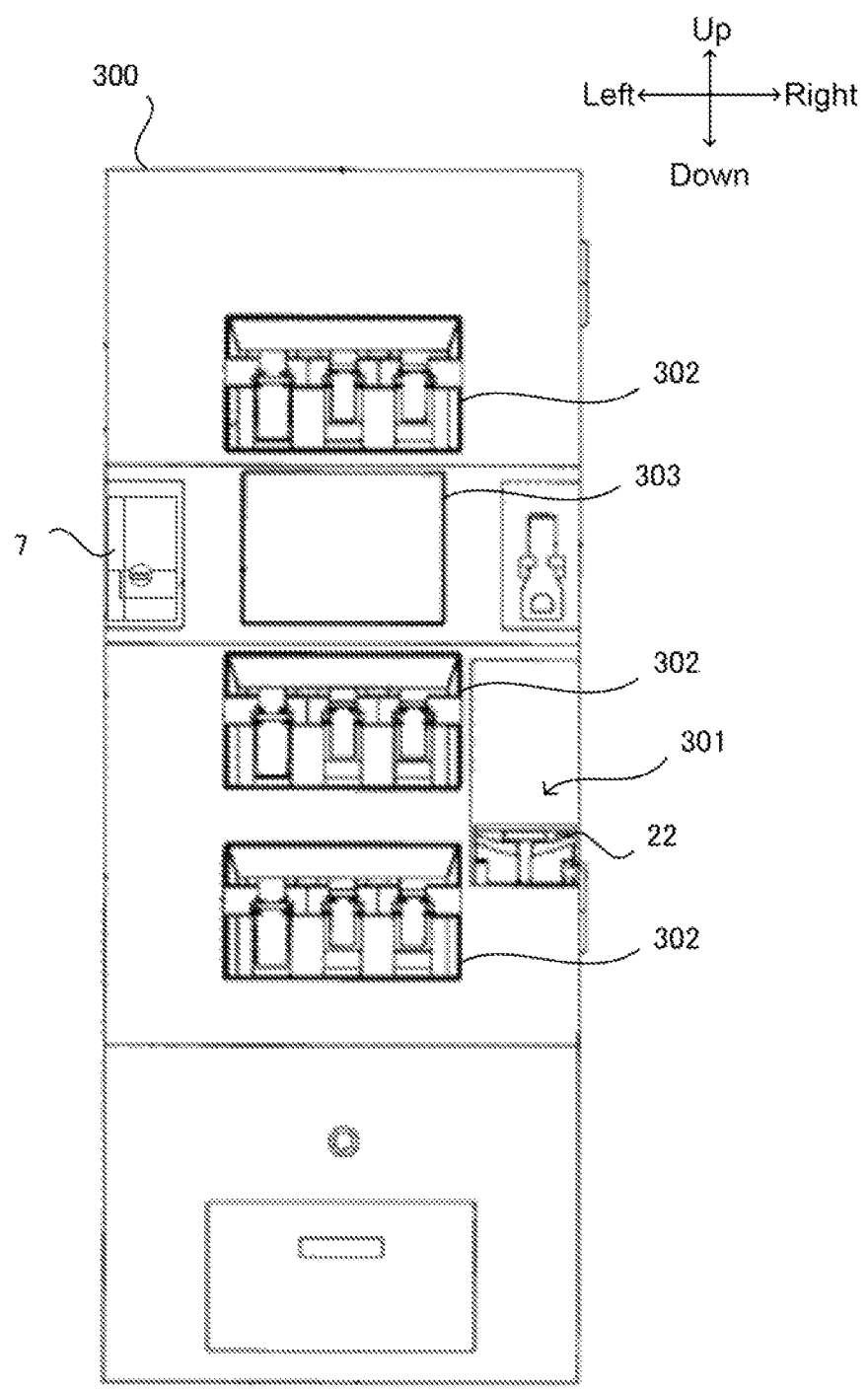
FIG. 37 is another view illustrating the medicine dispensing apparatus according to the other embodiment of the present invention.

In the first embodiment, description is given to the exemplary case where the number of the available unspecified cassettes 22 is relatively small in the medicine dispensing apparatus 100. On the other hand, it is also possible to apply the present invention to a medicine dispensing apparatus 300 which can use a lot of unspecified cassettes 22. Each of FIGS. 36 and 37 is an external view of the medicine dispensing apparatus 300. In this regard, a configuration including a lot of medicine cassettes is also described in internal publication number WO 2013/118838, for example. As shown in FIGS. 36 and 37, the medicine dispensing apparatus 300 includes the medicine photographing apparatus 7, an adjusting part 301, a vial bottle dispensing part 302, an operating monitor 303 and the like. Further, the medicine dispensing apparatus 300 includes a control device (not shown in the drawings) for carrying out the adjusting process (see FIG. 26) in the same manner as the control part 11. Furthermore, a plurality of unspecified cassettes 22 can be mounted to the medicine dispensing apparatus 300. Furthermore, in the medicine dispensing apparatus 300, a vial bottle in which tablets supplied from each of the unspecified cassettes 22 are contained is dispensed from the vial bottle dispensing part 302.

In the medicine dispensing apparatus 300 having such a configuration, in the case of providing a mechanism for changing the width w1 and the height h1 of the dispensing path for the tablets in each of the unspecified cassette 22, the size of the apparatus becomes larger and its cost increases. Thus, in the medicine dispensing apparatus 300, the adjusting part 301 commonly used among the plurality of unspecified cassettes 22 is provided. The adjusting part 301 has the same configuration as the mounting part 221 of the medicine dispensing apparatus 100 and can change the width w1 and the height h1 of the dispensing path for the tablets in each of the unspecified cassettes 22. Thus, in the medicine dispensing apparatus 300 having such a configuration, the control device (not shown in the drawings) carries out the adjusting process to the unspecified cassette 22 mounted on the adjusting part 301, thereby using the unspecified cassette 22 with adapting the unspecified cassette 22 to an arbitrary tablet. As a result, it is possible to downsize the structure of the medicine dispensing apparatus 300 and reduce the cost for the medicine dispensing apparatus 300.

Third Embodiment

Figure 38:
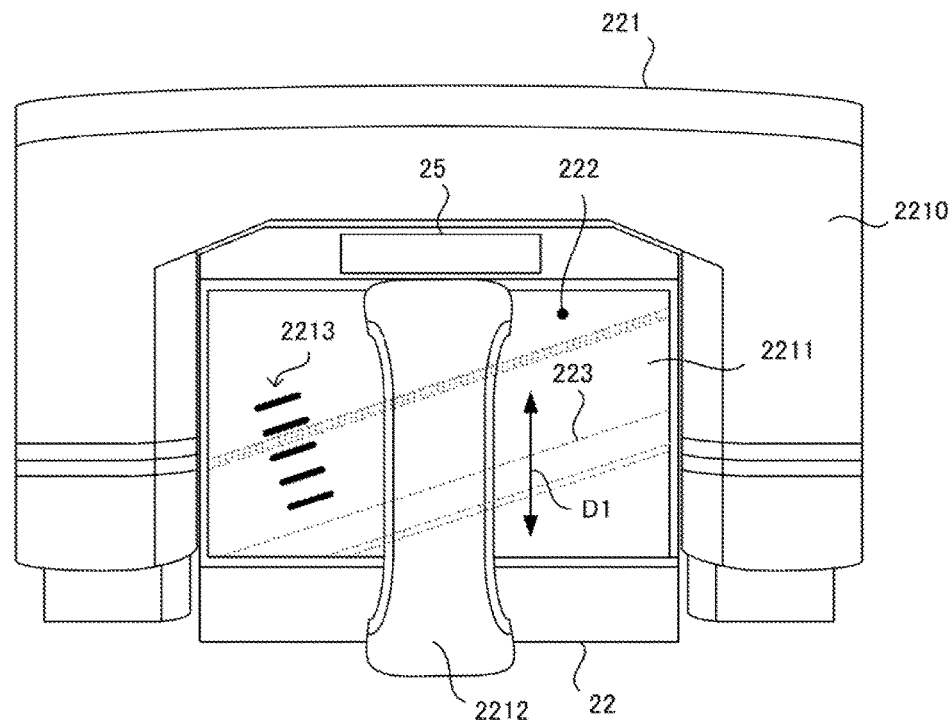
FIG. 38 is a view illustrating of an unspecified cassette and a mounting part according to the other embodiment of the present invention.
Figure 39:
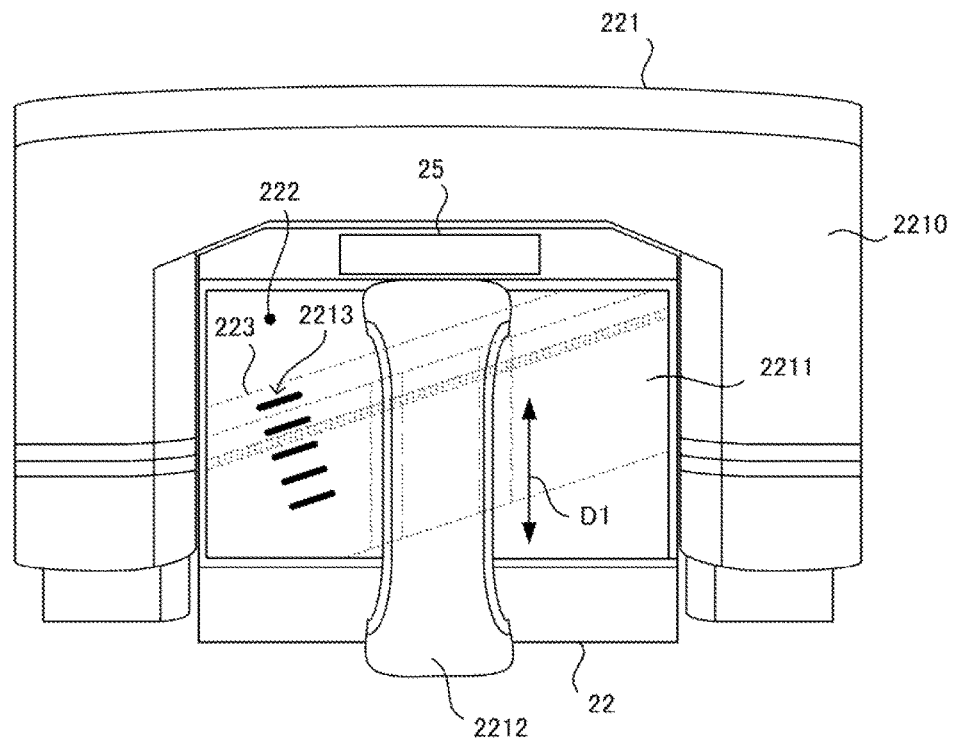
FIG. 39 is another view illustrating of the unspecified cassette and the mounting part according to the other embodiment of the present invention.

Each of FIGS. 38 and 39 is a view illustrating modified examples of the unspecified cassette 22 and the mounting part 221 and is a schematic view taken from the front side in a state that the unspecified cassette 22 is mounted on the mounting part 221. As shown in FIGS. 38 and 39, a front side cover 2210 is attached to the mounting part 221. In this regard, for the unspecified cassette 22 and the mounting part 221, description for the same configurations as the configurations described in the first embodiment will be omitted. Although the following description will be given to the medicine dispensing apparatus 100, the same configuration can be applied to the medicine dispensing apparatus 300.

As described above, in the unspecified cassette 22, the first rotating body 223 can be raised and lowered by the raising and lowering mechanism (not shown in the drawings). By raising and lowering the first rotating body 223, it is possible to change the volume in the tablet containing part 222. Further, in the medicine dispensing apparatus 100, a tablet detecting part such as an optical sensor for detecting the tablets placed on the second rotating body 224 is provided, thereby detecting whether or not the tablets are placed on the second rotating body 224 by using the tablet detecting part.

In the medicine dispensing apparatus 100 having such a configuration, in the case where the tablet is not detected by the tablet detecting part, the driving gear 228B is driven by the driving motor and the first rotating body 223 is raised in the tablet containing part 222. With this configuration, the tablets in the tablet containing part 222 are supplied from the first rotating body 223 to the second rotating body 224. In this regard, the driving of the first rotating body 223 is kept until the tablet is detected by the tablet detecting part or until a predetermined time passes.

Further, it is possible to consider another configuration in which the driving gear 228B is driven by the driving motor to raise the first rotating body 223 in the case where a time interval for detecting the tablet by the counter provided at the dispensing port 225 of the unspecified cassette 22 exceeds a predetermined time interval. In this case, the driving of the first rotating body 223 is kept until the tablet is detected by the counter or until a predetermined time passes. In this regard, international publication number WO 2013/118838 also describes the raising and lowering mechanism, for example.

By the way, in a state that the unspecified cassette 22 is mounted on the mounting part 221, if the user cannot understand the remaining number of the tablets contained in the unspecified cassette 22, it is difficult to know timing for supplying the tablets into the unspecified cassette 22.

Thus, in the medicine dispensing apparatus 100 according to the third embodiment, a front side part 2211 and the tablet containing part 222 constituting an external casing of the unspecified cassette 22 are formed of a transparent or semi-transparent material such as a resin. In this regard, a degree of transparency of the front side part 2211 and the tablet containing part 222 may be a degree for enabling the user to visually confirm the raising and lowering position of the first rotating body 223 in the unspecified cassette 22. Further, it may be considered that a gripping part 2212 provided on the front side of the unspecified cassette 22 for enabling the user to grip the unspecified cassette 22 is also transparent or semi-transparent. Furthermore, on the front side part 2211, a scale 2213 indicating the position of the first rotating body 223 in a raising and lowering direction D1 is provided. In the scale 2213, positions which are indications for grasping the remaining number of the tablets in the unspecified cassette 22 are provided within a raising and lowering range of the first rotating body 223 at a predetermined interval.

In FIGS. 38 and 39, the first rotating body 223 which can be visually confirmed from the outside of the unspecified cassette 22 is illustrated by a dotted line. As shown in FIGS. 38 and 39, in the medicine dispensing apparatus 100 according to the third embodiment, even in the case that the unspecified cassette 22 is mounted on the mounting part 221, the user can visually confirm a current position of the first rotating body 223 in the raising and lowering direction D1 from the outside of the unspecified cassette 22. In particular, as shown in FIGS. 38 and 39, the scale 2213 for easily recognizing the position of the first rotating body 223 in the raising and lowering direction D1 is provided on the unspecified cassette 22. Thus, it is possible to easily grasp the remaining number of the tablets in the unspecified cassette 22 by visually confirming the scale 2213 and the position of the first rotating body 223.

Thus, the user can understand the remaining number of the tablets contained in the unspecified cassette 22 in a state that the unspecified cassette 22 is mounted on the mounting part 221. Therefore, the user can supply the tablets into the unspecified cassette 22 in a timely manner at the time of finding that the remaining number of the tablets in the unspecified cassette 22 becomes small. With this configuration, for example, it is possible to prevent the case where short of the tablets in the unspecified cassette 22 occurs during the dispensation by the medicine dispensing apparatus 100 and the supplying operation is required at this timing.

Further, for example, since the user can visually confirm the state in the unspecified cassette 22 from the outside and can visually confirm that the first rotating body 223 of the unspecified cassette 22 is being rotated, the user can recognize that the tablets are being dispensed from the unspecified cassette 22. For example, the user recognizes that the unspecified cassette 22 is under driving when the user grips the gripping part 2212 of the unspecified cassette 22 and the like. Thus, in the medicine dispensing apparatus 100, it is possible to prevent the unspecified cassette 22 under driving from being removed by the user.

In this embodiment, although description is given to the configuration in which the unspecified cassette 22 can dispense the tablets due to the rotating operation of the first rotating body 223 and the volume of the tablet containing part 222 can be changed due to the raising and lowering operation of the first rotating body 223, the present invention is not limited thereto. Namely, the concept of the present invention extracted from this embodiment contains a configuration in which the unspecified cassette 22 includes a dispensing operation part for carrying out an operation for receiving driving force from a certain driving source to dispense the tablets and a volume changing part for receiving driving force from a certain driving source to change the volume of the tablet containing part 222. One example of the dispensing operating part includes a mechanism for dispensing the tablets by utilizing, for example, vibration in addition to the mechanism utilizing the rotating operation of the first rotating body 223. Further, one example of the volume changing part includes a mechanism which can change the volume by moving an internal wall surface or a partitioning plate of the tablet containing part 222 by utilizing, for example, a rotating operation or a sliding operation in addition to the mechanism utilizing the raising and lowering operation of the first rotating body 223.

Further, for the unspecified cassette 22 including the dispensing operating part, the volume changing part and the like in this manner, the described configuration in which the front side part 2211 is transparent or semi-transparent and the state in the unspecified cassette 22 can be visually confirmed from the outside is suitable. Namely, since the user can visually confirm whether or not the dispensing operating part is now operating, it is possible to prevent the unspecified cassette 22 under the dispensing operation of the tablet from being removed. Further, since the user can visually confirm the state of the volume changing part, the user can easily visually confirm the remaining number of the tablets in the tablet containing part 222. In the case where there is no influence on the dispensing function for the tablets by the unspecified cassette 22, it is possible to consider a configuration in which an aperture from which the user can visually confirm the state in the unspecified cassette 22 is provided on a part of the external casing of the unspecified cassette 22. Further, if the unspecified cassette 22 is in a state that the upper surface, the side surface or the back surface of the unspecified cassette 22 can be visually confirmed from the outside when the unspecified cassette 22 is attached to the medicine dispensing apparatus 100, it is also possible to consider a configuration in which the surface which can be visually confirmed from the outside is transparent or semi-transparent or an aperture is provided on the surface which can be visually confirmed from the outside. Further, color images of the tablet photographed by the camera 831 may be registered in the medicine master. Each registered color image may be transmitted to another medicine dispensing apparatus 100 together with the medicine code.

DESCRIPTION OF REFERENCE SIGNS

7: Medicine photographing apparatus, 71: Housing, 72: Opening and closing part, 73: Operating part, 81: Medicine holding part, 810: Medicine placing part, 810A: Medicine placing surface, 811: Gripping part, 811A: Gripping surface, 812: Gripping part, 812A: Gripping surface, 813: Placing reference part, 813A: Placing reference surface, 82: Lighting part, 821: Light source, 822: Light source supporting part, 83: Photographing part, 831: Camera, 832: Camera supporting part, 100: Medicine dispensing apparatus, S1, S2 . . . : Process procedure (step) number

What is claimed is:

1. A medicine dispensing apparatus, comprising:
   a shape measuring unit configured to measure a size of a medicine;
   a medicine cassette comprising a tablet containing cavity, a conveying member for conveying tablets passing through a dispensing path toward the dispensing port, height and width restricting members disposed along the dispensing path, wherein the cassette is configured to dispense the medicine, while being adjustable by changing one or both of a height and a width of a dispensing path, where the height and the width are changed by:
   (a) adjusting the distance between the dispensing path and a lower end position of a height restricting member; and
   (b) adjusting the projecting amount of the width restricting member toward the dispensing path;
   an adjusting unit on which the medicine cassette can be detachably mounted wherein the adjusting unit comprises driving motors to drive gear transmission mechanisms linked to the height and width restricting members in such a manner as to change one or both of the height and the width of the dispensing path in the medicine cassette; and
   a control unit configured to control the adjusting unit according to the size of the medicine obtained by the shape measuring unit to change one or both of the height and the width of the dispensing path in the medicine cassette mounted on the adjusting unit.

2. The medicine dispensing apparatus according to claim 1, wherein a plurality of adjusting units are individually provided at a plurality of mounting units which includes a plurality of driving units configured to drive a plurality of medicine cassettes respectively.

3. The medicine dispensing apparatus according to claim 1, wherein the adjusting unit is commonly provided among a plurality of medicine cassettes.

4. The medicine dispensing apparatus according to claim 1, wherein the control unit controls the adjusting unit according to a size of the medicine to change one or both of the height and the width of the dispensing path in the medicine cassette mounted on the adjusting unit.

5. The medicine dispensing apparatus according to claim 1, further comprising a medicine photographing apparatus configured to photograph the medicine;
   wherein the shape measuring unit obtains the size of the medicine based on an image photographed by the medicine photographing apparatus; and
   wherein the medicine photographing apparatus and the adjusting unit are provided on a same side surface of the medicine dispensing apparatus.

6. The medicine dispensing apparatus according to claim 1, further comprising an operating monitor used for operating the medicine dispensing apparatus, and
   wherein the operating monitor and the adjusting unit are provided on a same side surface of the medicine dispensing apparatus.

7. The medicine dispensing apparatus according to claim 1, further comprising a vial bottle dispensing unit through which a vial bottle containing the medicine dispensed from the medicine cassette is dispensed, and
   wherein the vial bottle dispensing unit and the adjusting unit are provided on a same side surface of the medicine dispensing apparatus.

8. The medicine dispensing apparatus according to claim 1, further comprising:
   a medicine photographing apparatus configured to photograph the medicine;
   an operating monitor used for operating the medicine dispensing apparatus; and
   a vial bottle dispensing unit through which a vial bottle containing the medicine dispensed from the medicine cassette is dispensed, and
   wherein the shape measuring unit obtains the size of the medicine based on an image photographed by the medicine photographing apparatus; and
   wherein the medicine photographing apparatus, the operating monitor, the vial bottle dispensing unit and the adjusting unit are provided on a same side surface of the medicine dispensing apparatus.

9. The medicine dispensing apparatus according to claim 1, wherein a plurality of medicine cassettes are provided on a surface perpendicular to a side surface on which the adjusting unit is provided.

10. The medicine dispensing apparatus according to claim 1, further comprising a medicine photographing apparatus configured to photograph the medicine,
    wherein the shape measuring unit obtains the size of the medicine based on an image photographed by the medicine photographing apparatus; and
    wherein the medicine photographing apparatus includes:
    a photographing unit including a lighting unit and a photographing unit;
    a medicine holding unit which is provided between the lighting unit and the photographing unit and can hold the medicine with a portion having translucency;

a housing in which the photographing unit and the medicine holding unit are contained, the housing having light shielding property; and a pivotally supporting unit configured to pivotally support one or both of the photographing unit and the medicine holding unit.

11. The medicine dispensing apparatus according to claim 1, wherein:

the shape measuring unit further configured to identify a shape type of the medicine; and the control unit further controls the adjusting unit according to the shape type of the medicine.

12. A medicine dispensing apparatus, comprising:

a shape measuring unit configured to measure a size of a medicine;

a medicine cassette comprising a tablet containing cavity, a conveying member for conveying tablets passing through a dispensing path toward the dispensing port, height and width restricting members disposed along the dispensing path, wherein the cassette is configured to dispense the medicine, while being adjustable by changing one or both of a height and a width of a dispensing path where the height and the width are changed by:

(a) adjusting the distance between the dispensing path and a lower end position of a height restricting member; and (b) adjusting the projecting amount of the width restricting member toward the dispensing path;

an adjusting unit on which the medicine cassette can be detachably mounted wherein the adjusting unit comprises driving motors to drive gear transmission mechanisms linked to the height and width restricting members in such a manner as to change one or both of the height and the width of the dispensing path in the medicine cassette; and wherein so as to change one or both of the height and the width of the dispensing path in the medicine cassette mounted on the adjusting unit, (i): when a driving condition containing one or both of the height and the width of the dispensing path corresponding to the medicine is stored in a storage unit, the control unit controls the adjusting unit according to the driving condition, and;

(ii): when the driving condition is not stored in the storage unit, the control unit controls the adjusting unit according to the size of the medicine obtained by the shape measuring unit.

* * * * *